United States Patent
Dalonzo et al.

(10) Patent No.: US 11,868,592 B2
(45) Date of Patent: Jan. 9, 2024

(54) USER INTERFACES FOR CUSTOMIZING GRAPHICAL OBJECTS

(71) Applicant: Apple Inc., Cupertino, CA (US)

(72) Inventors: Christian X. Dalonzo, San Francisco, CA (US); Patrick L Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/020,514

(22) Filed: Sep. 14, 2020

(65) Prior Publication Data

US 2021/0096729 A1    Apr. 1, 2021

Related U.S. Application Data

(60) Provisional application No. 62/907,437, filed on Sep. 27, 2019.

(51) Int. Cl.
*G06F 3/04842*   (2022.01)
*G06F 3/04886*   (2022.01)

(52) U.S. Cl.
CPC ...... *G06F 3/04842* (2013.01); *G06F 3/04886* (2013.01)

(58) Field of Classification Search
CPC .................. G06F 3/04842; G06F 3/04886
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |

(Continued)

FOREIGN PATENT DOCUMENTS

| | | |
|---|---|---|
| WO | 2013/169849 A2 | 11/2013 |
| WO | 2014/105276 A1 | 7/2014 |

OTHER PUBLICATIONS

International Search Report received for PCT Patent Application No. PCT/US2020/050755, dated Dec. 11, 2020, 4 pages.

(Continued)

*Primary Examiner* — Jeremy L Stanley
(74) *Attorney, Agent, or Firm* — Kubota & Basol LLP

(57) ABSTRACT

In some embodiments, an electronic device displays a virtual keyboard, wherein the virtual keyboard includes a plurality of selectable representations of a plurality of graphical objects. In some embodiments, the electronic device receives a user input selecting a first selectable representation of a first graphical object, wherein the first graphical object is associated with a first customizable visual element and a second customizable visual element. In some embodiments, in response to receiving the user input and in accordance with a determination that one or more first criteria are satisfied, the electronic device displays, via the display device, a customization user interface, including a first section for customizing the first customizable visual element, a second section for customizing the second customizable visual element, and a third section for displaying a first respective representation of the first graphical object that indicates a current state of customization of the first graphical object.

60 Claims, 77 Drawing Sheets

(56) References Cited

U.S. PATENT DOCUMENTS

| | | | |
|---|---|---|---|
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,913,176 B1* | 3/2011 | Blattner | G06Q 10/107 |
| | | | 715/758 |
| 7,957,762 B2 | 6/2011 | Herz et al. | |
| 8,006,002 B2 | 8/2011 | Kalayjian et al. | |
| 8,171,084 B2* | 5/2012 | Walter | H04L 51/04 |
| | | | 709/206 |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 9,348,458 B2 | 5/2016 | Hotelling et al. | |
| 9,933,937 B2 | 4/2018 | Lemay et al. | |
| 10,203,843 B2 | 2/2019 | Tobens et al. | |
| 10,748,322 B1 | 8/2020 | Pishevar | |
| 2002/0015024 A1 | 2/2002 | Westerman et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2007/0276814 A1* | 11/2007 | Williams | G06F 40/174 |
| 2010/0123724 A1 | 5/2010 | Moore et al. | |
| 2012/0059787 A1* | 3/2012 | Brown | G06F 40/30 |
| | | | 706/52 |
| 2012/0179969 A1* | 7/2012 | Lee | G06F 3/017 |
| | | | 715/719 |
| 2012/0319985 A1 | 12/2012 | Moore et al. | |
| 2014/0019885 A1* | 1/2014 | Jung | H04M 1/7243 |
| | | | 715/758 |
| 2015/0100537 A1* | 4/2015 | Grieves | G06F 3/0237 |
| | | | 706/52 |
| 2015/0121300 A1* | 4/2015 | Wang | G06F 3/04845 |
| | | | 715/790 |
| 2015/0268780 A1* | 9/2015 | Kim | G06F 3/0412 |
| | | | 345/174 |
| 2015/0286371 A1* | 10/2015 | Degani | G06Q 30/0276 |
| | | | 705/14.64 |
| 2015/0331550 A1* | 11/2015 | Wang | G06F 3/04842 |
| | | | 715/771 |
| 2015/0363091 A1* | 12/2015 | Lee | H04N 21/4884 |
| | | | 715/722 |
| 2016/0050169 A1* | 2/2016 | Ben Atar | H04L 51/046 |
| | | | 709/206 |
| 2016/0259502 A1* | 9/2016 | Parrott | G06F 3/04817 |
| 2017/0060354 A1* | 3/2017 | Luo | H04M 1/72436 |
| 2017/0068439 A1 | 3/2017 | Mohseni | |
| 2017/0075878 A1 | 3/2017 | Jon et al. | |
| 2017/0083174 A1* | 3/2017 | Tobens, III | G06F 3/0485 |
| 2017/0131870 A1 | 5/2017 | Harper | |
| 2017/0185581 A1 | 6/2017 | Bojja et al. | |
| 2017/0300462 A1 | 10/2017 | Cudworth et al. | |
| 2017/0308289 A1 | 10/2017 | Kim | |
| 2017/0308290 A1 | 10/2017 | Patel | |
| 2017/0308293 A1* | 10/2017 | Lee | G06F 3/04845 |
| 2017/0336926 A1 | 11/2017 | Chaudhri et al. | |
| 2017/0336960 A1 | 11/2017 | Chaudhri et al. | |
| 2017/0353842 A1 | 12/2017 | Waddell | |
| 2017/0358117 A1* | 12/2017 | Goossens | H04L 51/10 |
| 2018/0039406 A1 | 2/2018 | Kong et al. | |
| 2018/0047195 A1* | 2/2018 | Vissicaro | G06T 11/60 |
| 2018/0068475 A1* | 3/2018 | Blue | G06F 3/0488 |
| 2018/0144557 A1* | 5/2018 | Seo | H04L 51/04 |
| 2018/0173692 A1 | 6/2018 | Greenberg et al. | |
| 2018/0295027 A1 | 10/2018 | Lehtovirta et al. | |
| 2018/0295072 A1 | 10/2018 | Yim et al. | |
| 2018/0329622 A1 | 11/2018 | Missig et al. | |
| 2018/0336184 A1 | 11/2018 | Bellegarda et al. | |
| 2018/0336716 A1 | 11/2018 | Ramprashad et al. | |
| 2018/0348890 A1 | 12/2018 | Yang et al. | |
| 2019/0018577 A1* | 1/2019 | Liu | H04L 51/10 |
| 2019/0199663 A1* | 6/2019 | Liu | H04M 1/72439 |
| 2019/0199848 A1 | 6/2019 | Moore et al. | |
| 2019/0250934 A1 | 8/2019 | Kim et al. | |
| 2019/0260702 A1 | 8/2019 | Hall | |
| 2020/0159871 A1* | 5/2020 | Bowen | G06F 30/12 |
| 2020/0219295 A1 | 7/2020 | El Kaliouby et al. | |
| 2020/0293765 A1 | 9/2020 | Bryant et al. | |
| 2020/0301566 A1 | 9/2020 | Monk | |
| 2021/0191741 A1* | 6/2021 | Li | G06F 3/04845 |
| 2021/0382590 A1 | 12/2021 | Fong et al. | |
| 2021/0383588 A1* | 12/2021 | Lee | H04N 5/232933 |
| 2021/0397270 A1 | 12/2021 | Misra et al. | |
| 2022/0070125 A1 | 3/2022 | Vasamsetti et al. | |
| 2022/0221985 A1 | 7/2022 | Moore et al. | |

OTHER PUBLICATIONS

Non-Final Office Action received for U.S. Appl. No. 17/353,498, dated Oct. 14, 2021, 16 pages.

Horowitz, Paul, "How to Access & Use Different Emoji Skin Tones on Mac", Available online at: <https://osxdaily.com/2015/04/14/use-diverse-emoji-skin-tone-mac-os-x/>, Apr. 14, 2015, pp. 1-7.

Horowitz, Paul, "Lose the Cartoon Yellow People Emoji! How to Access Diverse Emoji Icons in iOS", Available online at: <https://osxdaily.com/2015/04/11/how-access-diverse-emoji-icons-ios/>, Apr. 11, 2015, pp. 1-10.

Notice of Allowance received for U.S. Appl. No. 17/353,498, dated Jul. 27, 2022, 12 Pages.

Notice of Allowance received for U.S. Appl. No. 17/353,498, dated Apr. 6, 2022, 27 Pages.

Corrected Notice of Allowance received for U.S. Appl. No. 17/353,498, dated Nov. 25, 2022, 2 pages.

Notice of Allowance received for U.S. Appl. No. 17/353,498, dated Nov. 14, 2022, 12 pages.

Schofield, Tim, "Gboard for Android: Update to Google Keyboard!", Youtube, Available online at: <https://www.youtube.com/watch?v=KAW0iTFnv5A>, [Retrieved Oct. 27, 2022], Dec. 14, 2016, pp. 1-4.

Whitney, Lance, "How to Use Google's Gboard Keyboard on iOS or Android devices", TechRepublic, Sep. 6, 2018, 10 pages.

* cited by examiner

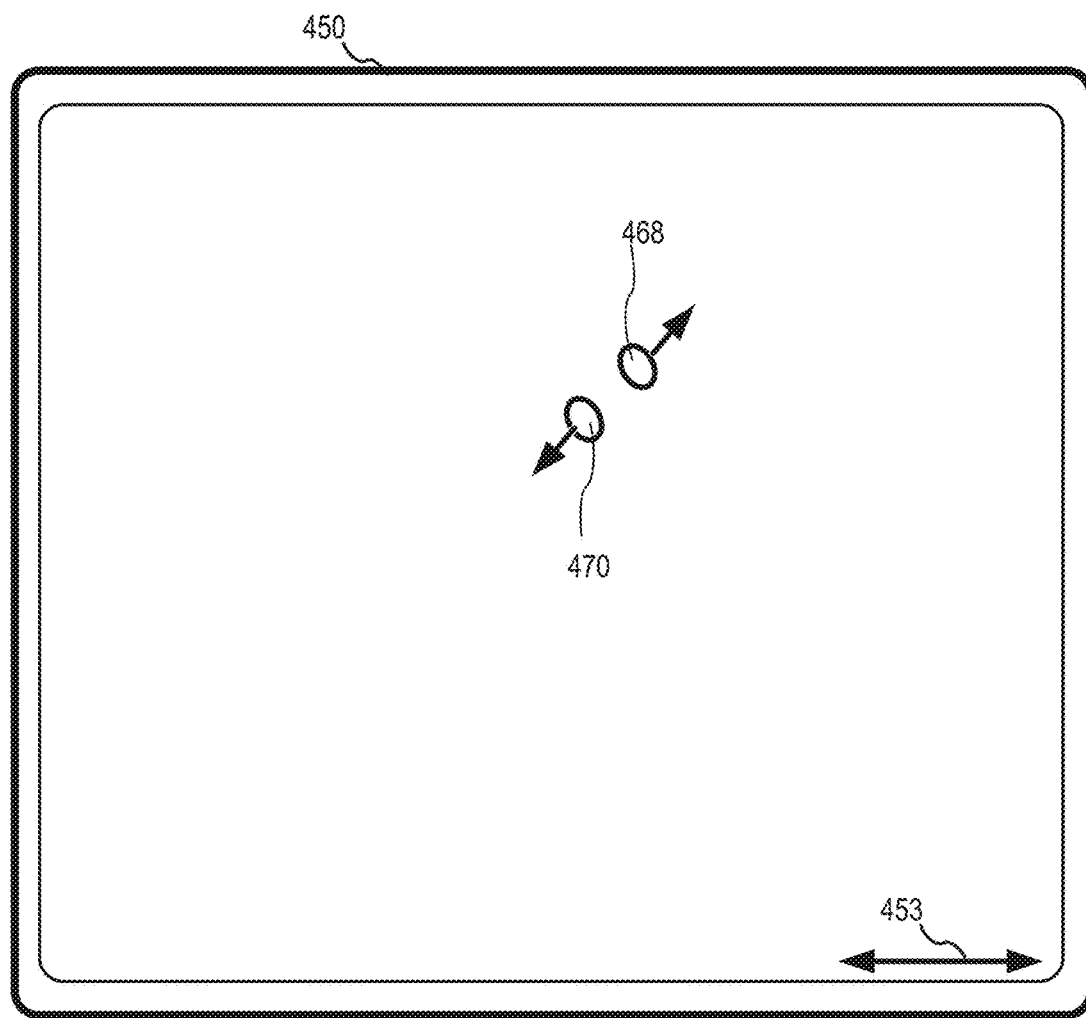
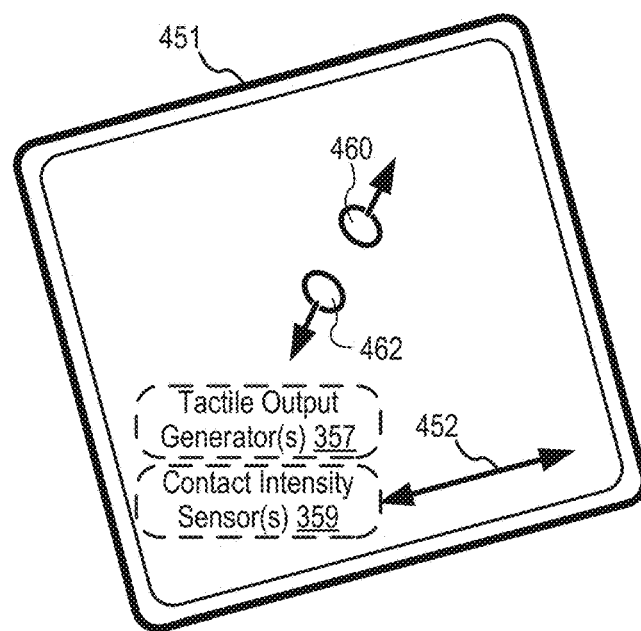
*FIG. 4B*

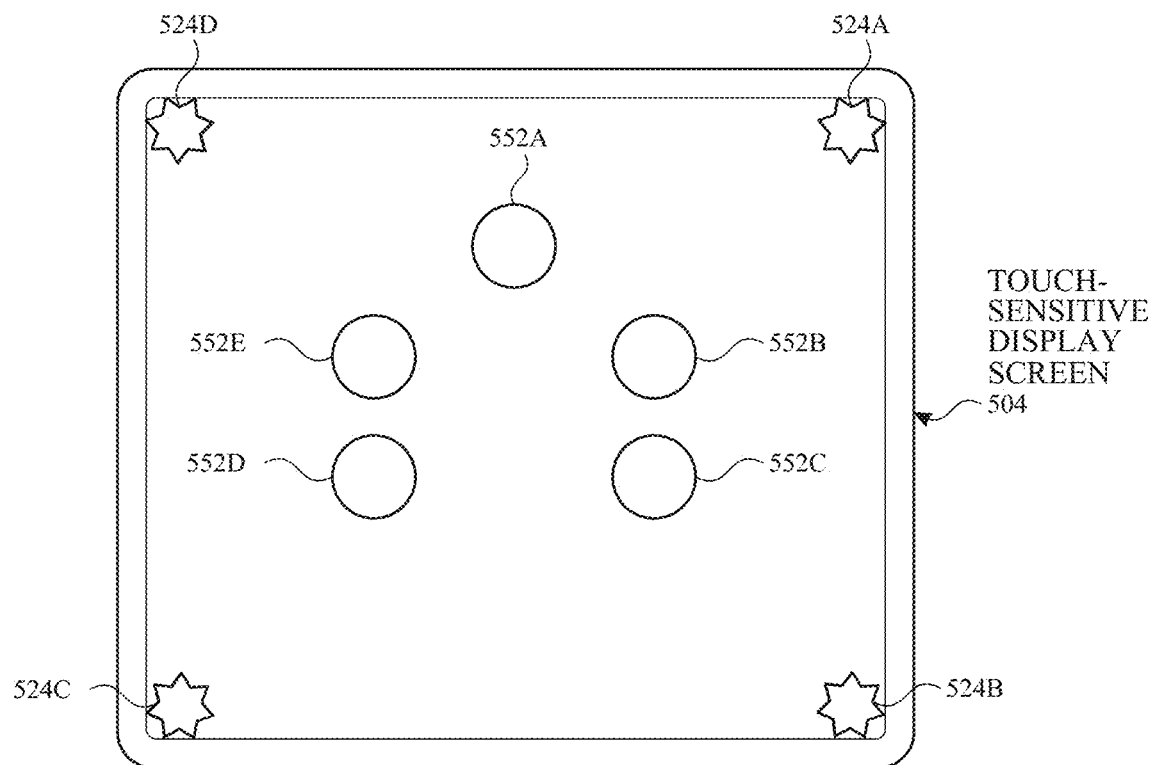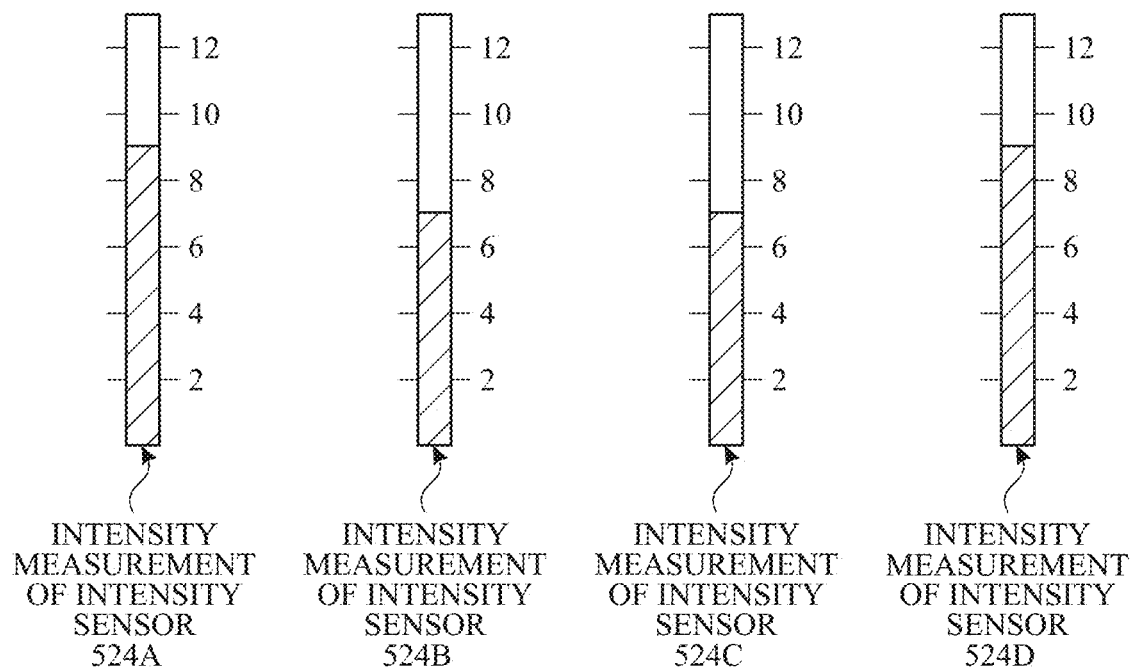
FIG. 5C

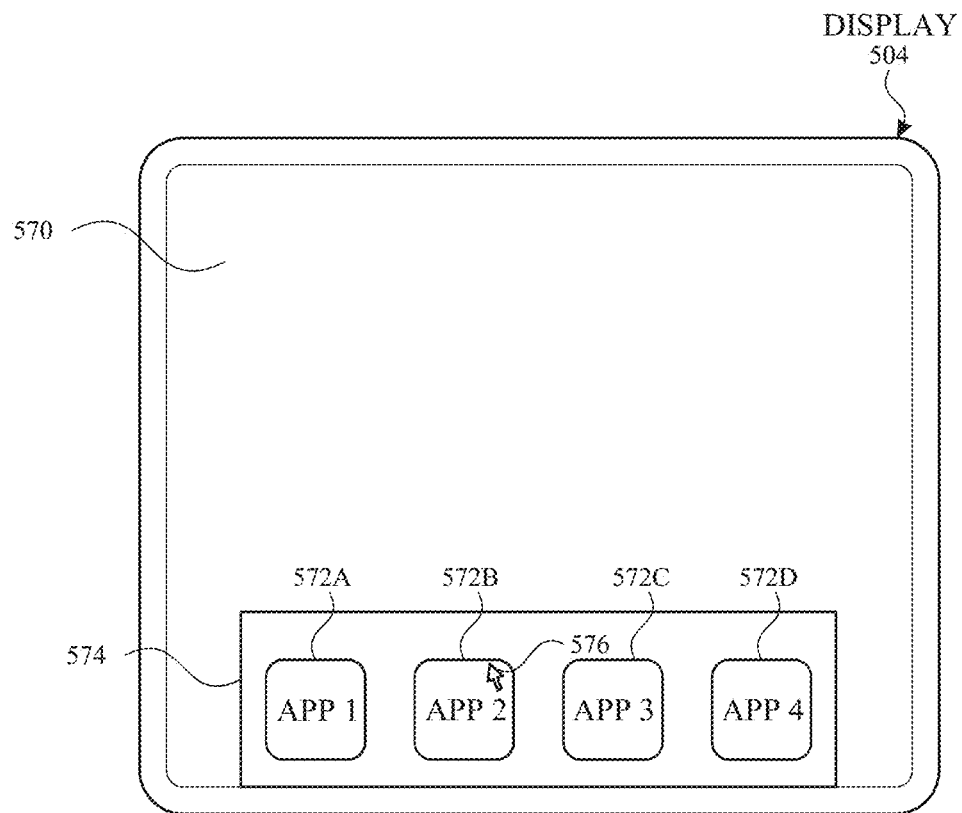
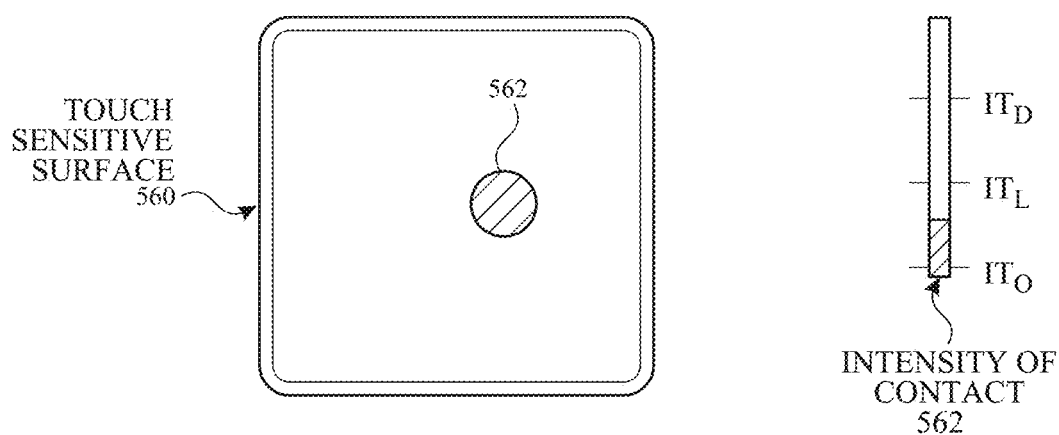
FIG. 5E

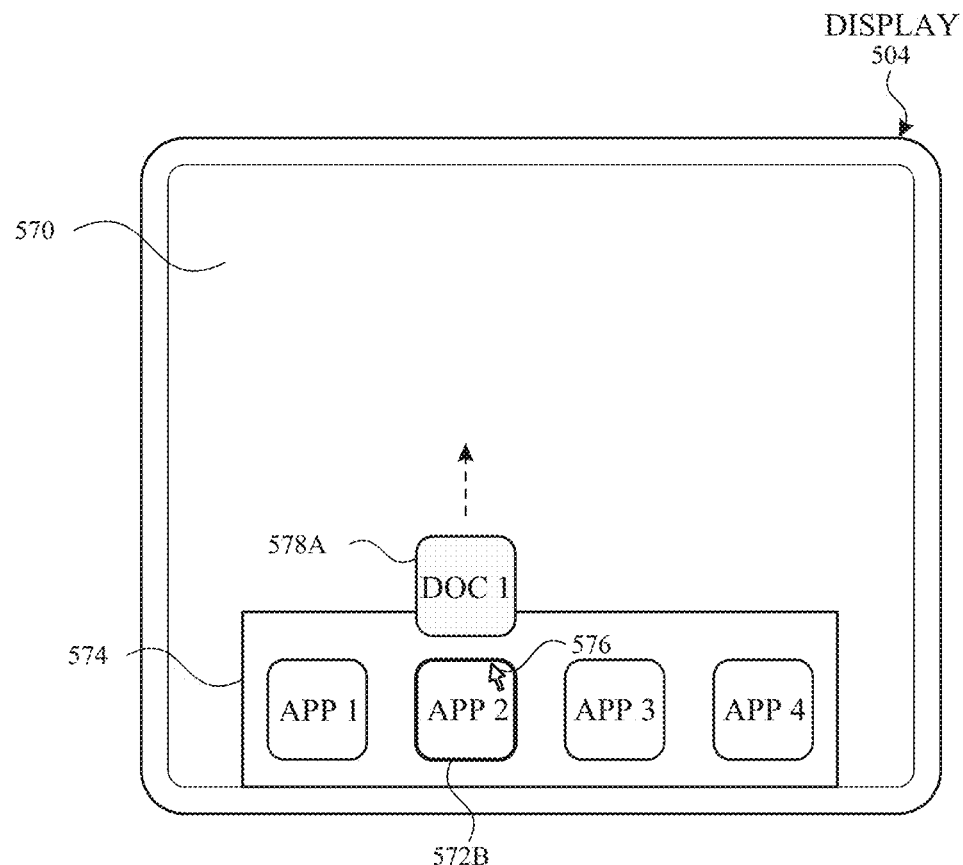
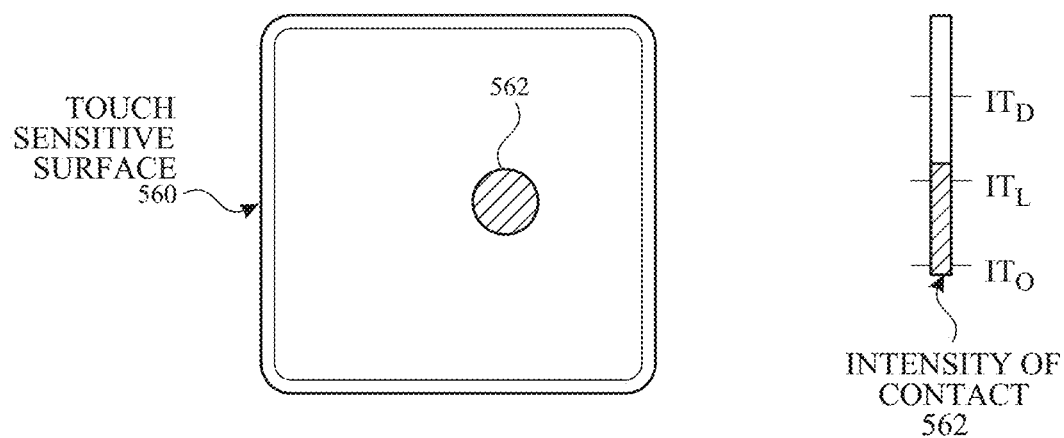
*FIG. 5F*

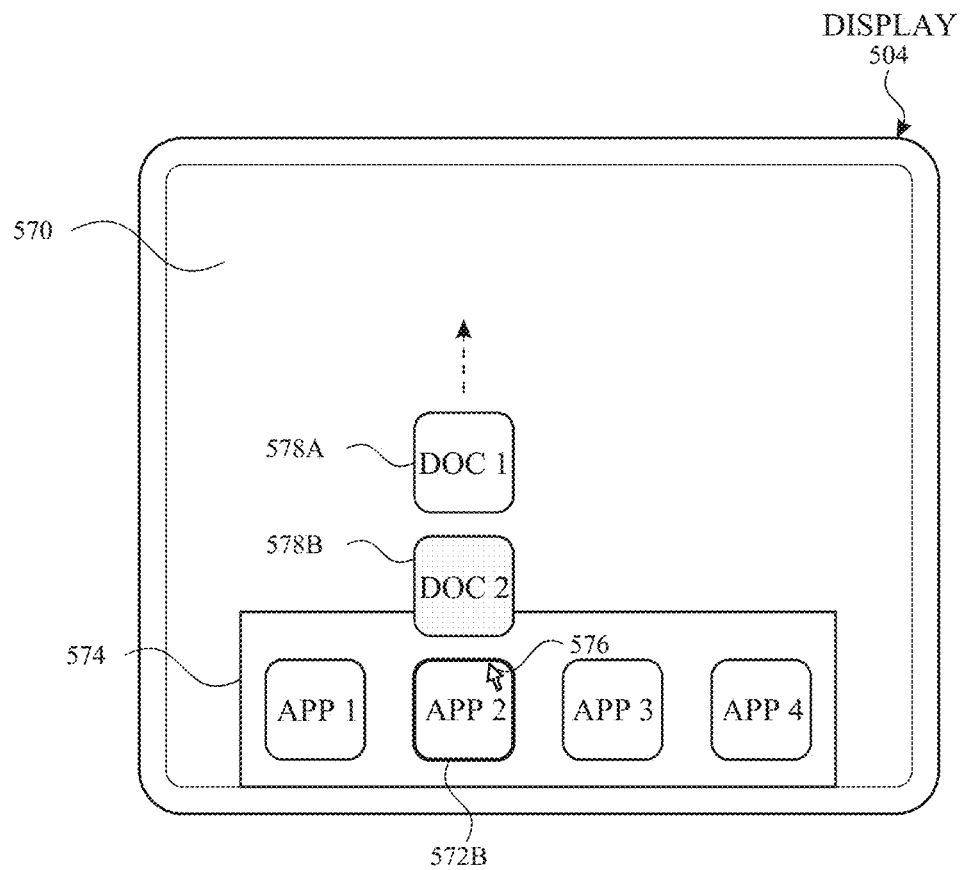
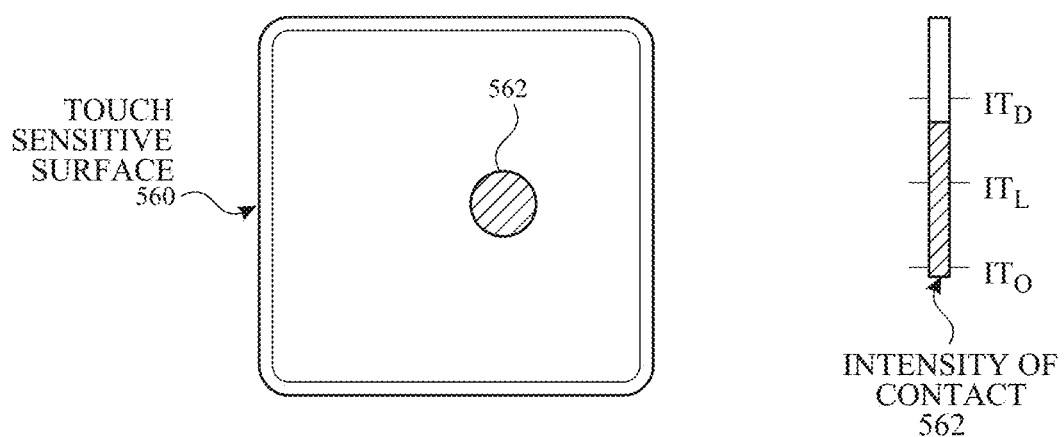
*FIG. 5G*

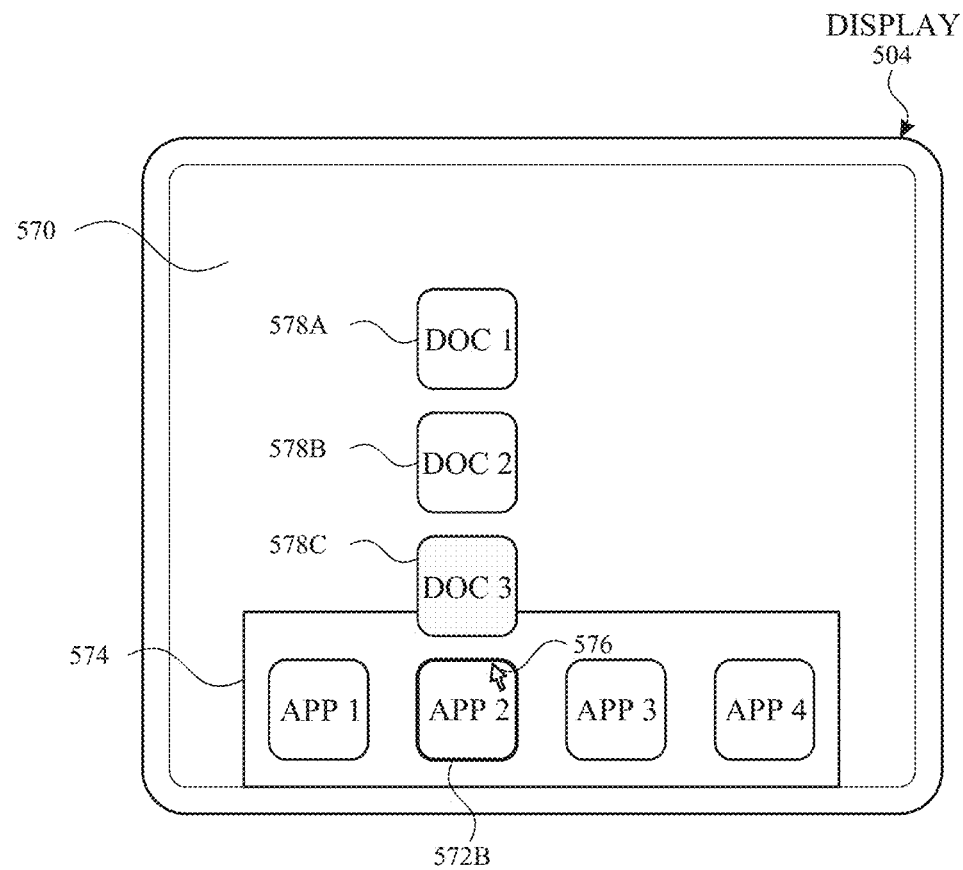
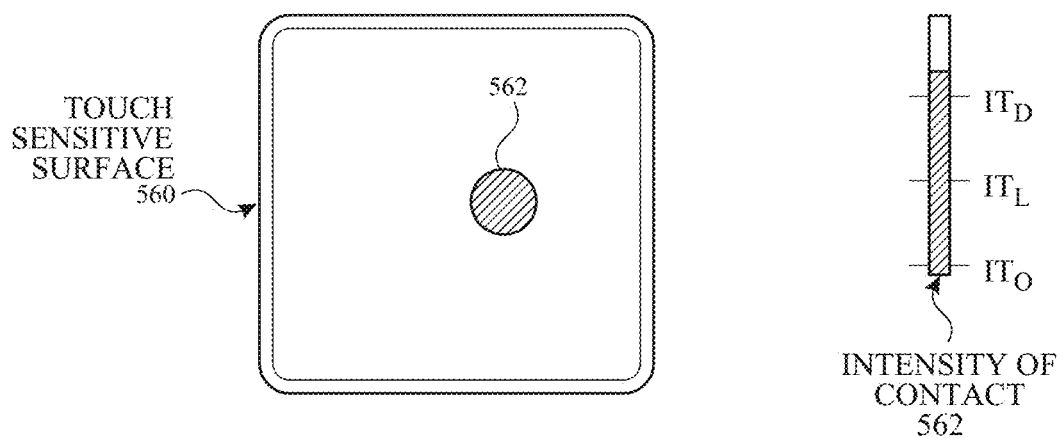
*FIG. 5H*

700

702 — Display, in a user interface via the display device, a text entry region and a virtual keyboard, wherein the virtual keyboard includes a plurality of selectable representations of a plurality of graphical objects

704 — Receive, via the one or more input devices, a first user input selecting a first selectable representation of a first graphical object of the plurality of representations of graphical objects, wherein the first graphical object is associated with a plurality of customizable visual elements, including a first customizable visual element and a second customizable visual element

706 — In response to receiving the first user input:

708 — In accordance with a determination that one or more first criteria are satisfied, display, via the display device, a customization user interface, wherein the customization user interface includes:

710 — A first section including one or more first selectable options for customizing the first customizable visual element

712 — A second section including one or more second selectable options for customizing the second customizable visual element

714 — A third section for displaying a first respective representation of the first graphical object that indicates a current state of customization of the first graphical object

FIG. 7A

USER INTERFACES FOR CUSTOMIZING GRAPHICAL OBJECTS

CROSS-REFERENCE TO RELATED APPLICATIONS

This application claims the benefit of U.S. Provisional Application No. 62/907,437, filed Sep. 27, 2019, the content of which is hereby incorporated by reference in its entirety for all purposes.

FIELD OF THE DISCLOSURE

This relates generally to user interfaces that enable a user to customize and insert graphical objects, such as emojis, on an electronic device.

BACKGROUND OF THE DISCLOSURE

User interaction with electronic devices has increased significantly in recent years. These devices can be devices such as computers, smart phones, tablet computers, televisions, multimedia devices, mobile devices, wearable devices, and the like.

In some circumstances, users enter graphical objects such as emojis using a virtual keyboard on an electronic device. In some circumstances, users wish to customize different aspects of certain graphical objects or emojis. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to presenting customization user interfaces for customizing and inserting graphical objects such as emojis. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 7A-7M are flow diagrams illustrating a method of presenting a customization user interface for customizing and inserting emojis in accordance with some embodiments of the disclosure.

DETAILED DESCRIPTION

Figure 1A:
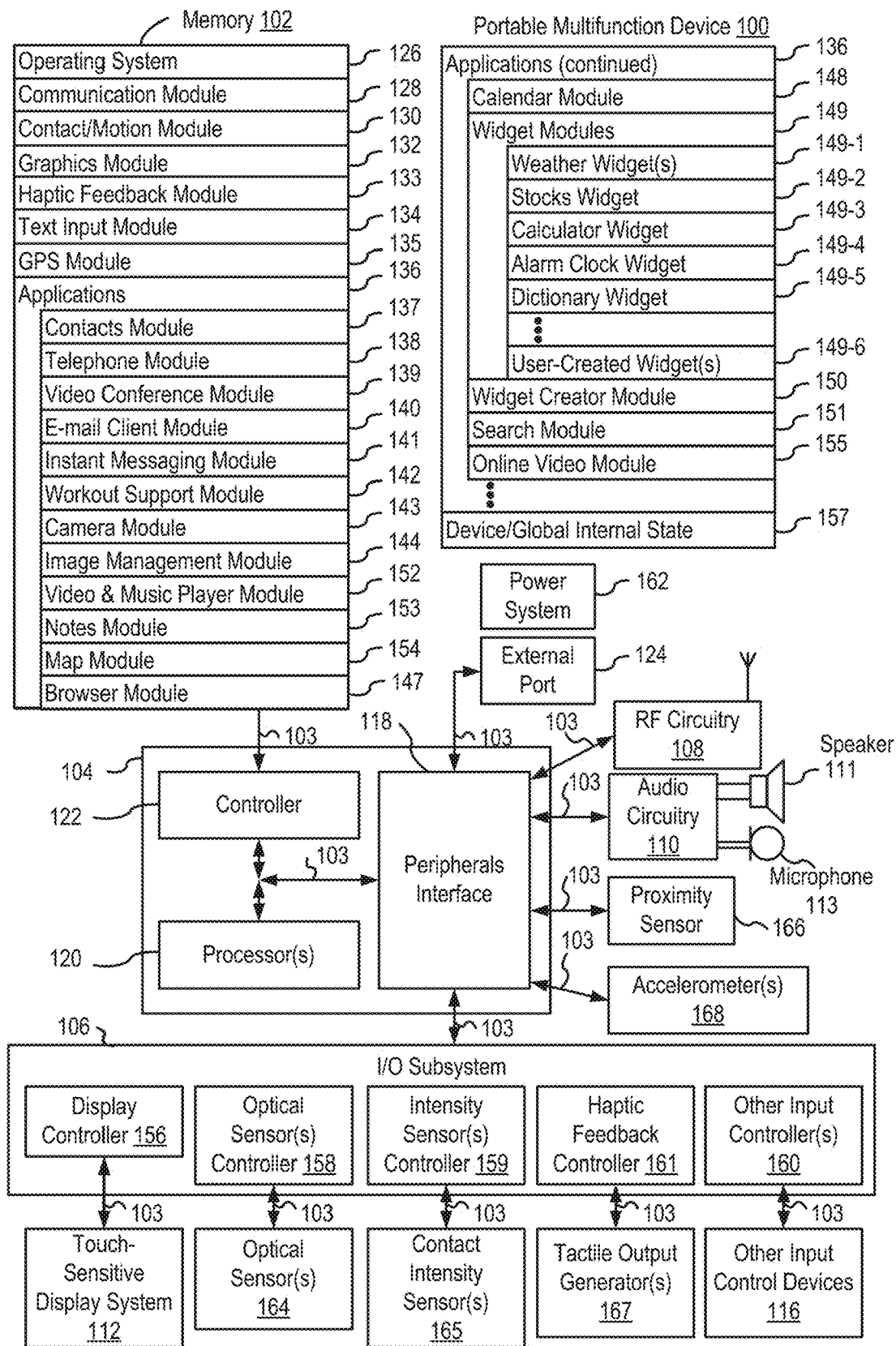
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for customizing graphical objects such as emojis with multiple customizable components. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
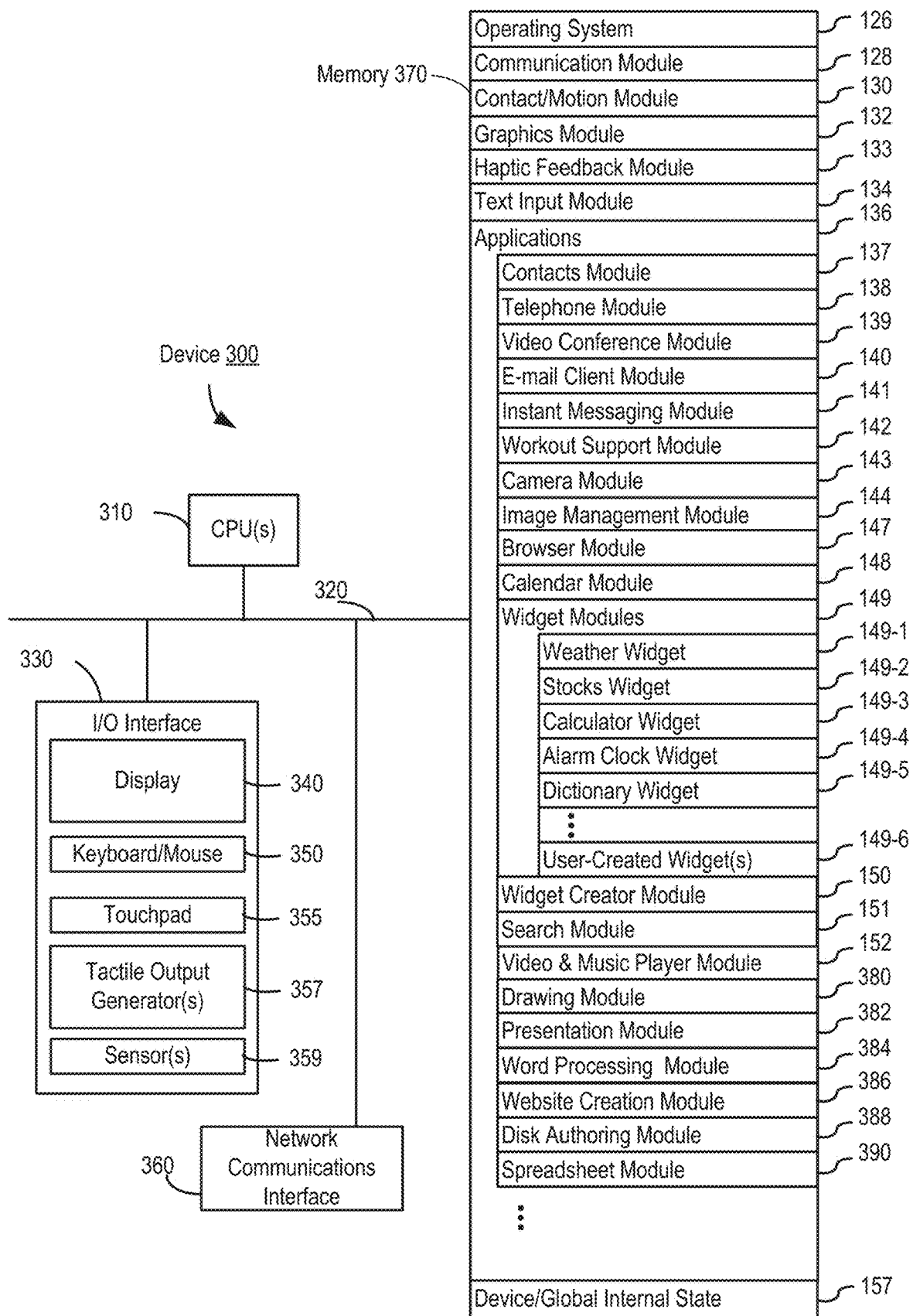
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
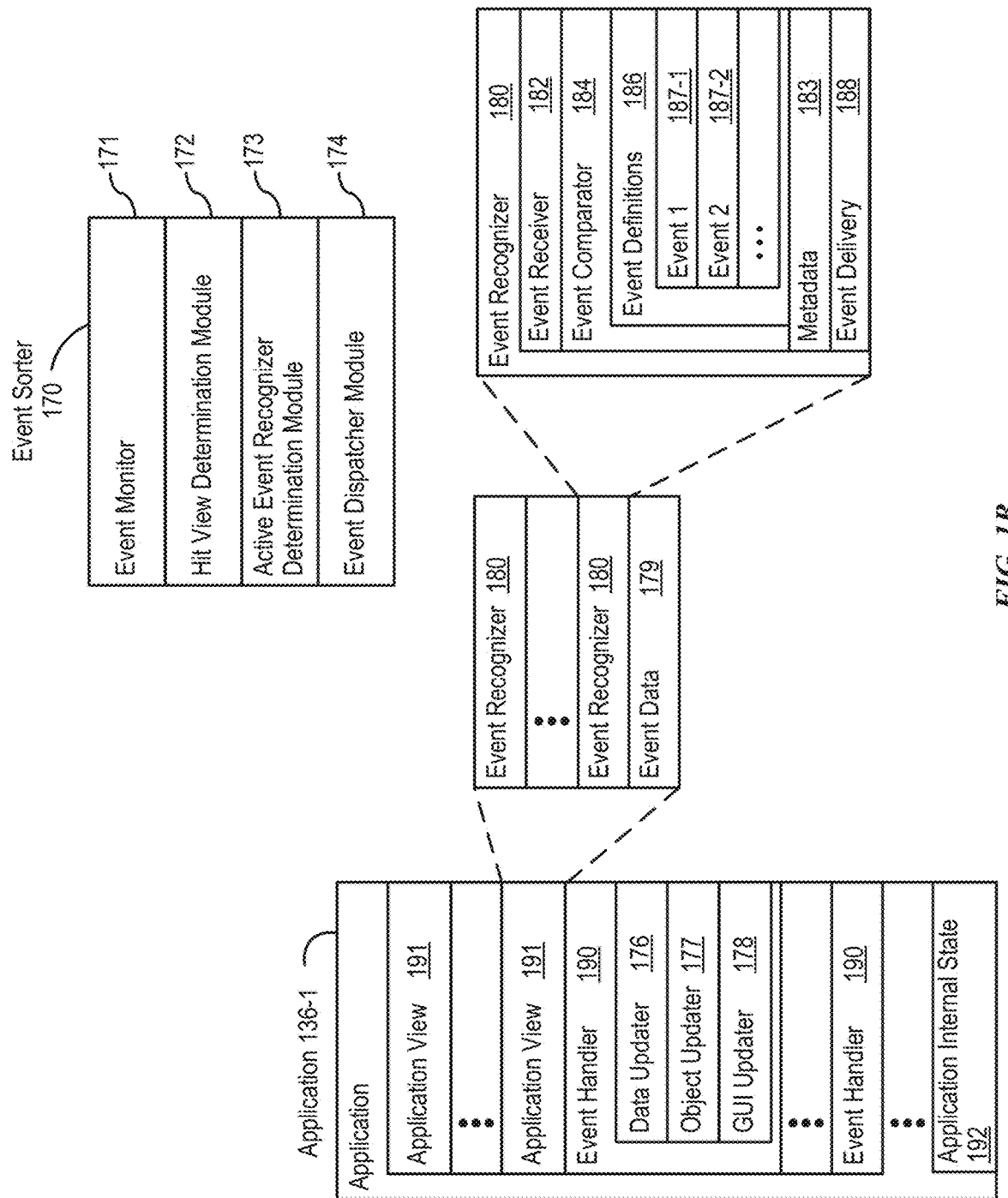
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
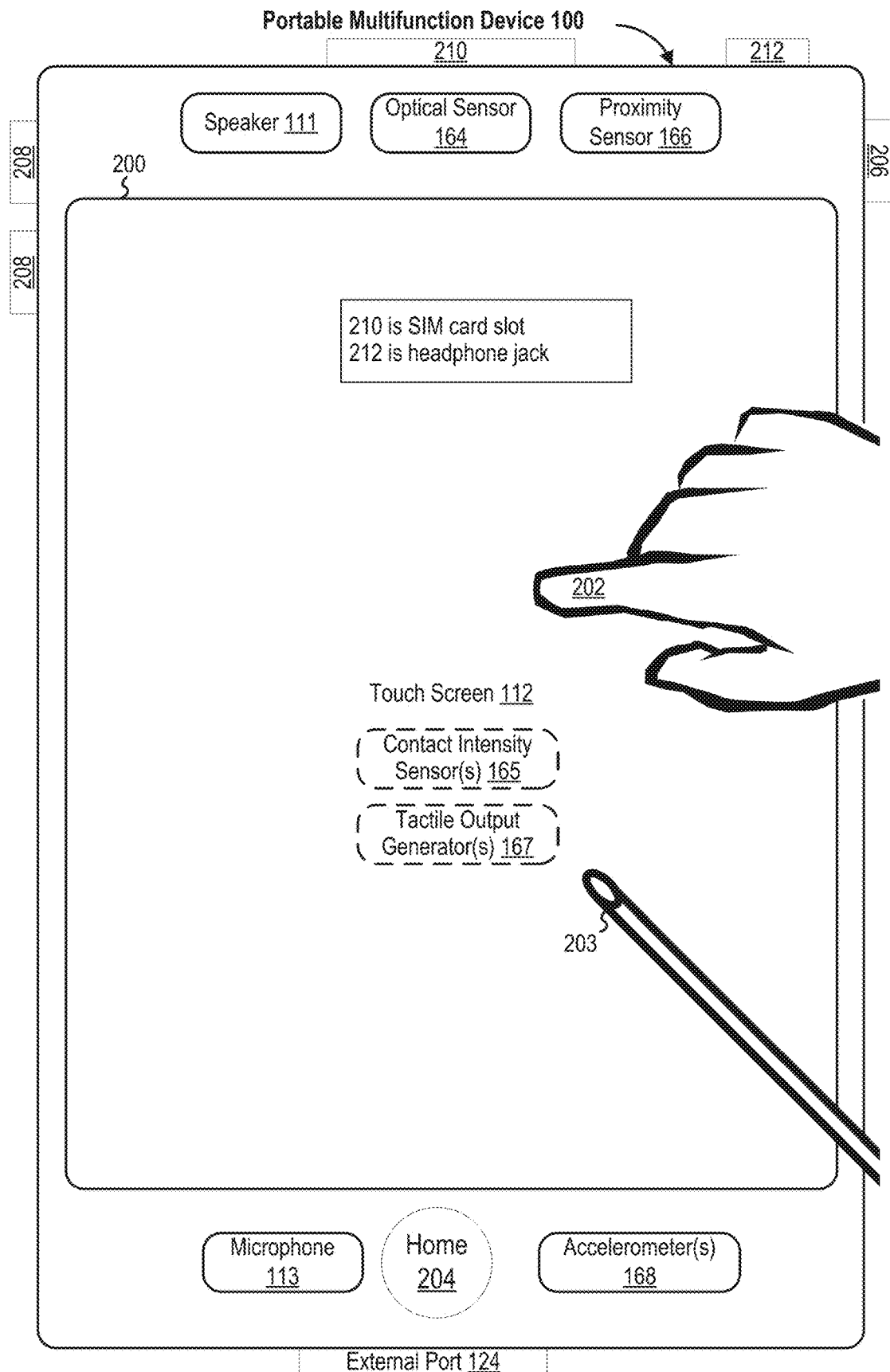
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
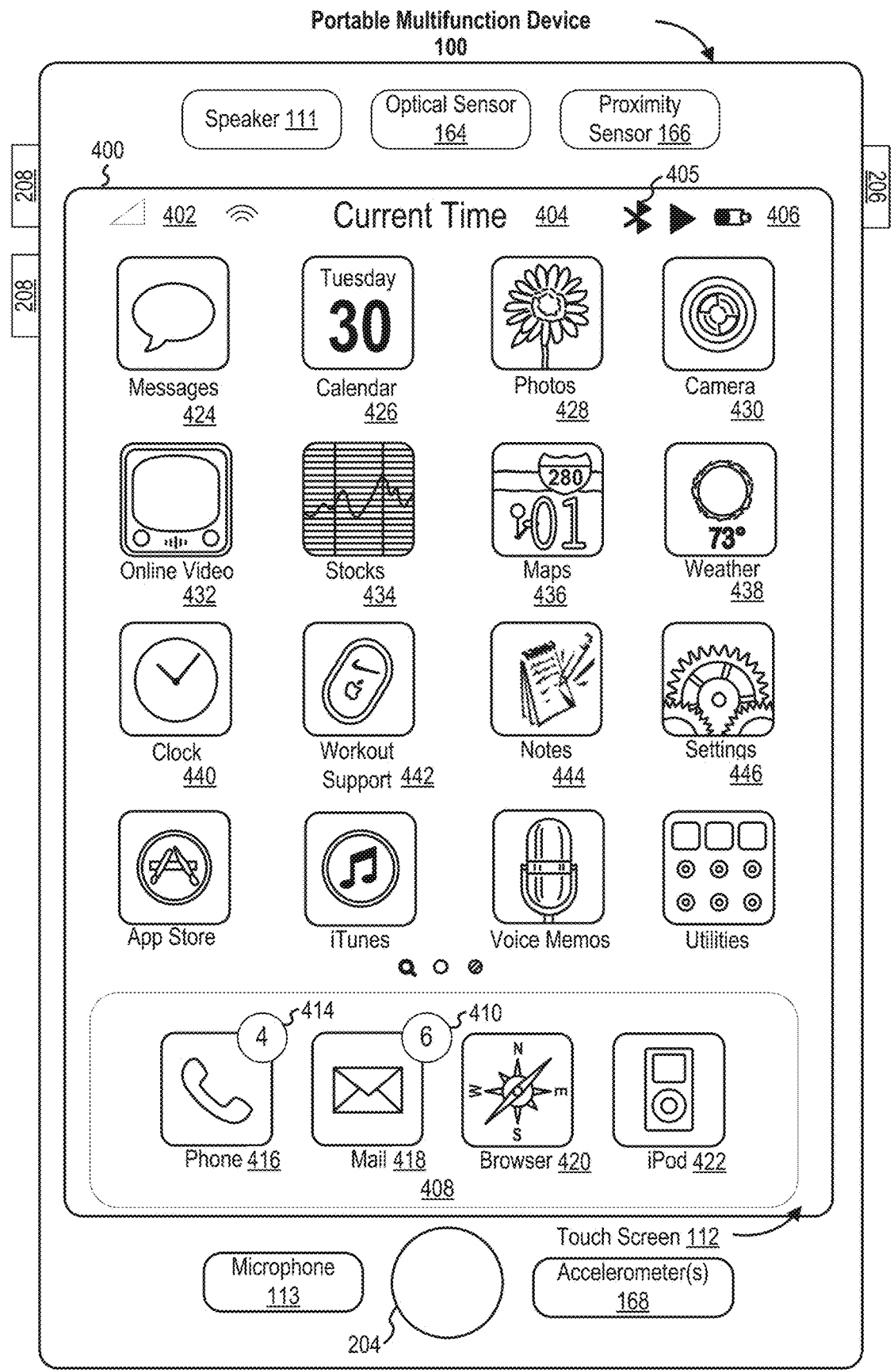
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
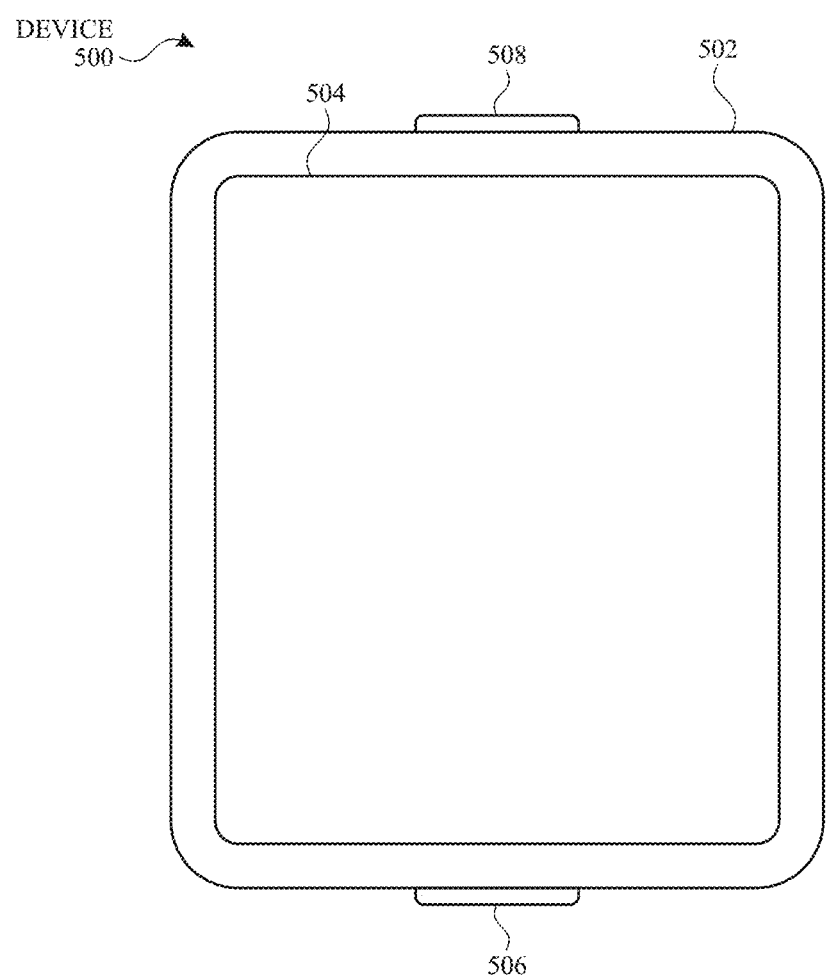
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
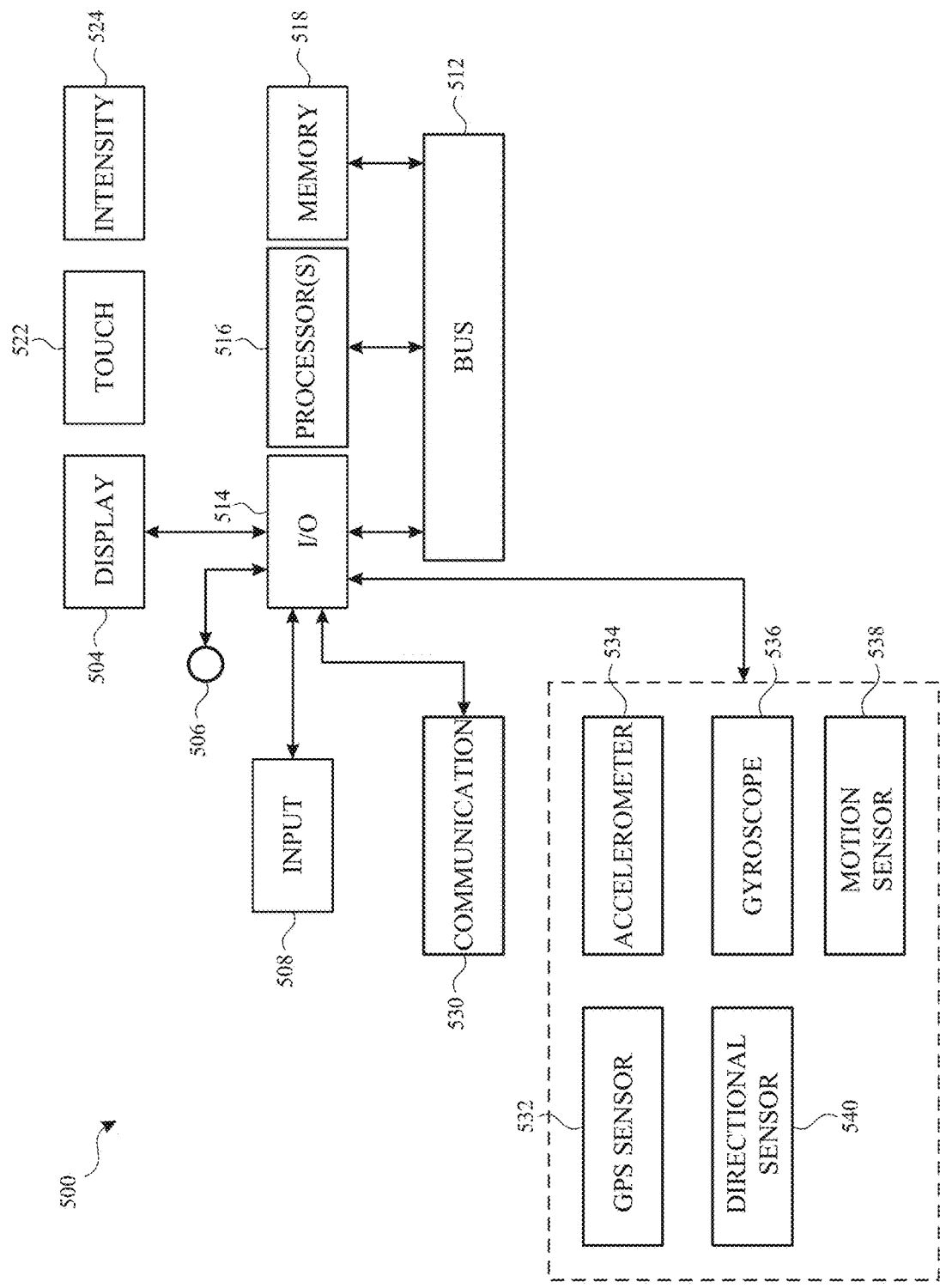
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including method 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
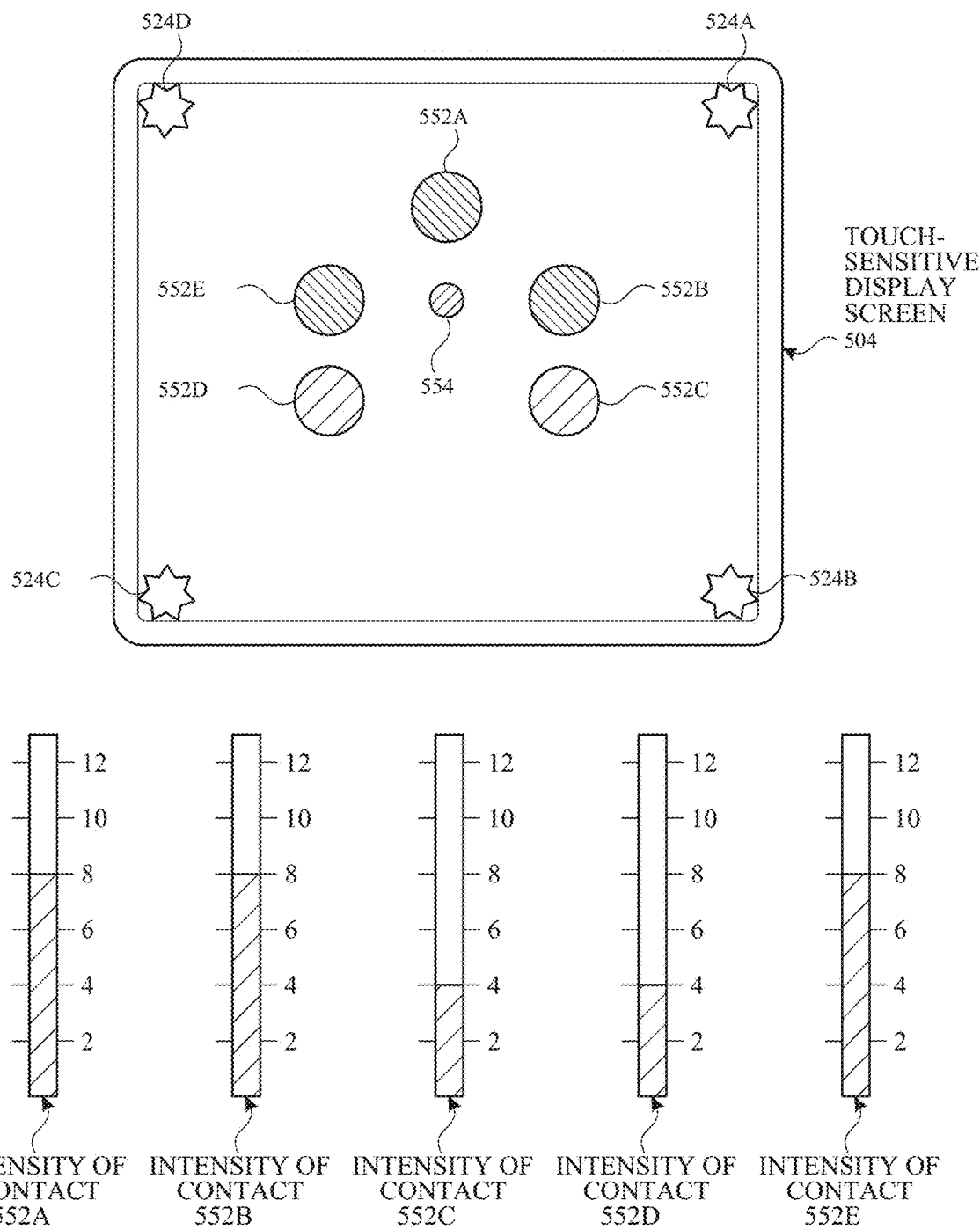

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Customizing Elements of a Graphical Object

Users interact with electronic devices in many different manners, including entering text into the electronic device. In some embodiments, an electronic device provides a virtual keyboard (e.g., soft keyboard) which mimics the layout of a physical keyboard and allows a user to select the characters (e.g., letters) to input. In some embodiments, the virtual keyboard includes an emoji keyboard for selecting and inserting emojis (and other graphical objects). In some embodiments, a device can provide user interfaces for customizing and inserting emojis with multiple customizable elements, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
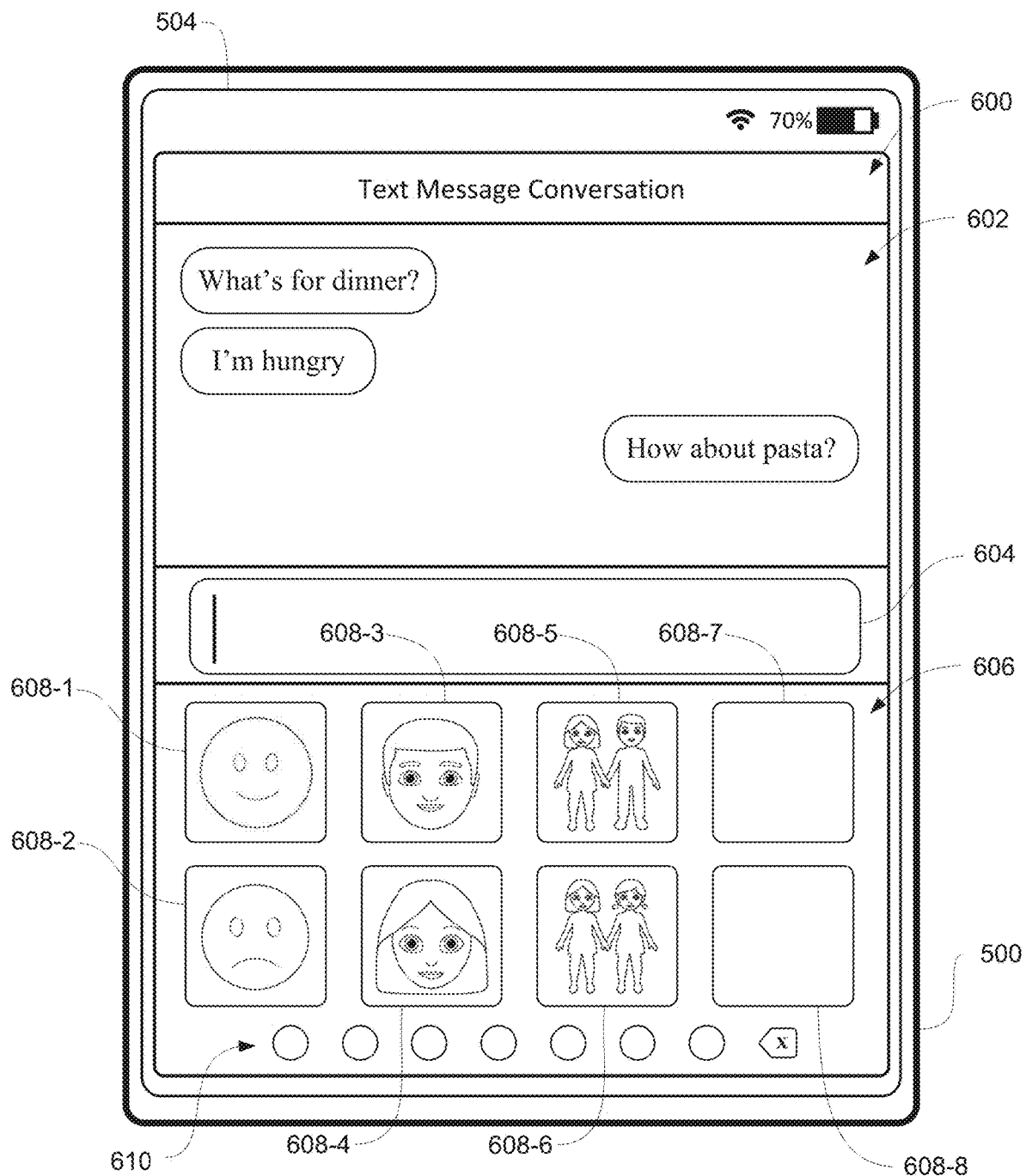
FIGS. 6A-6XX illustrate exemplary ways in which an electronic device presents a customization user interface for customizing and inserting emojis in accordance with some embodiments of the disclosure.
Figure 6B:
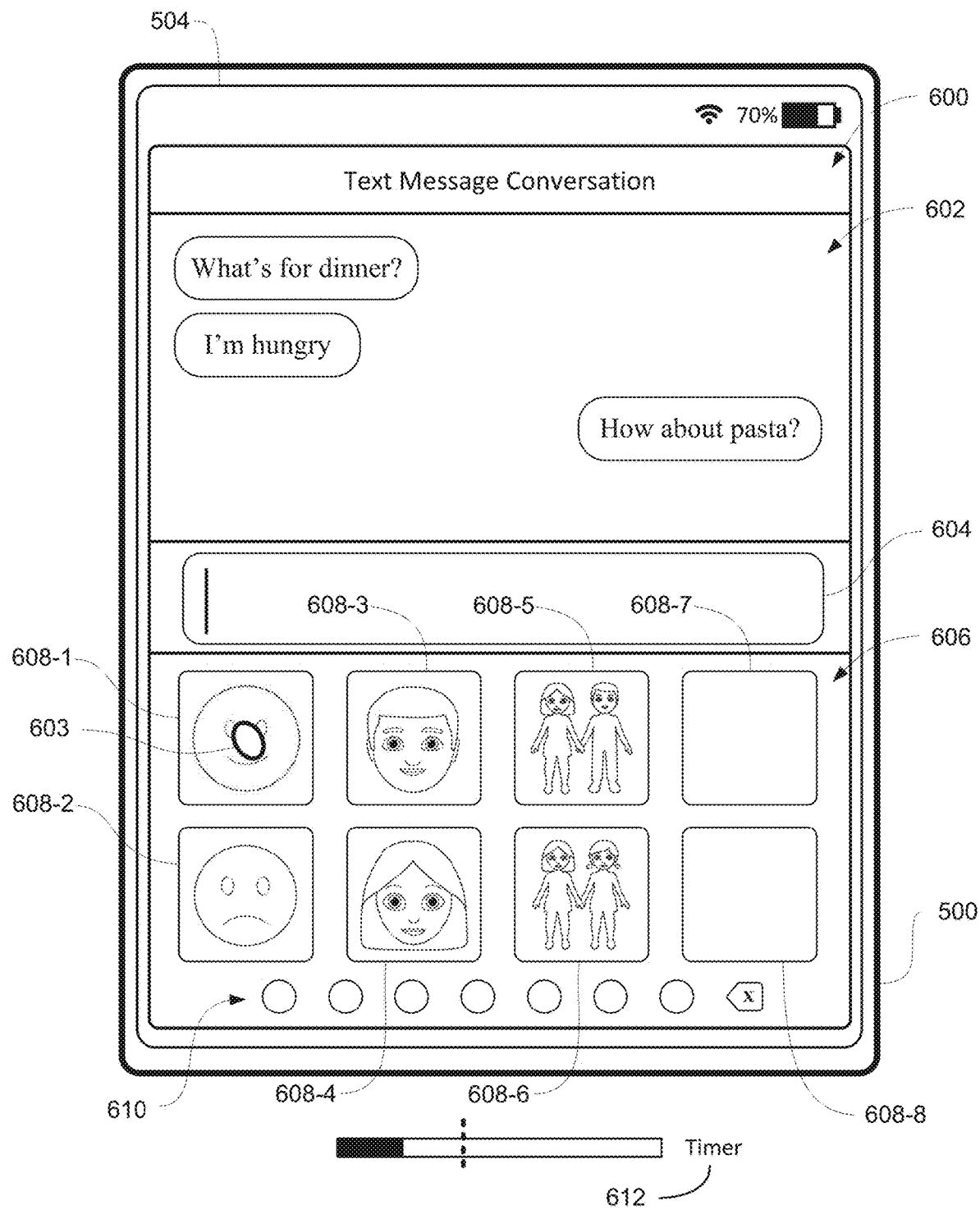
Figure 6C:
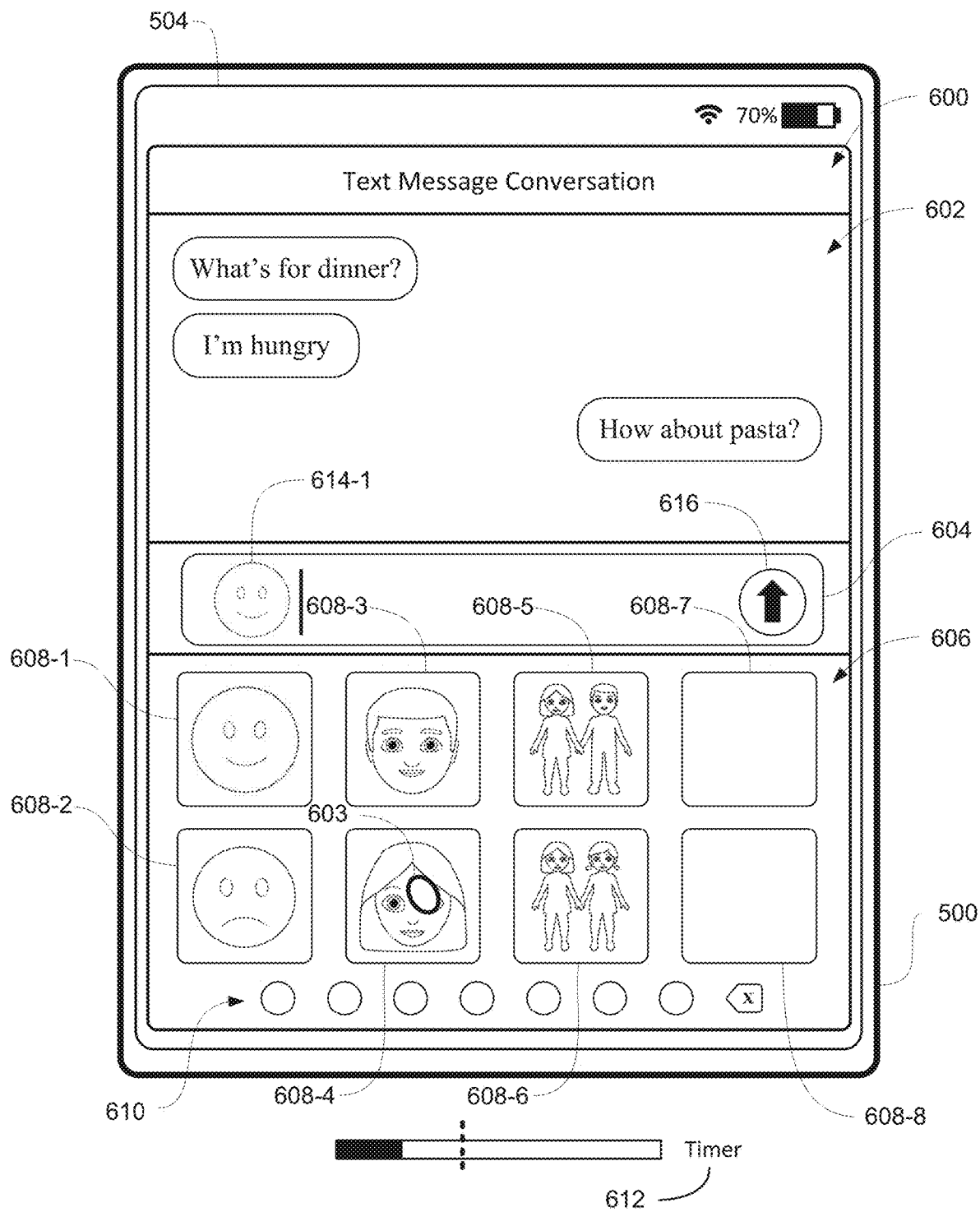
Figure 6D:
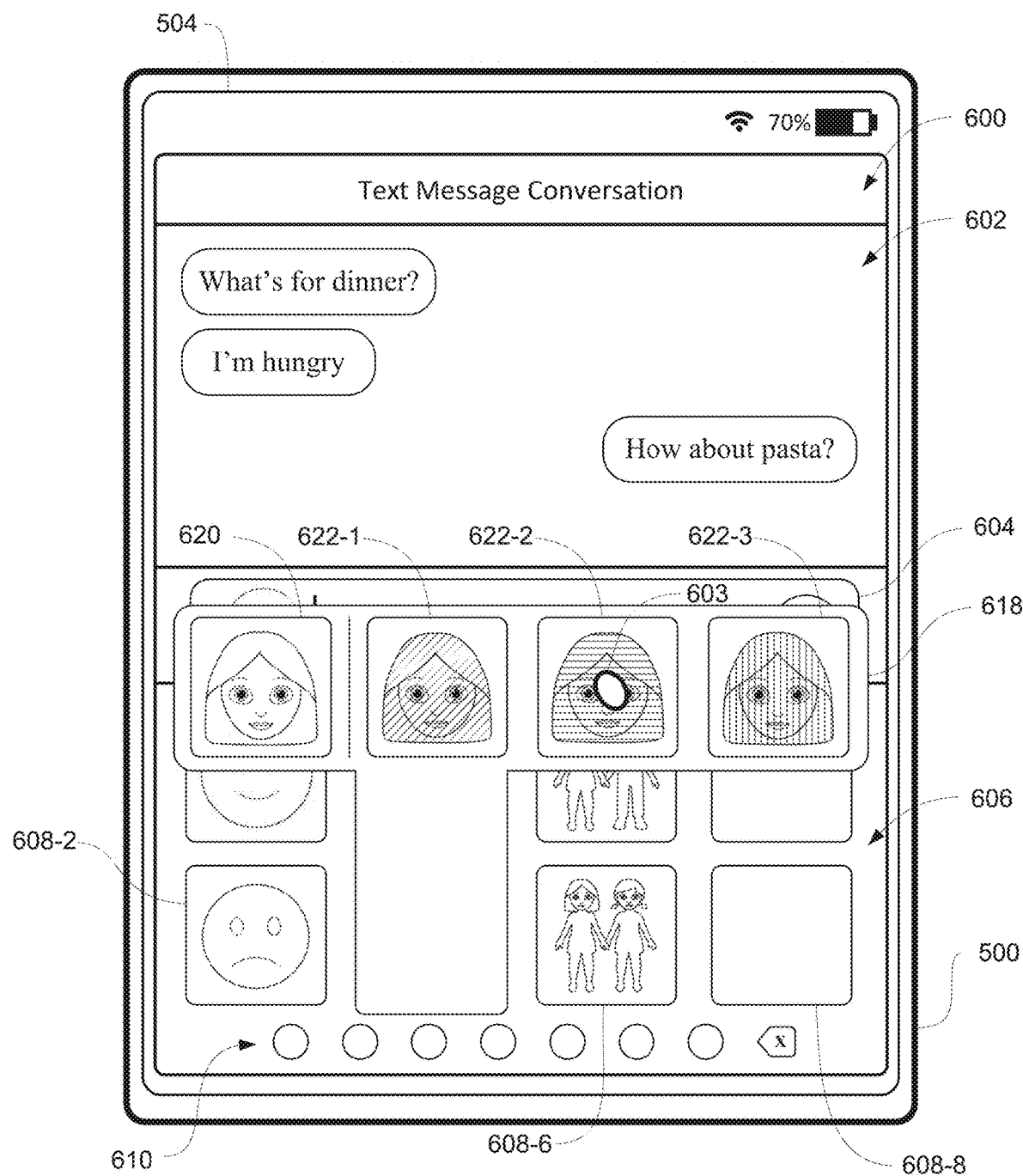
Figure 6E:
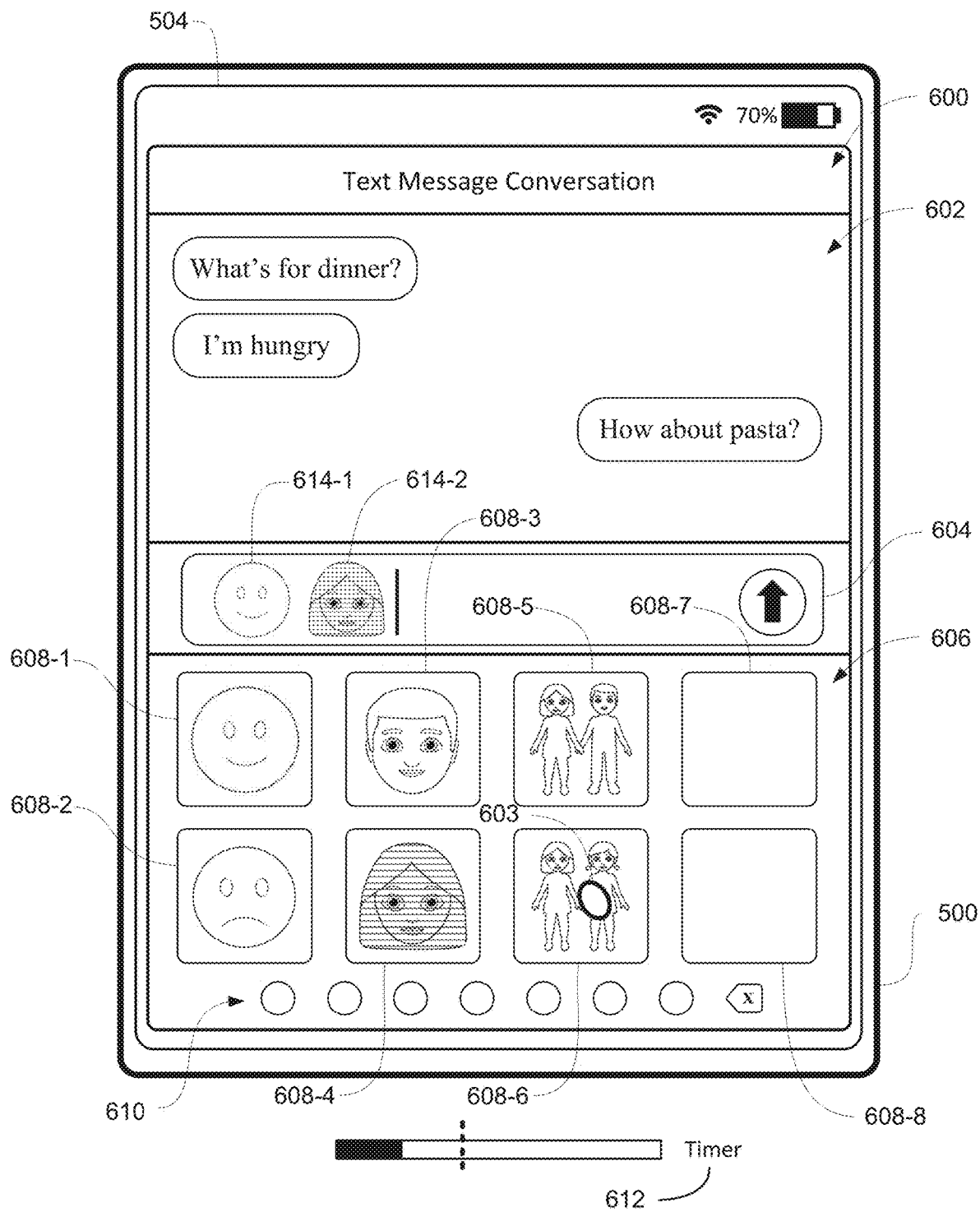
Figure 6F:
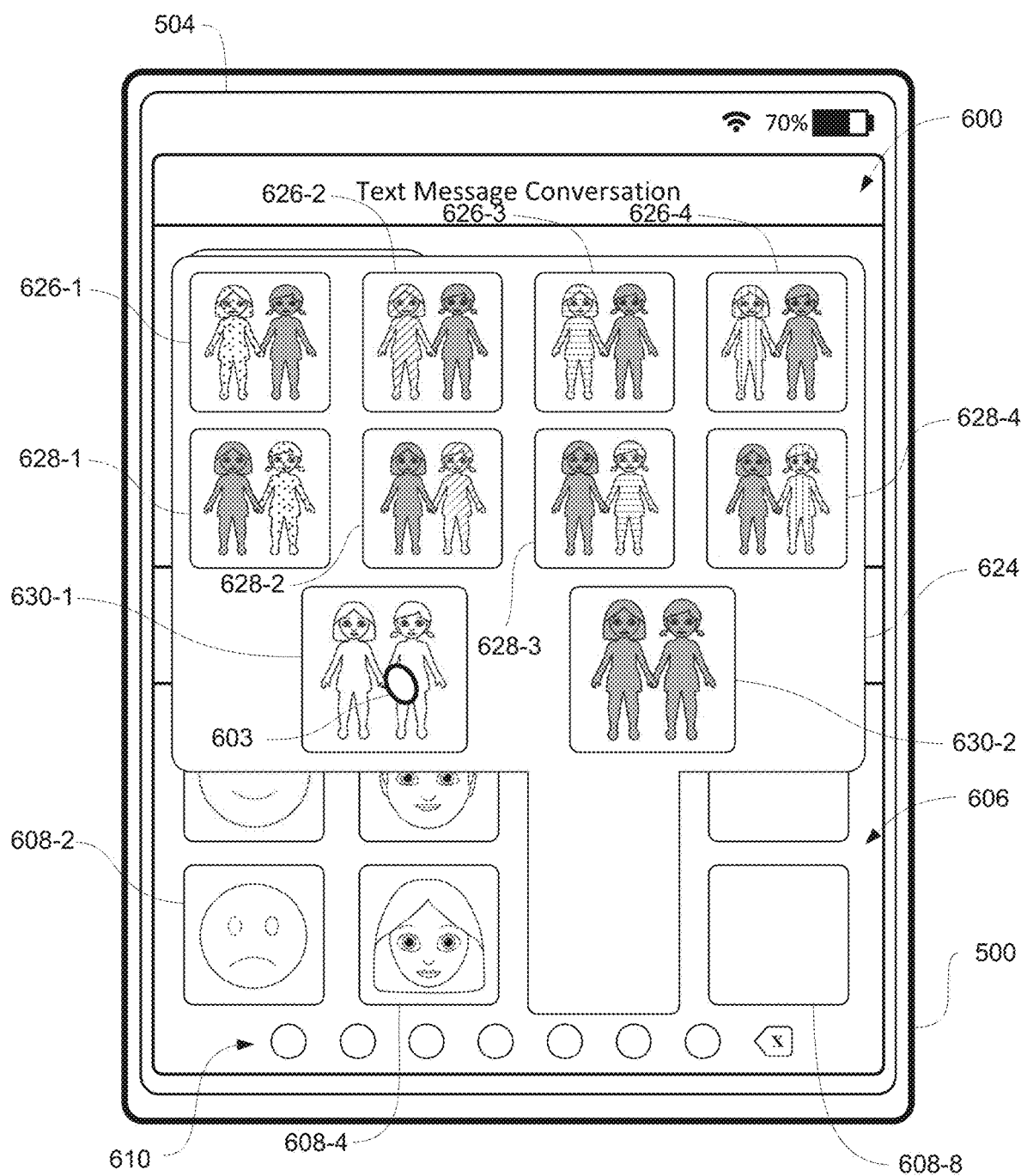
Figure 6G:
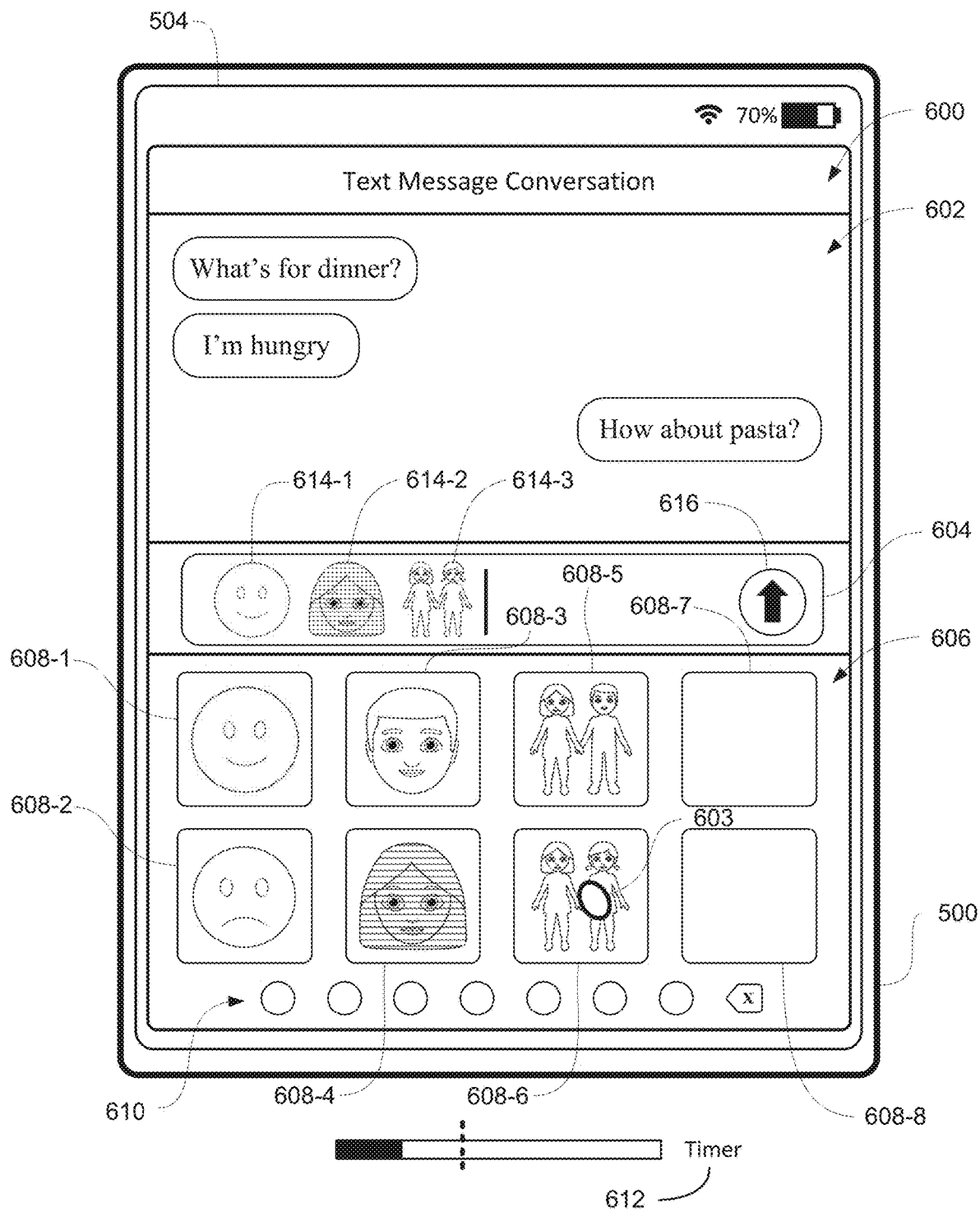
Figure 6H:
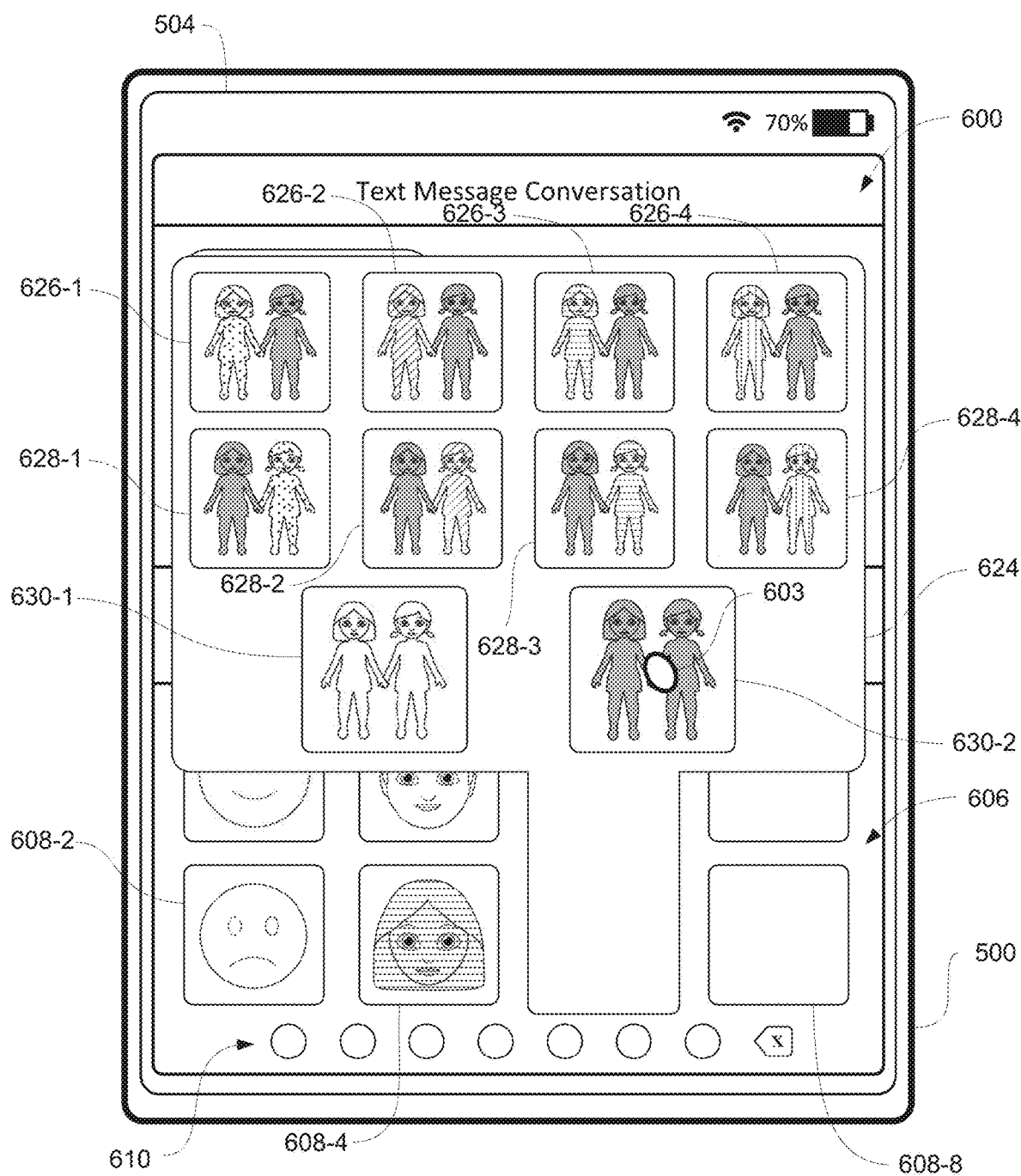
Figure 6I:
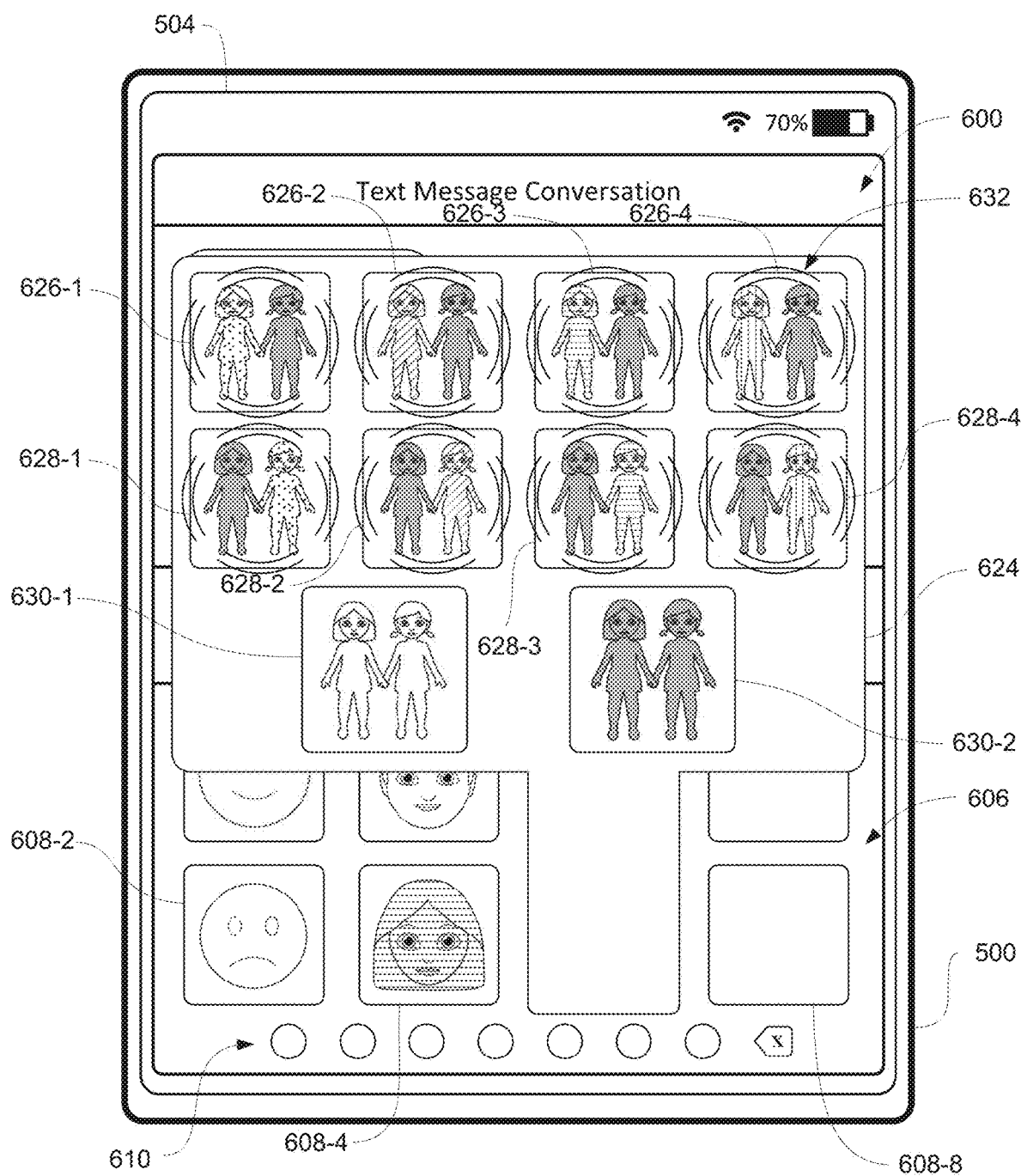
Figure 6J:
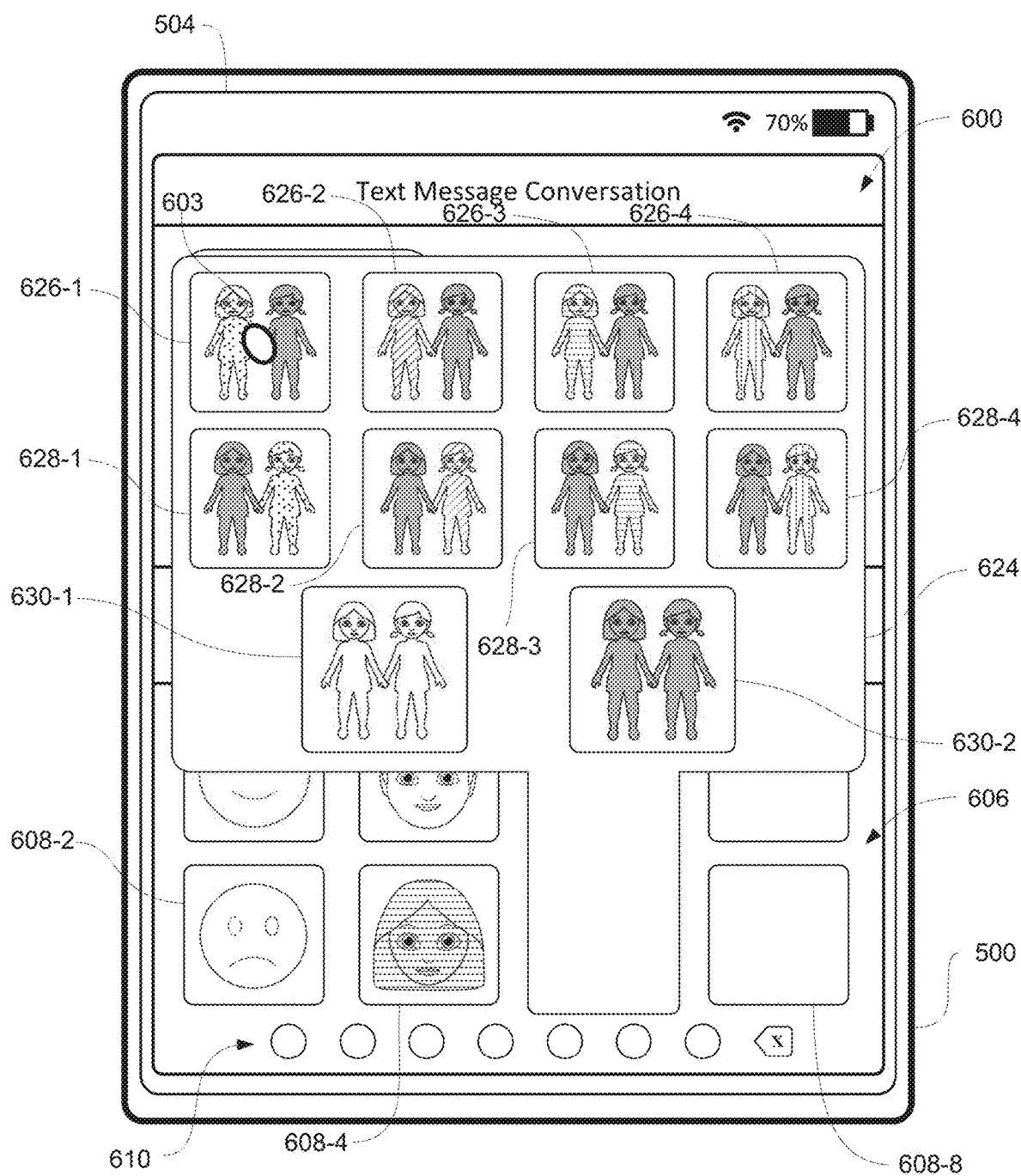
Figure 6K:
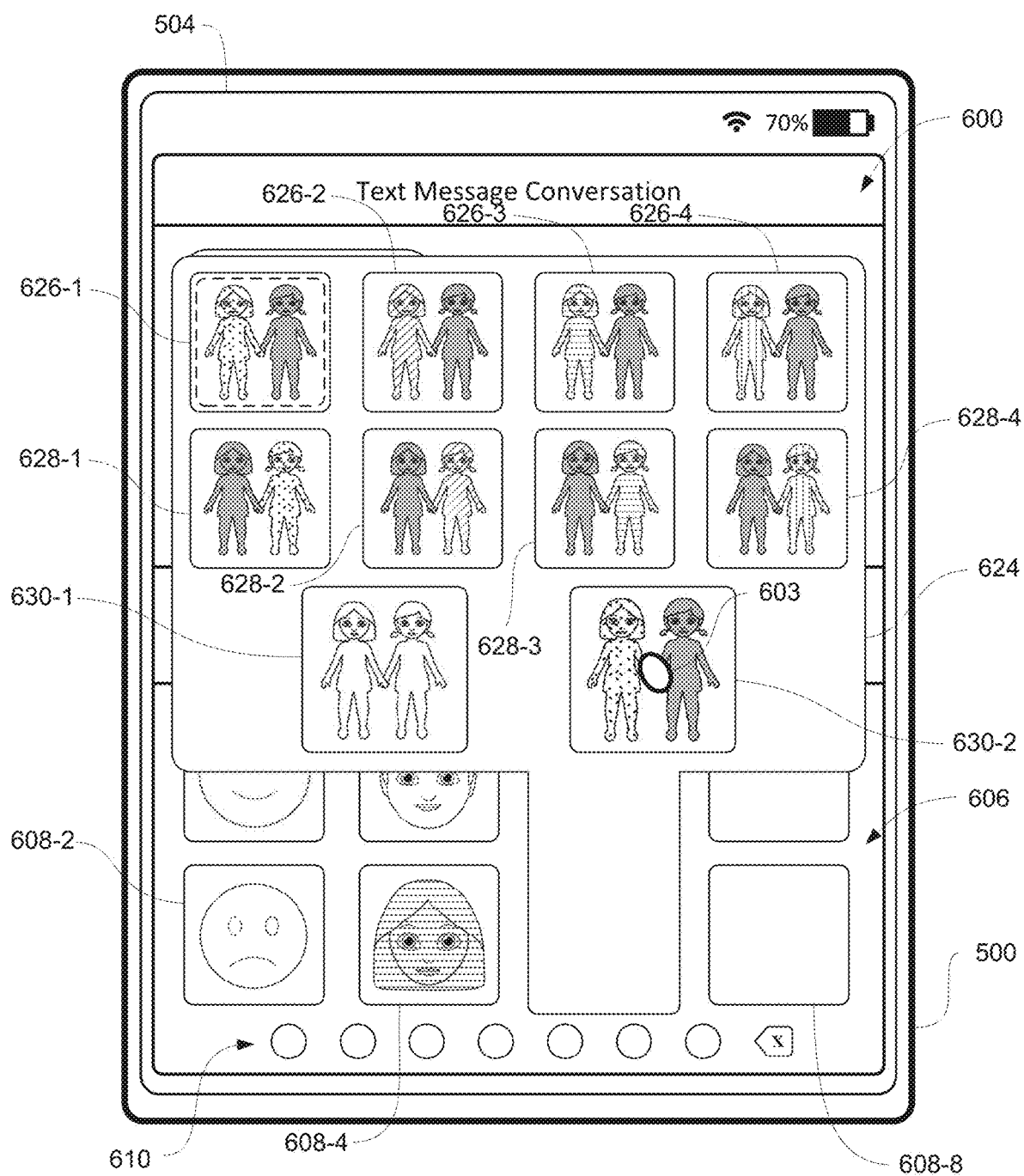
Figure 6L:
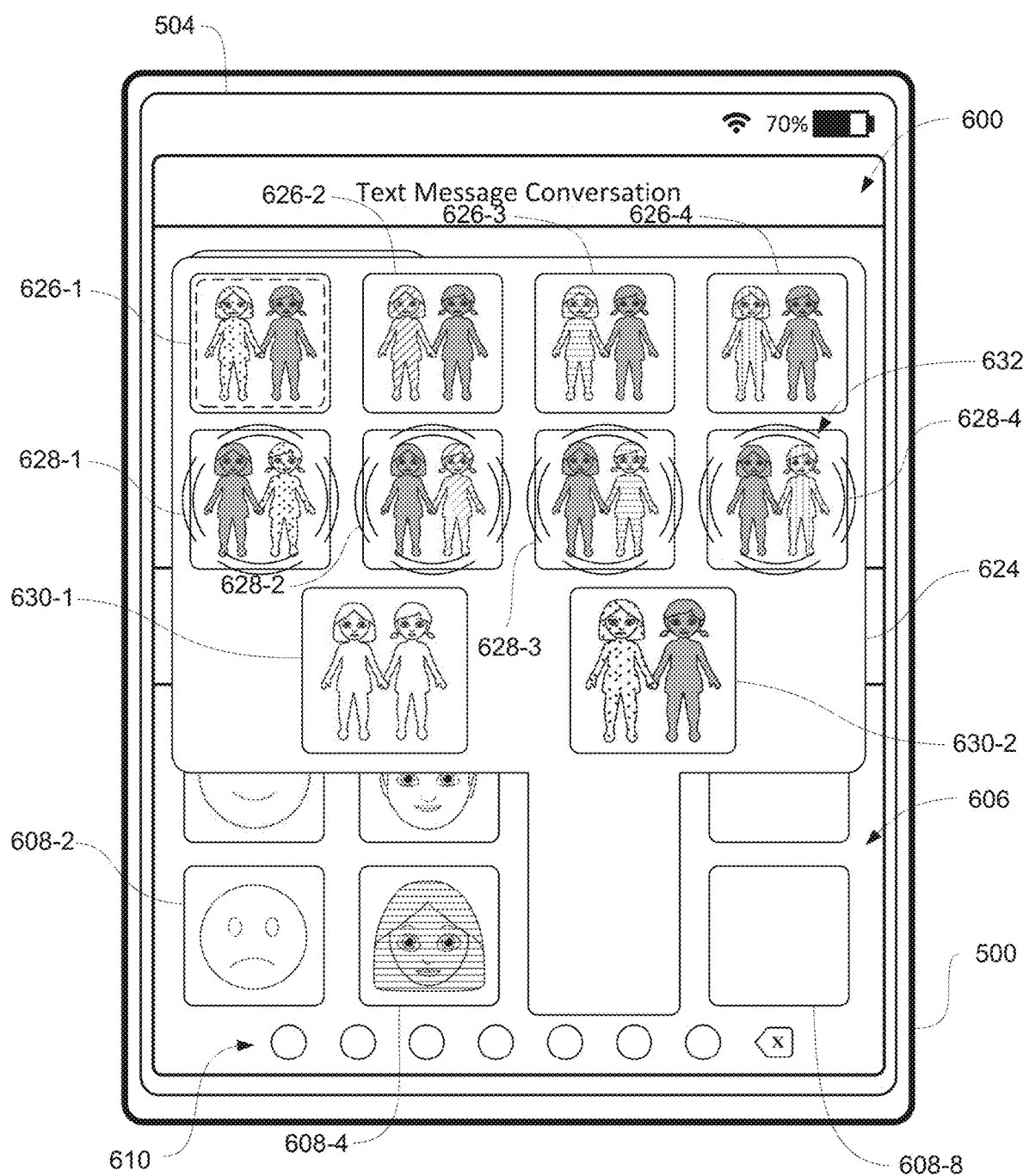
Figure 6M:
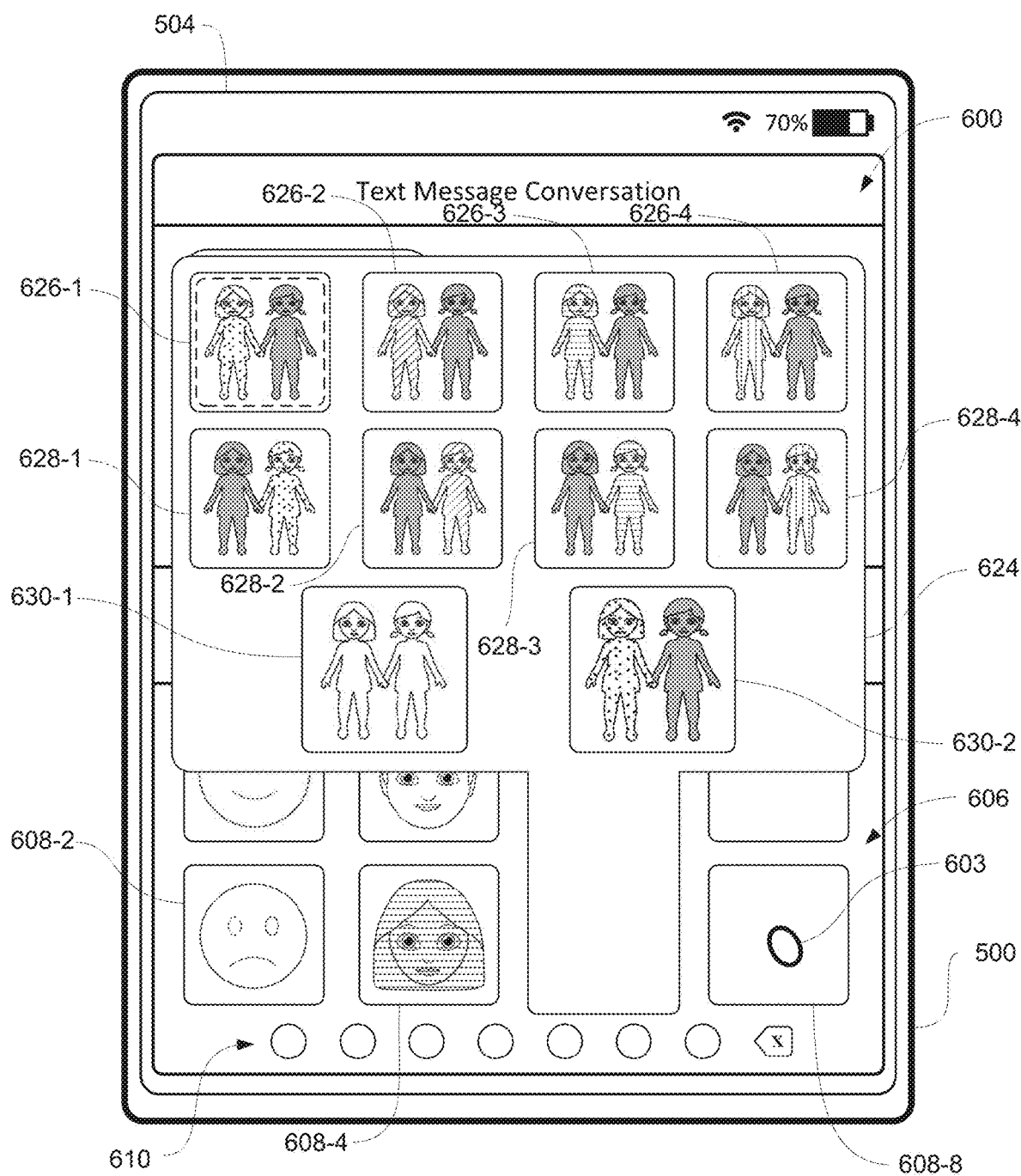
Figure 6N:
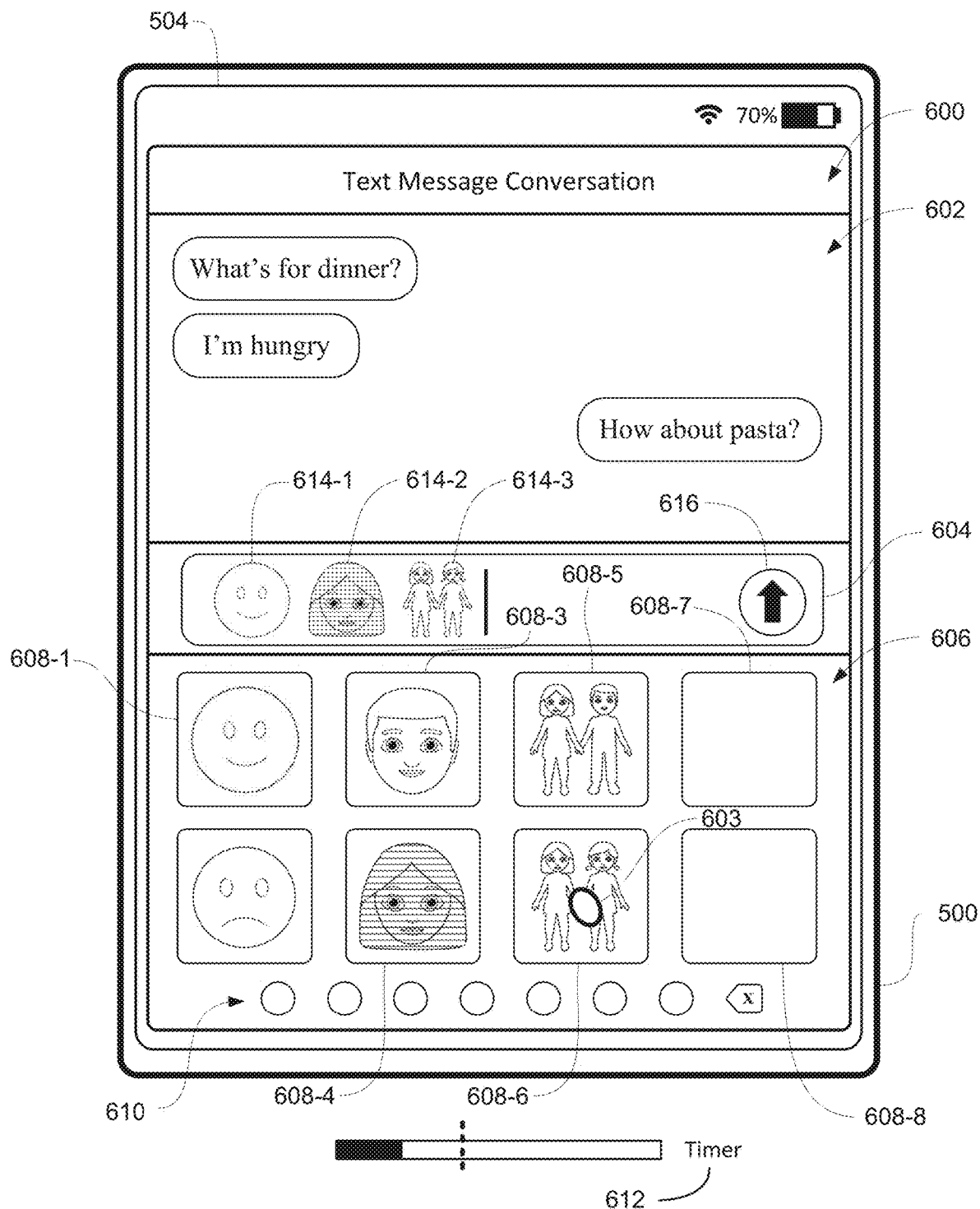
Figure 6O:
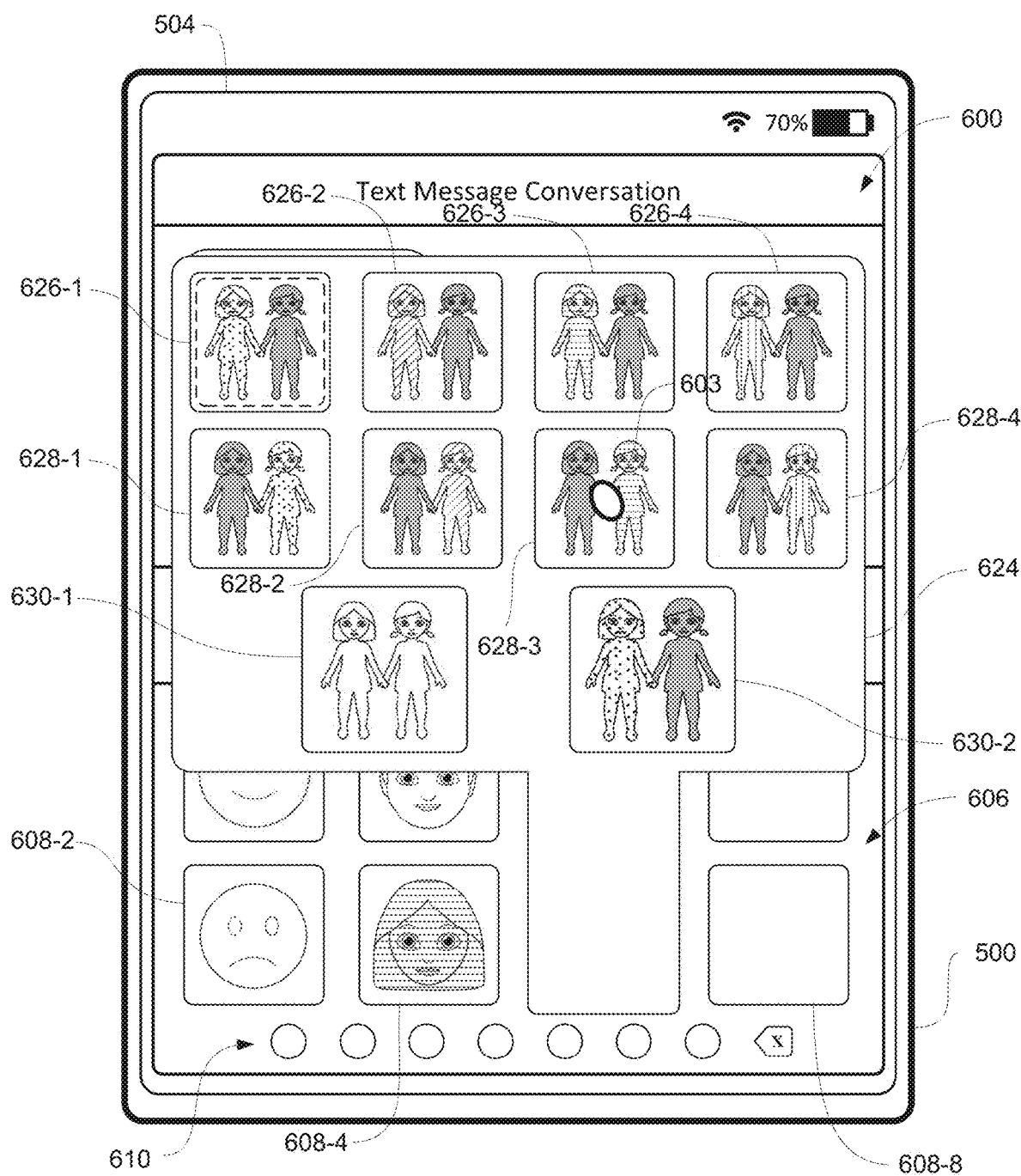
Figure 6P:
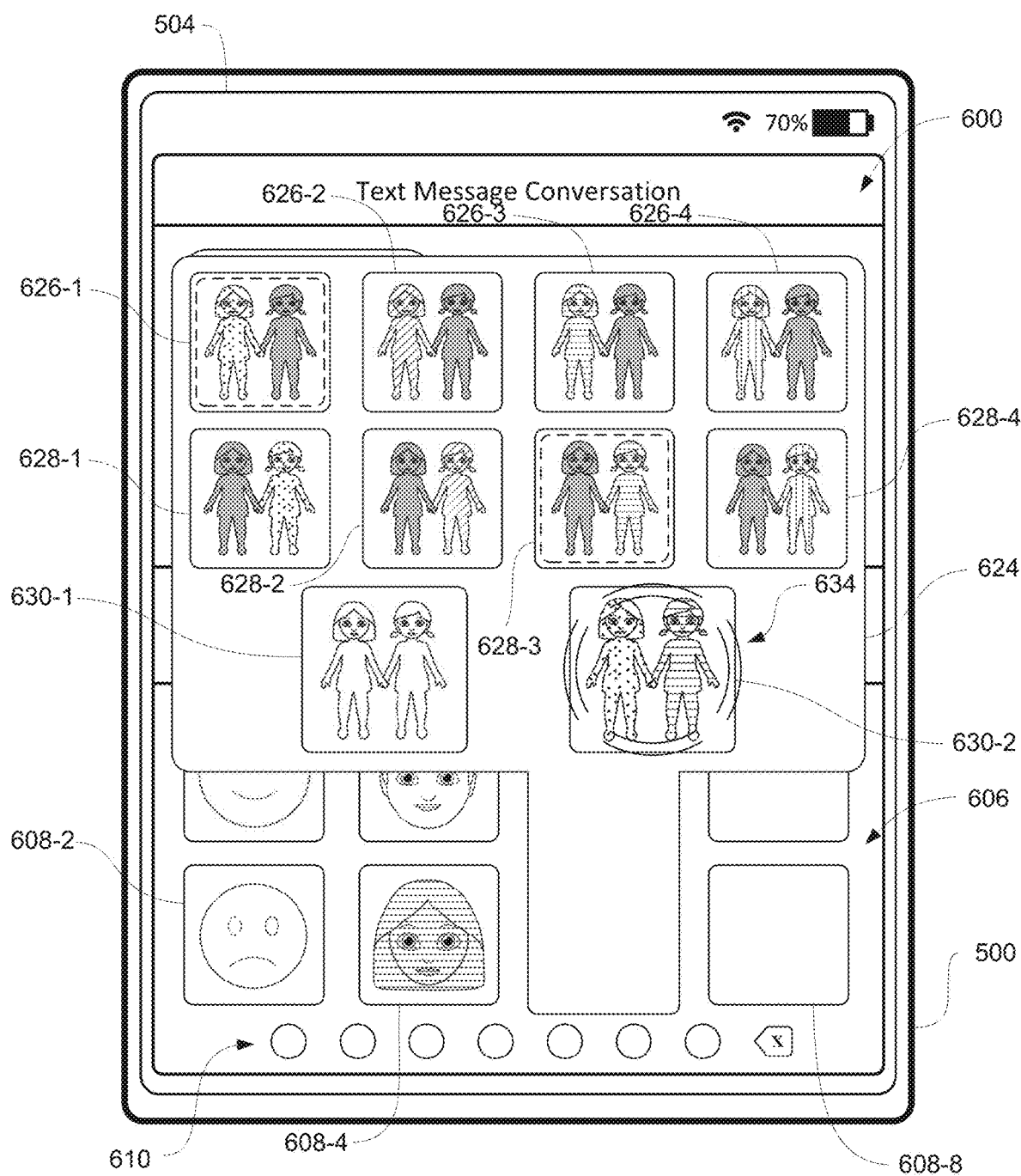
Figure 6Q:
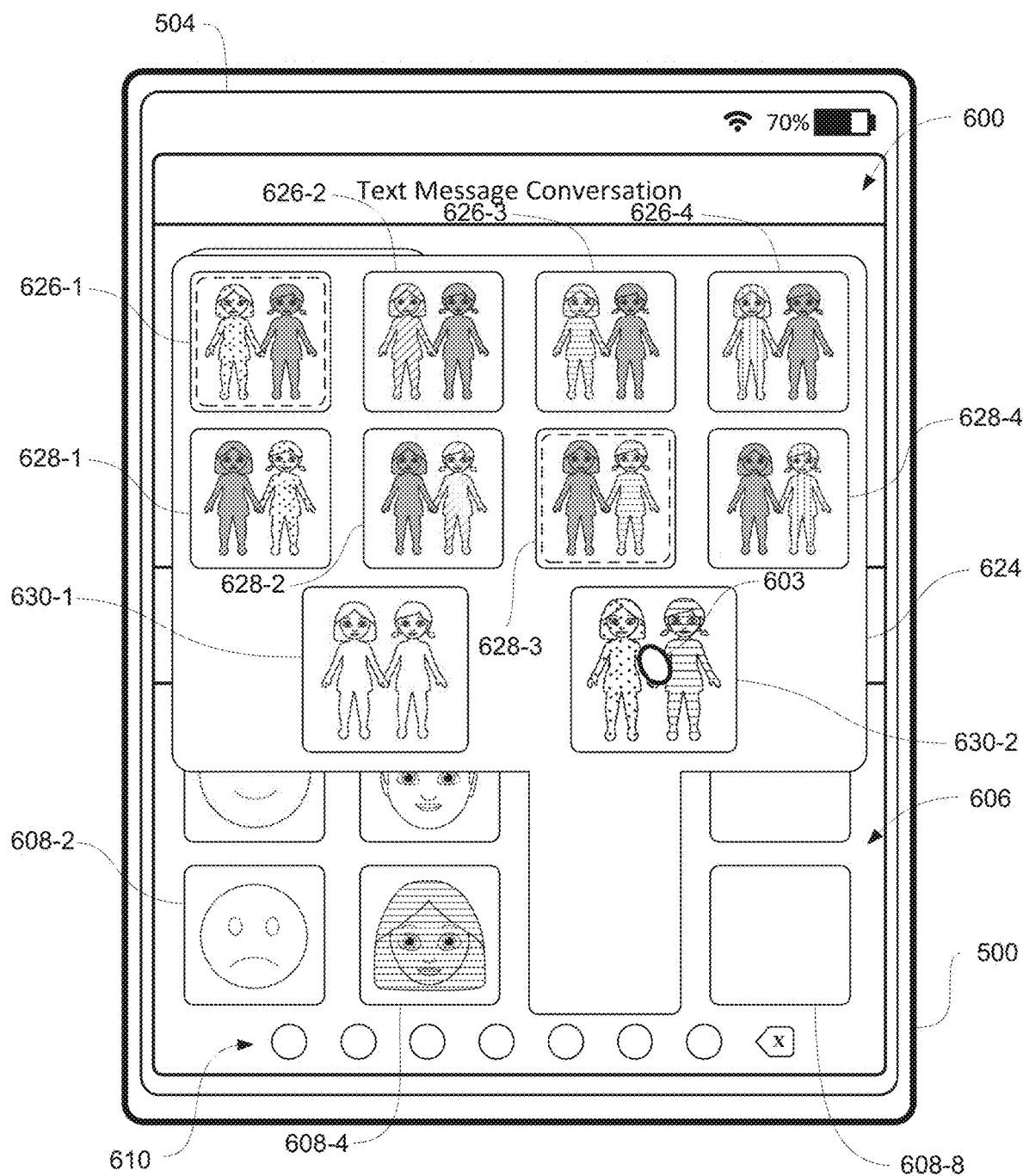
Figure 6R:
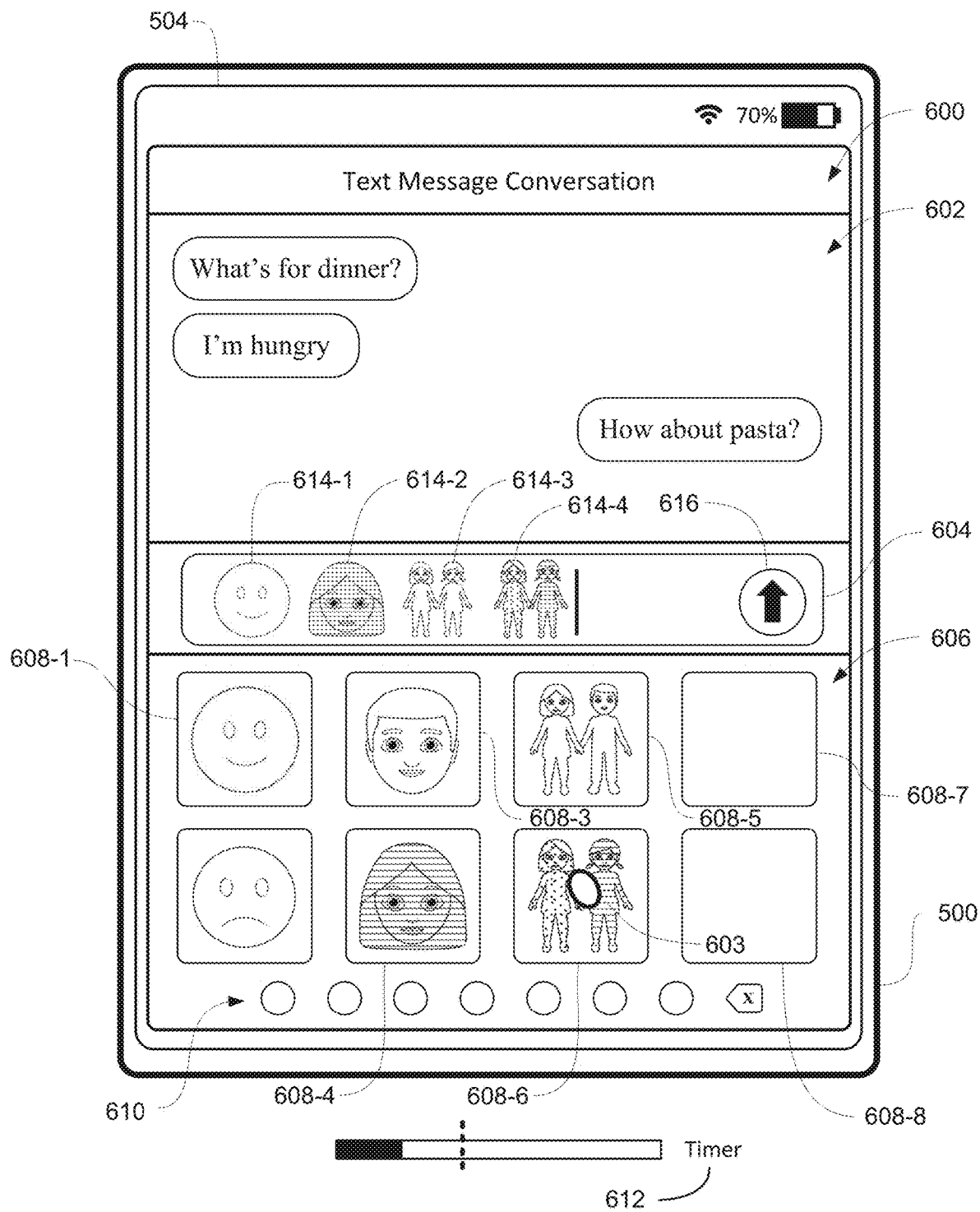
Figure 6S:
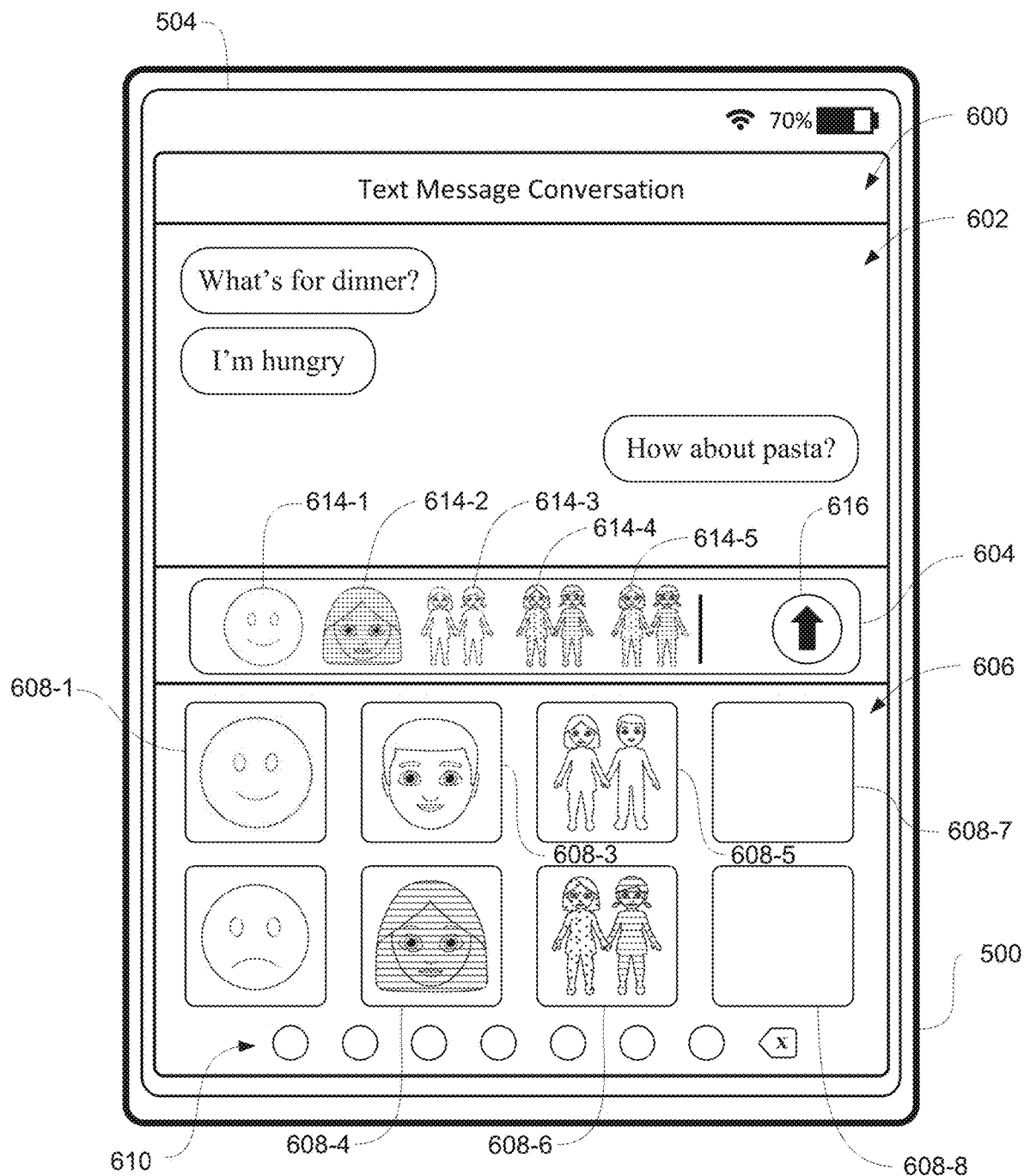
Figure 6T:
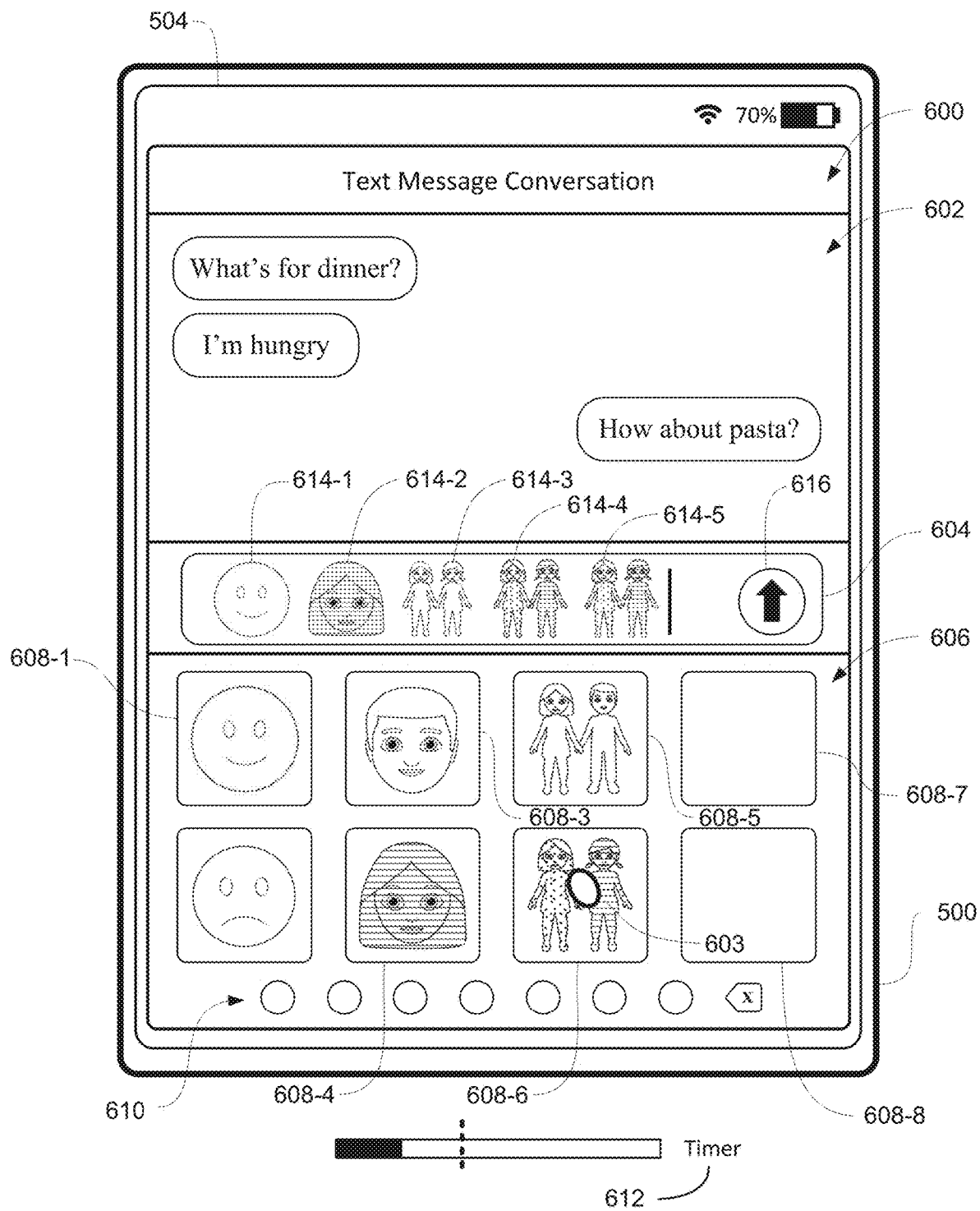
Figure 6U:
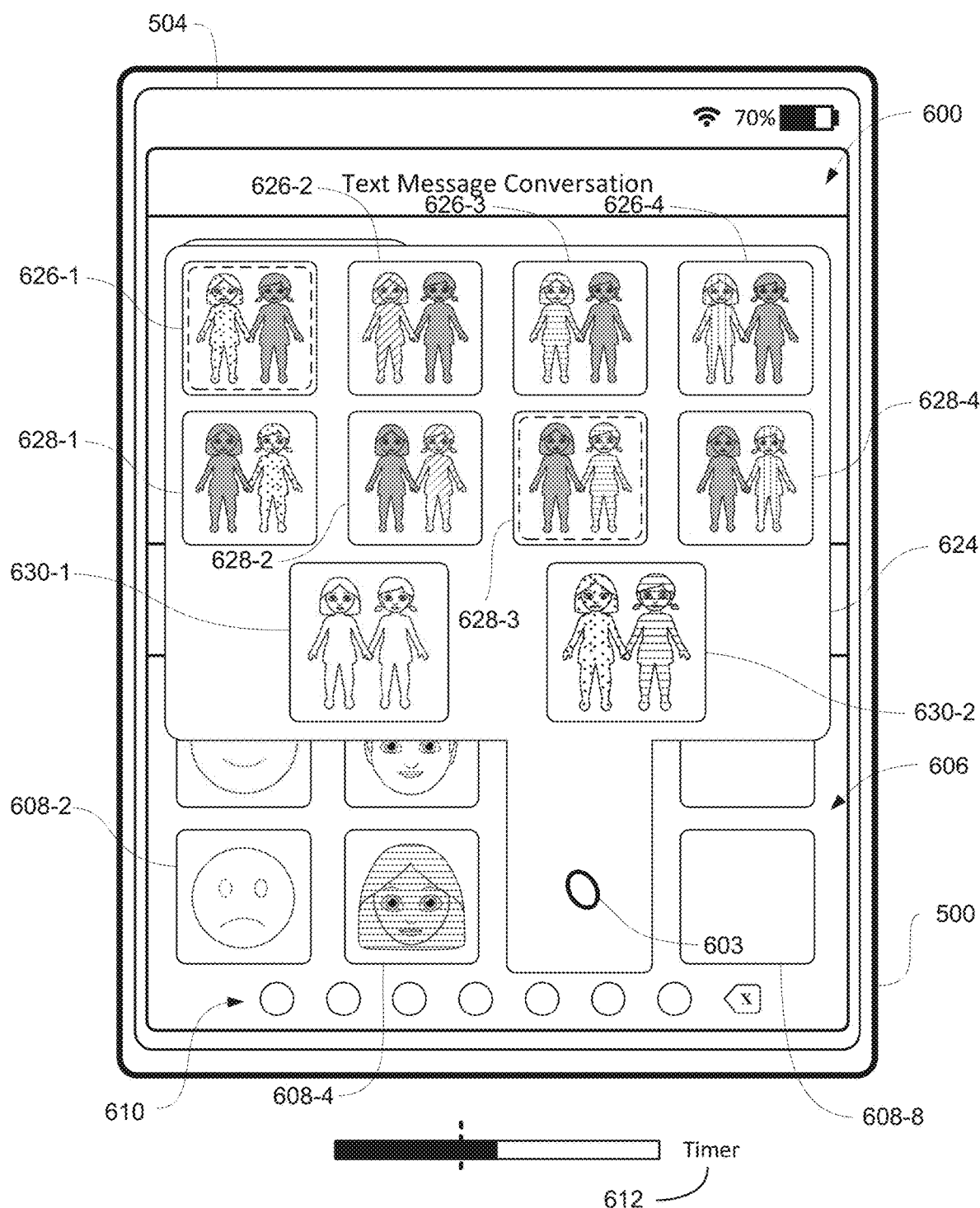
Figure 6V:
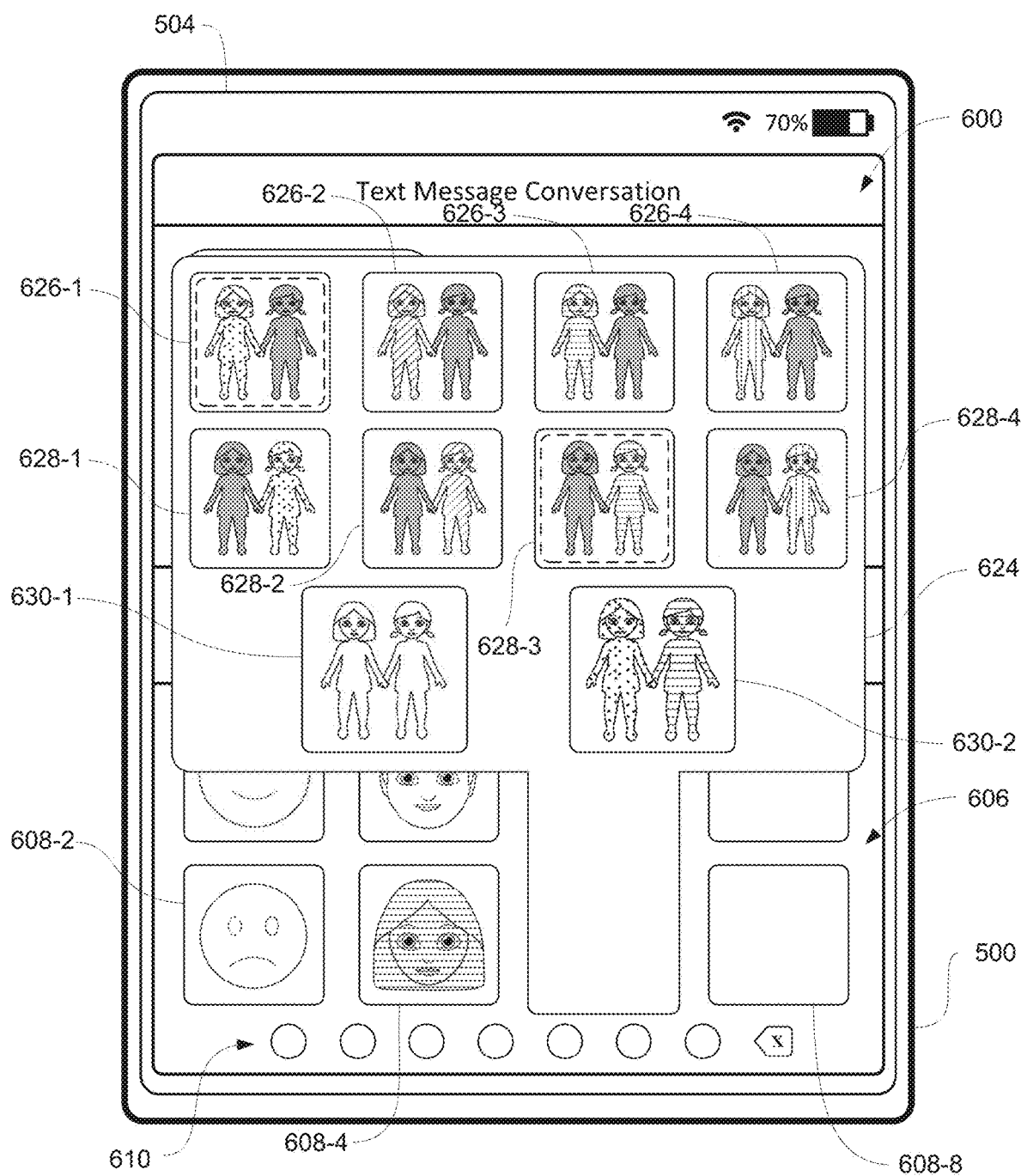
Figure 6W:
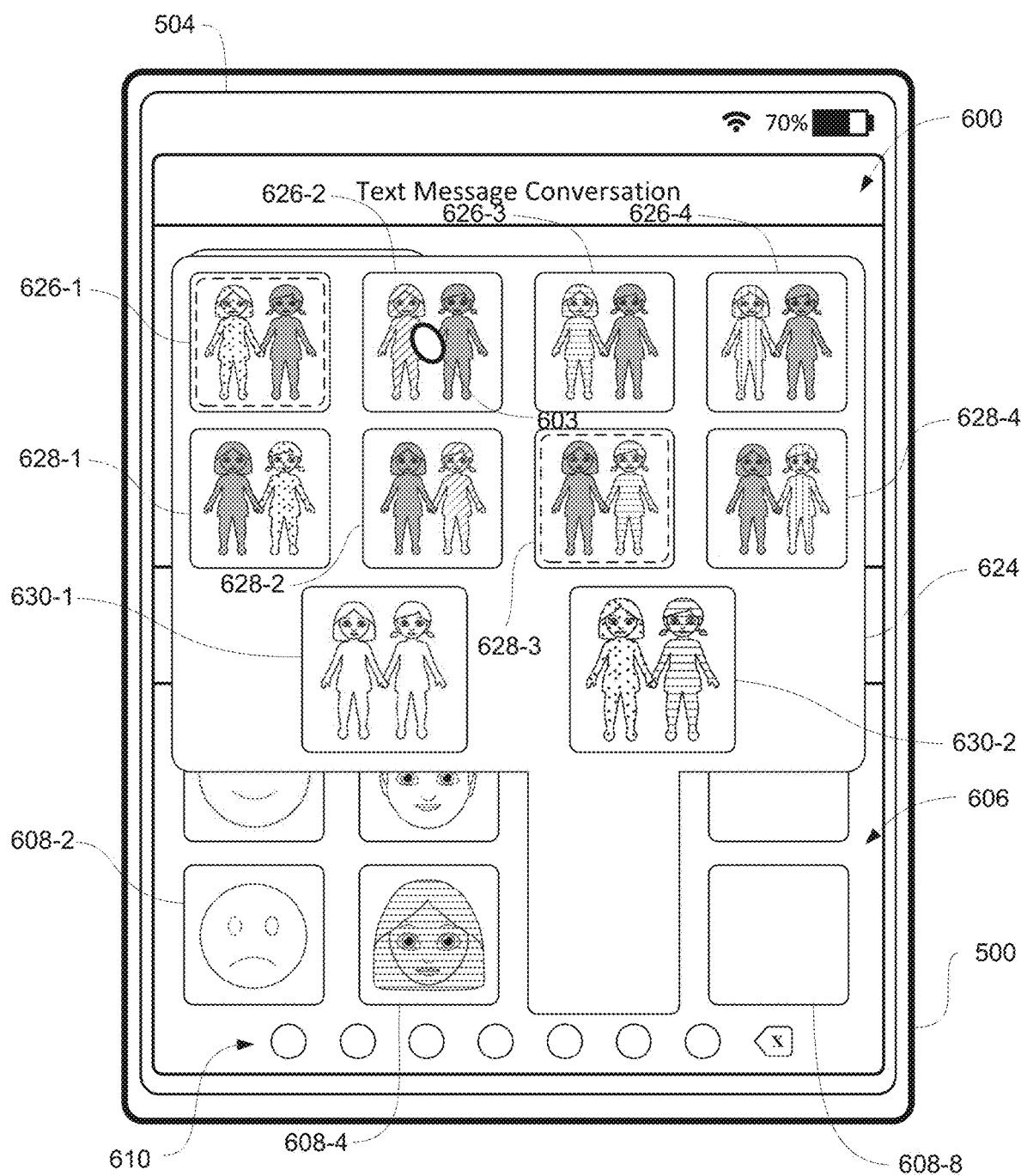
Figure 6X:
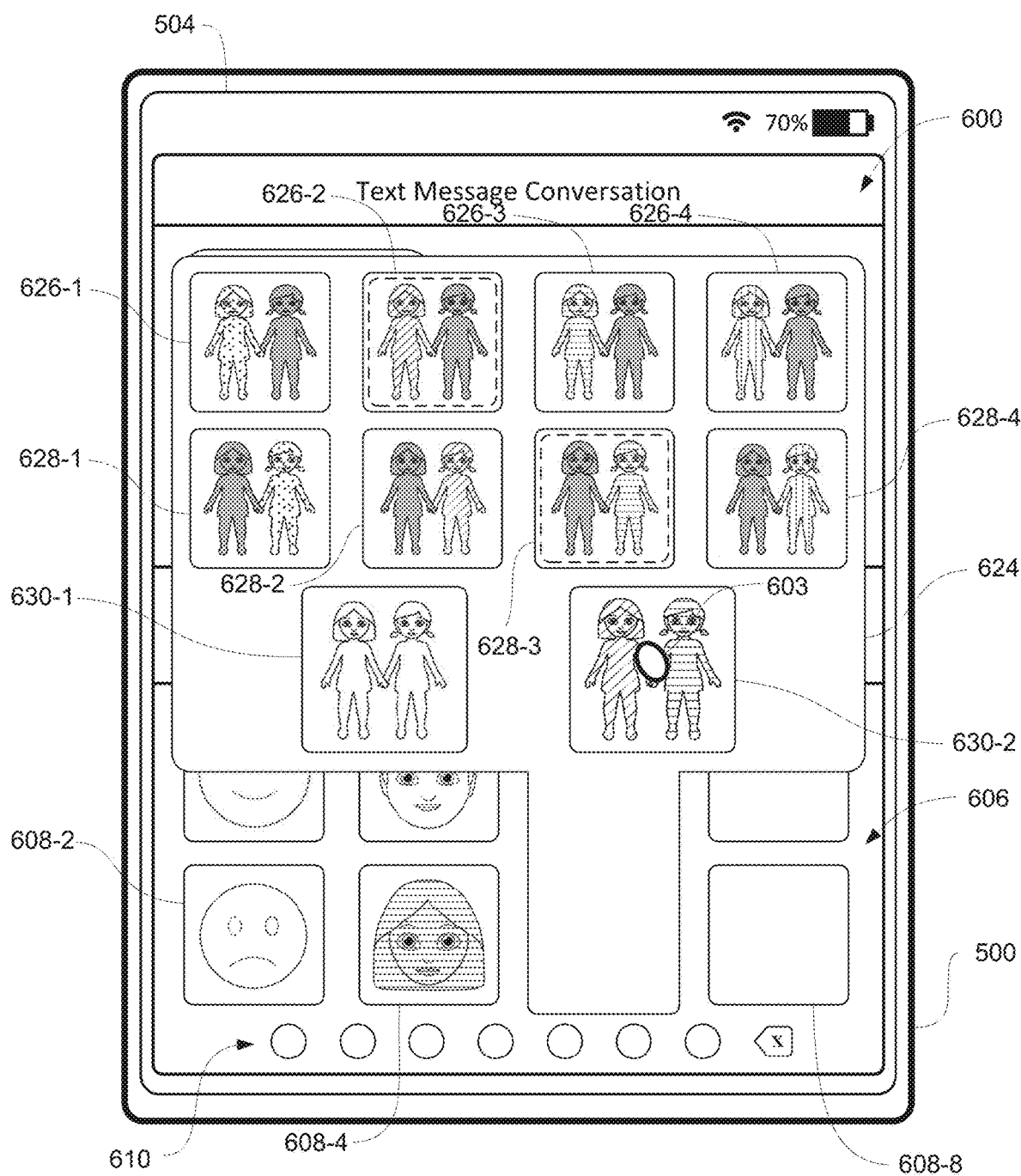

FIGS. 6A-6XX illustrate exemplary ways in which an electronic device presents a customization user interface for customizing and inserting graphical objects such as emojis. The embodiments in these figures are used to illustrate the processes described below, including the processes described with reference to FIGS. 7A-7M.

FIG. 6A illustrates an exemplary device 500 that includes touch screen 504. As shown in FIG. 6A, the electronic device 500 displays user interface 600. In some embodiments, user interface 600 is any user interface that includes one or more text entry fields (e.g., text entry regions). In some embodiments, a text entry field (e.g., text entry region) is a user interface element in which a user is able to enter text (e.g., letters, characters, words, etc.). For example, a text entry field can be a text field in an application, a text field on a form, the URL entry element in a browser, login fields, etc. It is understood that a text entry field (e.g., a text entry region) is not limited to a user interface element that only accepts text, but one that is also able to accept and display audio and/or visual media and/or any other type of visual or graphical object.

In FIG. 6A, user interface 600 is of a text messaging application that is displaying a text message conversation. In some embodiments, user interface 600 includes conversation region 602, text entry region 604, and virtual keyboard 606. In some embodiments, virtual keyboard 606 is displayed in response to a user input requesting display of virtual keyboard 606. In some embodiments, virtual keyboard 606 is a user interface element with a plurality of selectable options for inserting objects (e.g., text, emojis, images, etc.) into text entry region 604. In FIG. 6A, virtual keyboard 606 is presenting an emoji selection user interface (hereinafter referred to as emoji keyboard 606), including one or more selectable options for inserting emojis into text entry region 604. In some embodiments, an emoji is a graphical object. In some embodiments, an emoji is an image, icon, symbol, ideogram that represents people, places, animals, objects, flags, symbols, etc. In some embodiments, an emoji is recognizable as a text character, such as by the Unicode Standard (e.g., Unicode 6.0 and onwards). In some embodiments, an emoji is able to be inserted into a text entry region and transmitted to other electronic devices. In some embodiments, emoji keyboard 606 includes smiley emojis, thumbs up and down emojis, people emojis, group emojis, family emojis, etc. In some embodiments, available emojis are organized into one or more categories. In some embodiments, emoji keyboard 606 displays each category on a different page or tab. In some embodiments, one or more selectable options 610 are displayed on emoji keyboard 606 to navigate to the respective page or tab.

In some embodiments, certain emojis on emoji keyboard 606 are customizable. In some embodiments, certain customizable emojis have one customizable element. For example, a one-person emoji is optionally customizable to change the skin tone of the person. In some embodiments, certain customizable emojis have multiple customizable elements. For example, a group emoji (e.g., two person emoji) or a family emoji (e.g., three or four person emoji) is optionally customizable to change the skin tone of each of the people represented in the emoji. In some embodiments, other customizations are possible. In some embodiments, certain customizable emojis have one or more accessories. For example, an emoji with people is optionally customizable to add a hat, jewelry, etc. In general, some emojis optionally include multiple customizable visual elements (e.g., colors, visual elements such as objects, etc.) that are customizable using the user interfaces of the disclosure.

As shown in FIG. 6A, emoji keyboard 606 includes eight emojis 608-1 to 608-8. Emojis 608-1 and 608-2 correspond to a smile and a frown emoji and have no customizable elements. Emojis 608-3 and 608-4 correspond to a male character and a female character emoji and have a single customizable element (e.g., the person represented in the emoji). Emojis 608-5 and 608-6 correspond to a female-male group and female-female group and have two customizable elements (e.g., the two people represented in the emoji). Emoji keyboard 606 optionally includes other emojis, such as emoji 608-7 and 608-8 and is optionally scrollable to reveal other emojis.

It is understood that the emojis illustrated herein are merely illustrative and emojis other than those illustrated and described here optionally have any of no, one, or multiple customizable elements. It is understood that the examples shown in FIG. 6A-6XX are exemplary and should not be considered limiting to only the user interfaces and/or applications illustrated.

In FIG. 6B, user input 603 is received (e.g., detected) on touch screen 504 selecting emoji 608-1 corresponding to the smile emoji. In some embodiments, user input 603 selecting emoji 608-1 corresponds to a request to insert emoji 608-1 into text entry region 604. In some embodiments, user input 603 is a tap input. For example, user input 603 illustrated in FIG. 6B is a contact for less than a predetermined threshold (e.g., 0.1 seconds, 0.25 seconds, 0.5 seconds, 1 second, 3 seconds, 5 seconds, etc.), as illustrated by timer 612. In some embodiments, emoji 608-1 does not have any customizable elements. Thus, in some embodiments, in response to the user input, device 500 inserts emoji 608-1 into text entry region 604, as shown in FIG. 6C. In some embodiments, in response to the text entry region receiving an inserted character (e.g., emoji 608-1), transmission option 616 is displayed that is selectable to transmit (e.g., send) the text in text entry region 604 (e.g., as a text message).

In FIG. 6C, user input 603 is received on touch screen 504 selecting emoji 608-4 corresponding to the female character emoji. As described above, emoji 608-4 has one customizable element. In the embodiment illustrated in FIG. 6C, emoji 608-4 has not previously been customized (e.g., the user has not previously selected a variant of the customizable element). In some embodiments, user input 603 selecting emoji 608-4 corresponds to a request to customize emoji 608-4 (e.g., because the emoji has not yet been customized). In some embodiments, user input 603 selecting emoji 608-4 corresponds to a request to insert emoji 608-4 into text entry region 604. In some embodiments, user input 603 is a tap input. For example, user input 603 illustrated in FIG. 6C is a contact for less than a predetermined threshold (e.g., 0.1 seconds, 0.25 seconds, 0.5 seconds, 1 second, 3 seconds, 5 seconds, etc.), as illustrated by timer 612. In some embodiments, in response to user input 603, device 500 displays single-element customization user interface 618, as shown in FIG. 6D, because emoji 608-4 has not yet been customized by the user. In some embodiments, single-element customization user interface 618 is only displayed in response to a tap input if the user has not previously customized the emoji. In some embodiments, single-element customization user interface 618 is always displayed in response to a tap input regardless of whether the user has previously customized the emoji. In some embodiments, single-element customization user interface 618 is only displayed in response to a user input with a contact duration longer than the predetermined threshold (e.g., a "long press" or "tap and hold" input).

As shown in FIG. 6D, single-element customization user interface 618 is a user interface element that includes one or more representations of one or more variants of emoji 608-4. For example, the customizable element of emoji 608-4 is the skin tone of the female character in emoji 608-4. As shown in FIG. 6D, single-element customization user interface 618 includes variants 620, and 622-1 to 622-3. In some embodiments, variant 620 corresponds to the default variant (e.g., emoji with a default color such as yellow, which does not represent any particular skin tone) of emoji 608-4. In some embodiments, variants 622-1 to 622-3 correspond to customizable skin tones of emoji 608-4. In some embodiments, single-element customization user interface 618 includes a visual delineation between default variant 620 and the custom variants 622-1 to 622-3. In some embodiments, default variant 620 is displayed visually separated from custom variants 622-1 to 622-3. In some embodiments, variants 620 and 622-1 to 622-3 are selectable to both: 1) select the respective variant and 2) insert the respective variant into text entry field 618. For example, in FIG. 6D, user input 603 is received selecting (e.g., tapping on) variant 622-2. In some embodiments, in response to user input 603 selecting variant 622-2, device 500 inserts variant 622-2 of emoji 608-4 into text entry field 604 as character 614-2, as shown in FIG. 6E. As shown in FIG. 6E, in addition to inserting variant 622-2 into text entry field 604, device 500 updates emoji keyboard 606 such that emoji 608-4 is displayed with the selected variant 622-2 (e.g., in response to the user input).

FIGS. 6E-6EE illustrate methods of customizing and inserting emojis with multiple customizable elements. In FIG. 6E, user input 603 is received selecting (e.g., tapping on) emoji 608-6 corresponding to the female-female group emoji. In some embodiments, emoji 608-6 has two customizable elements. For example, emoji 608-6 is a representation of two people (e.g., a group emoji). In some embodiments, the skin tone of each person in emoji 608-6 is customizable. In the embodiment illustrated in FIG. 6E, emoji 608-6 has not previously been customized (e.g., the user has not previously selected an option or variant for any of the customizable elements). In some embodiments, user input 603 selecting emoji 608-6 corresponds to a request to customize emoji 608-6 (e.g., because emoji 608-6 has not yet been customized). In some embodiments, user input 603 selecting emoji 608-6 corresponds to a request to insert emoji 608-6 into text input region 604. In some embodiments, user input 603 is a tap input. For example, user input 603 illustrated in FIG. 6E is a contact for less than a predetermined threshold (e.g., 0.1 seconds, 0.25 seconds, 0.5 seconds, 1 second, 3 seconds, 5 seconds, etc.), as illustrated by timer 612. In some embodiments, in response to user input 603, device 500 displays multi-element customization user interface 624, as shown in FIG. 6F. In some embodiments, multi-element customization user interface 624 is only displayed in response to a tap input if the user has not yet completed customization of the emoji. In some embodiments, multi-element customization user interface 624 is always displayed in response to a tap input regardless of whether the user has previously customized the emoji. In some embodiments, multi-element customization user interface 624 is only displayed in response to a user input with a contact duration longer than the predetermined threshold.

As shown in FIG. 6F, multi-element customization user interface 624 includes two rows of variants for customizing emoji 608-6. In some embodiments, the first row includes variants 626-1 to 626-4 of emoji 608-6 corresponding to variants of the first customizable element (e.g., the person on the left side of the emoji). In some embodiments, the second row includes variants 628-1 to 628-4 of emoji 608-6 corresponding to the second customizable element (e.g., the person on the right side of the emoji). For example, the first customizable element for emoji 608-6 is the skin tone of the left person in emoji 608-6 and the second customizable element for emoji 608-6 is the skin tone for the right person in emoji 608-6. In some embodiments, the variants in the first and second rows of multi-element customization user interface 624 display each of the customizable elements (e.g., display the full emoji, without cropping away parts of the emoji that are not being customized by the respective row). In some embodiments, the representations of the variants in the first row are displayed with the respective variant for the left person (e.g., each selectable option displays the left person with a different skin tone). In some embodiments, the representations in the first row are displayed with the right person with a placeholder appearance (e.g., greyed out) to indicate that the first row is not for customizing the right person (e.g., not selectable to customize the right person). In some embodiments, the representations in the second row are displayed with the respective variant for the right person (e.g., each selectable option displays the right person with a different skin tone). In some embodiments, the representations in the second row are displayed with the left person with a placeholder appearance (e.g., greyed out) to indicate that the second row is not for customizing the left person (e.g., not selectable to customize the left person). In some embodiments, any of the variant options for the left and right people described above can be the default variant described below (e.g., yellow coloration corresponding to the default coloration of emojis). In some embodiments, none of the variant options described above are the default variant (e.g., it is not listed as an option in the rows and is not selectable as a customization for any of the left or right person). In such embodiments, the default variant is not an option for customizing the selectable elements. In such embodiments, a user is not able to select the default variant for either of the selectable elements (e.g., cannot select a default variant for one element and a skin tone variant for another element, nor a default variant for both elements) and the user is only able to select skin tone variant for the selectable elements. As described herein, the default variant (e.g., yellow coloration corresponding to the default coloration of emojis) is not a skin tone variant (e.g., such as those that are selectable to customize an emoji) and is merely the default coloration of emojis and does not represent a particular skin tone.

In some embodiments, a third row includes default variant 630-1 for emoji 608-6. For example, default variant 630-1 has a default coloration for both the left and right person (e.g., the default coloration of emojis, which does not represent any particular skin tone, such as yellow). In some embodiments, the third row includes customized variant 630-2 for emoji 608-6. In some embodiments, if emoji 608-6 has not had any customizations (e.g., no options from the first and second rows have been selected), then the customized variant 630-2 is displayed with placeholder elements for both people (e.g., both customizable elements). For example, in FIG. 6F, both people in customized variant 630-2 are displayed with a placeholder appearance (e.g., greyed out) to indicate that no customizations have been selected. As will be described in further detail below, customized variant 630-2 is selectable to insert the customized variant into the text entry field if customization has been completed.

In FIG. 6F, user input 603 is received selecting (e.g., tapping on) default variant 630-1. In some embodiments, in response to user input 603, device 500 inserts default variant 630-1 of emoji 608-6 into text entry region 604, as shown in FIG. 6G. As shown in FIG. 6G, emoji 608-6 on emoji keyboard 606 is displayed as default variant 630-1 because variant 630-1 is the variant that the user has most recently selected and/or inserted into text entry region 604.

In FIG. 6G, user input 603 is received selecting emoji 608-6 on emoji keyboard 606. In some embodiments, user input 603 is a tap input. For example, user input 603 illustrated in FIG. 6G is a contact for less than a predetermined threshold (e.g., 0.1 seconds, 0.25 seconds, 0.5 seconds, 1 second, 3 seconds, 5 seconds, etc.), as illustrated by timer 612. In some embodiments, in response to user input 603, device 500 displays multi-element customization user interface 624, as shown in FIG. 6H. In some embodiments, because variants for each of the customizable elements have not yet been selected, emoji 608-6 has not been fully customized, and thus, selection of emoji 608-6 of emoji keyboard 606 causes display of the multi-element customization user interface 624.

As shown in FIG. 6H, multi-element customization user interface 624 maintains the previous state of customized variant 630-2. For example, both people in customized variant 630-2 (e.g., both customizable elements) have placeholder appearances (e.g., grey colored, greyed out, etc.) to indicate that no customizations have been selected yet. In FIG. 6H, user input 603 is received selecting (e.g., tapping on) customized variant 630-2. In some embodiments, because emoji 608-6 has not been customized, selecting customized representation 630-2 does not cause insertion of customized variant 630-2 into text entry field 604. In some embodiments, in response to user input 603, device 500 displays an indication 632 to indicate that the respective customizable elements have not been customized yet and that selection of the respective customizable elements is required to insert the customized representation into the text entry field, as shown in FIG. 6I. For example, as shown in FIG. 6I, indication 632 is an animation. In some embodiments, the animation comprises momentarily increasing the size of the selectable options for each customizable variant that has not yet been customized. In some embodiments, the animation is at least partially staggered such that the animation begins from one end and moves to the other end (e.g., similar to a wave). For example, variant 626-1 first increases in size, and as variant 626-1 is decreasing in size, variant 626-2 begins increasing in size, and onwards. In some embodiments, each of the variants in the first and second rows is animated. In some embodiments, the animation is performed on the first and second rows concurrently (e.g., a wave moves down the first row of variants at the same time that a wave moves down the second row of variants). As will be described in more detail below, the row(s) corresponding to customizable variants that require customization (e.g., have not yet been customized) are animated while the row(s) corresponding to customizable variants that have already been customized are not animated.

Thus, in some embodiments, until customization is completed for both customizable elements of emoji 608-6, customized variant 630-2 is not selectable to insert a custom variant of emoji 608-6 into the text entry region. In some embodiments, a default customization is not selected for customized variant 630-2 because the customization is optionally of the skin tone of the people in emoji 608-6 and a default skin tone for customized variant 630-2 is not selected by the manufacturer (or provider) of the electronic device. In some embodiments, it is desirable to allow the user to perform initial selections of the skin tone of each person in the customizable emojis. Thus, in some embodiments, using placeholder elements instead of selecting default skin tones for the customizable elements maintains a neutral position with regard to the available skin tone options. In this way, customized variant 630-2 truly reflects the user's customizations and preferences without any bias (implicit or otherwise).

In FIG. 6J, a user input 603 is received selecting (e.g., tapping on) variant 626-1. In some embodiments, variant 626-1 corresponds to a customizable option for the left person of emoji 608-6. In some embodiments, variant 626-1 is a custom variant for the left person of emoji 608-6 (e.g., a customizable skin tone for the left person). In some embodiments, the default variant (e.g., yellow coloration, not representing a skin tone) is not provided as an option. In some embodiments, in response to user input 603 selecting variant 626-1, variant 626-1 is updated with a visual indication that variant 626-1 has been selected (e.g., as shown by the dotted lines), as shown in FIG. 6K. In some embodiments, in response to user input 603 selecting variant 626-1, customized variant 630-2 is updated to reflect the user's selection of variant 626-1, as shown in FIG. 6K. In some embodiments, the visual indication includes highlighting the variant (e.g., changing the background color of the box around the emoji to blue, yellow, red, etc.). In some embodiments, other visual characteristics or indications are possible. As shown in FIG. 6K, customized variant 630-2 is updated such that the left person in customized variant 630-2 has the selected skin tone of variant 626-1, while the right person remains as the placeholder element (e.g., having a placeholder appearance, such as being greyed out), because it has not yet been customized by the user.

In FIG. 6K, user input 603 is received selecting (e.g., tapping on) customized variant 630-2. In some embodiments, because emoji 608-6 has not yet been fully customized (e.g., only the left person has been customized, but the right person has not yet been customized), selecting customized variant 630-2 does not cause insertion of customized variant 630-2 into text entry field 604. In some embodiments, in response to user input 603, device 500 displays an indication 632 to indicate that the right customizable element has not been customized yet and that selection of an option for the right customizable element is required to enable insertion of the customized representation into the text entry field, as shown in FIG. 6L. In some embodiments, indication 632 is similar to the indication 632 described above with respect to FIG. 6I. In some embodiments, only the variants in the second row display indication 632 because the second row corresponds to the customizable element that has not yet been customized. Similarly, if the customizable element associated with the first row had not yet been customized when device 500 received a user input selecting customized variant 630-2, then the variants in the first row would display the indication.

In FIG. 6M, user input 603 (e.g., a tap) is received on user interface 600 outside of multi-element customization user interface 624. In some embodiments, the user input corresponds to a request to dismiss multi-element customization user interface 624. In some embodiments, in response to the user input 603, multi-element customization user interface 624 is dismissed (e.g., ceased to be displayed), as shown in FIG. 6N. In some embodiments, device 500 displays the user interface that was displayed before multi-element customization user interface 624 was displayed (e.g., the entirety of user interface 600). As shown in FIG. 6N, emoji 608-6 on emoji keyboard 606 is unchanged (e.g., continues to show the default variant) because the user has not completed customization and/or the user has not selected customized variant 630-2, even though the user has performed partial customization. In some embodiments, a user input on the paddle portion of customization user interface 624 (e.g., the portion of multi-element customization user interface 624 overlaid over emoji 608-6) is also interpreted as a request to dismiss the customization user interface and is able to cause multi-element customization user interface 624 to be dismissed.

In FIG. 6N, user input 603 is received selecting (e.g., tapping on) emoji 608-6. In some embodiments, because emoji 608-6 has not been fully customized (e.g., a variant for the left person has been selected, but a variant for the right person has not yet been selected), in response to user input 603, multi-element customization user interface 624 is displayed, as shown in FIG. 6O. In some embodiments, multi-element customization user interface 624 is always displayed in response to a user input selecting emoji 608-6 without regard to whether emoji 608-6 has or has not been fully customized.

In FIG. 6O, user input 603 is received selecting (e.g., tapping on) variant 628-3 corresponding to a variant for the right person of emoji 608-6. As described above, variant 628-3 is a skin tone variant for the right person of emoji 608-6. In some embodiments, in response to user input 603, customized variant 630-2 is updated such that the right person is displayed with the visual characteristics associated with variant 628-3 (e.g., the skin tone of variant 628-3), as shown in FIG. 6P. In some embodiments, the user's selection of variant 628-3 completes the customization of emoji 608-6 (e.g., a variant for each customizable element has been selected). Thus, in some embodiments, in response to completing the customization, an indication 634 is displayed on customized variant 630-2 to indicate that customization of variant 630-2 is completed and is now selectable to insert variant 630-2 into the text entry region. In some embodiments, indication 634 is a graphical animation. In some embodiments, the animation includes temporarily increasing and decreasing the size of variant 630-2, similar to indication 632 described above with reference to FIGS. 6I and 6L.

In FIG. 6Q, user input 603 is received selecting (e.g., tapping on) customized variant 630-2. In some embodiments, because customization of emoji 608-6 has completed, in response to user input 603, customized variant 630-2 is inserted into text entry region 604 as character 614-4, as shown in FIG. 6R. In FIG. 6R, emoji 608-6 on emoji keyboard 606 is updated to display customized variant 630-2 because customized variant 630-2 is the user's most recently selected variant of emoji 608-6 for insertion into text entry field 604.

In FIG. 6R, user input 603 is received selecting (e.g., tapping on) emoji 608-6 while emoji 608-6 is displayed as customized variant 630-2. In some embodiments, because customization of emoji 608-6 has been completed (e.g., variant 630-2 is fully customized), in response to user input 603 selecting emoji 608-6 while emoji 608-6 is displayed as customized variant 630-2, device 500 inserts customized variant 630-2 into text entry region 604 as character 614-5 (e.g., emoji 608-6 is inserted having the variants of the first and second customizable elements embodied by customized variant 630-2), as shown in FIG. 6S. Thus, in some embodiments, because emoji 608-6 has been fully customized, a user input tapping on emoji 608-6 on emoji keyboard 606 does not display multi-element customization user interface 624. In some embodiments, tapping on emoji 608-6 causes insertion of the most recently selected variant of emoji 608-6 (e.g., and by extension, optionally the variant displayed on emoji keyboard 606).

In FIG. 6T, a touch-down of contact 603 is received on emoji 608-6 while emoji 608-6 is displayed as customized variant 630-2. In FIG. 6U, contact 603 on emoji 608-6 is held for longer than a predetermined threshold duration (e.g., 0.1 seconds, 0.25 seconds, 0.5 seconds, 1 second, 3 seconds, 5 seconds, etc.), as indicated by timer 612. In response to detecting that contact 603 has been held for longer than the predetermined threshold duration, multi-element customization user interface 624 is displayed, as shown in FIG. 6U. In some embodiments, multi-element customization user interface 624 displays the current state of customization for emoji 608-6. For example, the customization selections for each of the customizable elements are maintained. In FIG. 6U, variants 626-1 and 628-3 are highlighted indicating that variants 626-1 and 628-3 have been selected and are currently applied to customized variant 630-2. In FIG. 6V, lift-off of contact 603 from touch screen 504 is detected. In some embodiments, in response to detecting the lift-off of contact 603, device 500 maintains display of multi-element customization user interface 624 (e.g., forgoes dismissing multi-element customization user interface 624), as shown in FIG. 6V.

In FIG. 6W, user input 603 is received selecting (e.g., tapping on) variant 626-2 corresponding to the second skin tone variant for the left person of emoji 608-6. In some embodiments, in response to user input 603, customized variant 630-2 is updated such that the left person reflects the skin tone variant of variant 626-2 (e.g., the previous selection of variant 626-1 is replaced with variant 626-2), as shown in FIG. 6X. As shown in FIG. 6X, variant 626-2 is displayed as highlighted and variant 626-1 is no longer displayed as highlighted. Thus, in some embodiments, the user is able to update customized variant 630-2 by selecting other variants for the customized elements and overriding the previous selection. In some embodiments, if the user dismisses multi-element customization user interface 624 while emoji 608-6 is displaying customized variant 630-2 after having updated customized variant 630-2 with new variant selections, then emoji 608-6 on emoji keyboard 606 is also updated to display the updated customized variant 630-2 (e.g., with variant 626-2 as the left person and variant 628-3 as the right person). In some embodiments, if the user dismisses multi-element customization user interface 624 while emoji 608-6 is displaying customized variant 630-2 after having updated customized variant 630-2 with new variant selections, emoji 608-6 on emoji keyboard 606 is not updated to the updated customized variant 630-2 and maintains the previous customization (e.g., the un-updated customized variant 630-2) optionally because the user has not selected the updated customized variant 630-2 for insertion into the text entry region from multi-element customization user interface 624.

Figure 6Y:
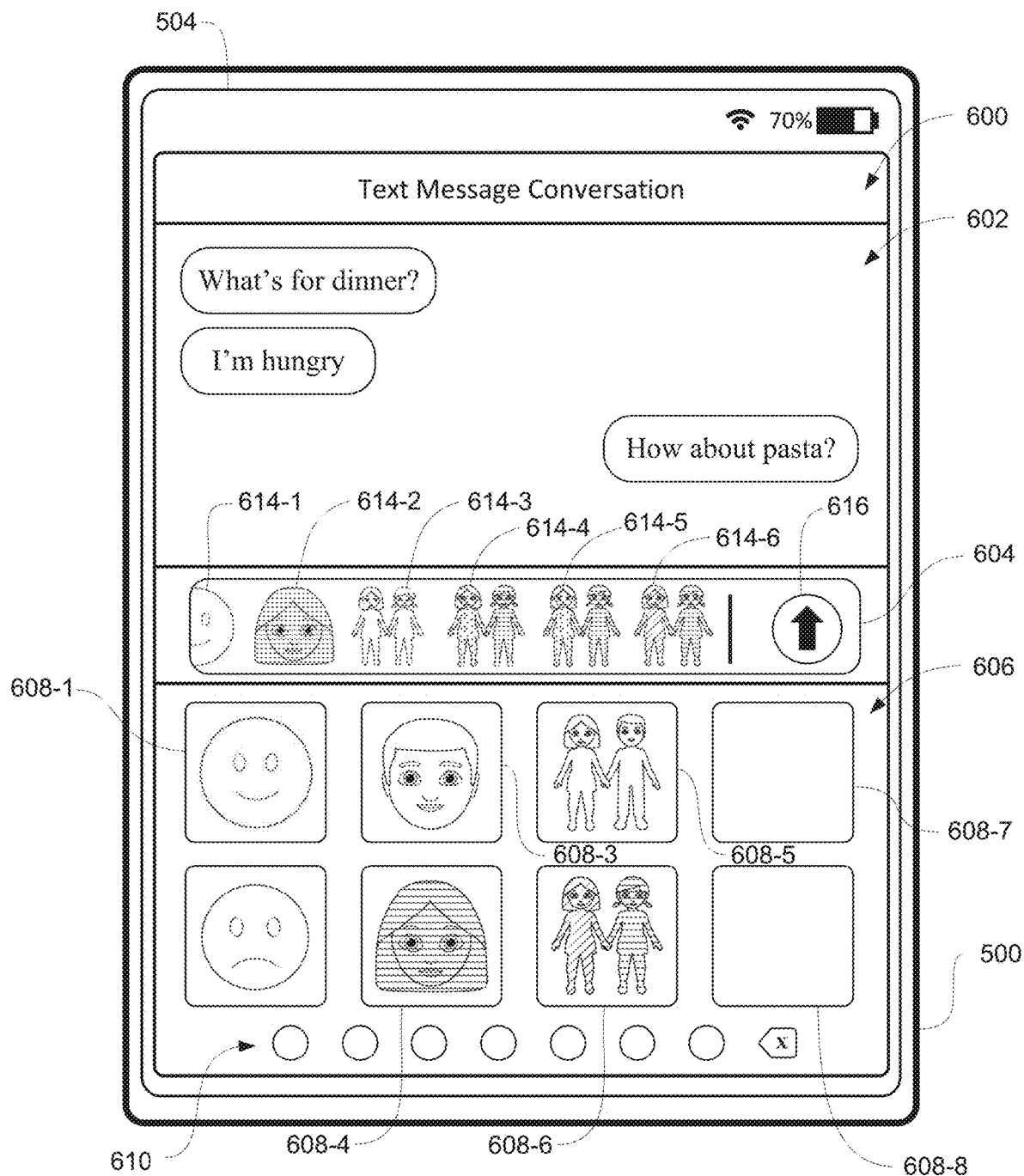

In FIG. 6X, user input 603 is received selecting (e.g., tapping on) customized variant 630-2 having the updated variant selections (e.g., variant 626-2 as the left person, and variant 628-3 as the right person). In some embodiments, in response to user input 603, updated customized variant 630-2 is inserted into text entry region 604 as character 614-6, as shown in FIG. 6Y. As shown in FIG. 6Y, emoji 608-6 on emoji keyboard 606 has been updated to reflect the updated customized variant 630-2.

Figure 6Z:
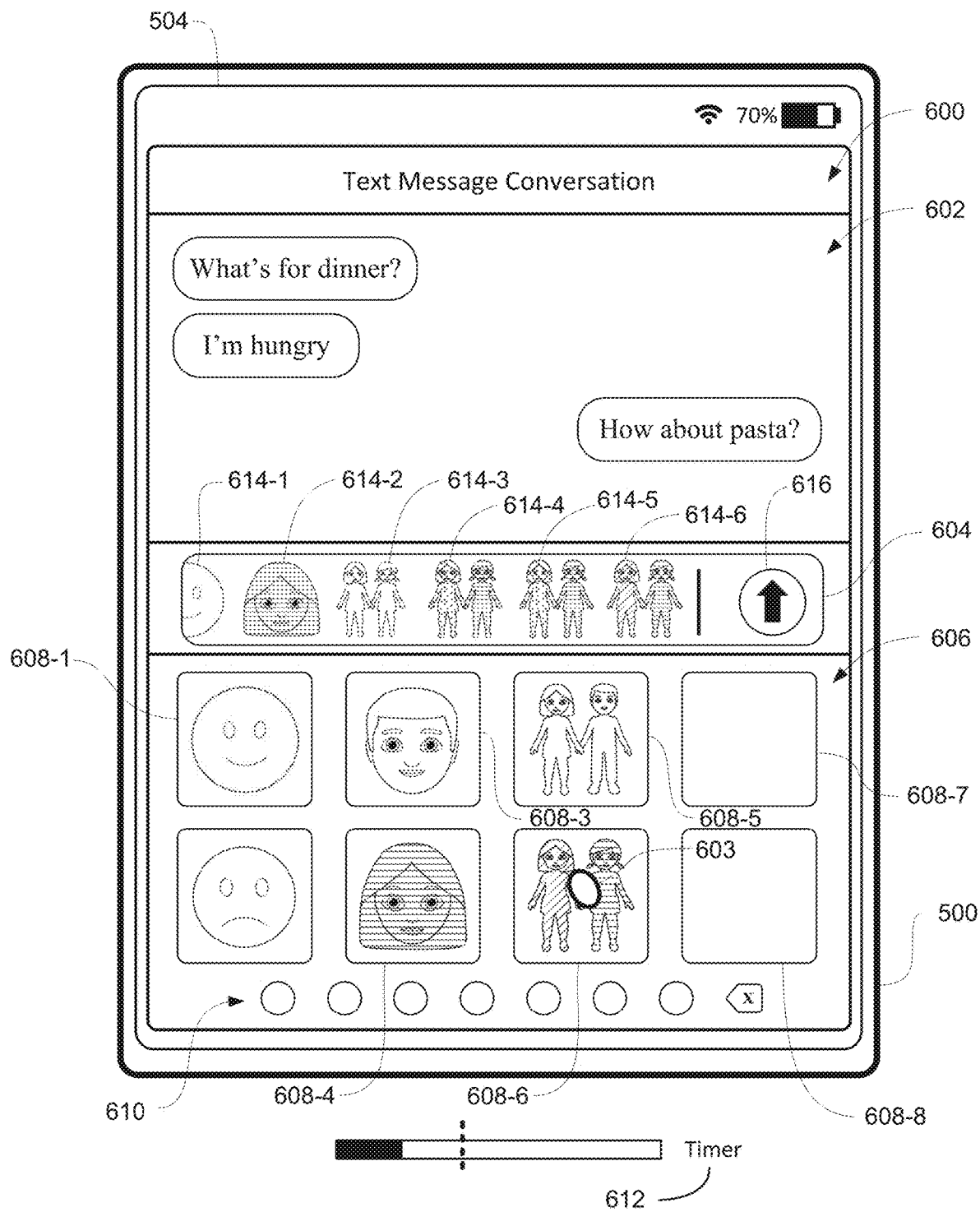
Figure 6A:
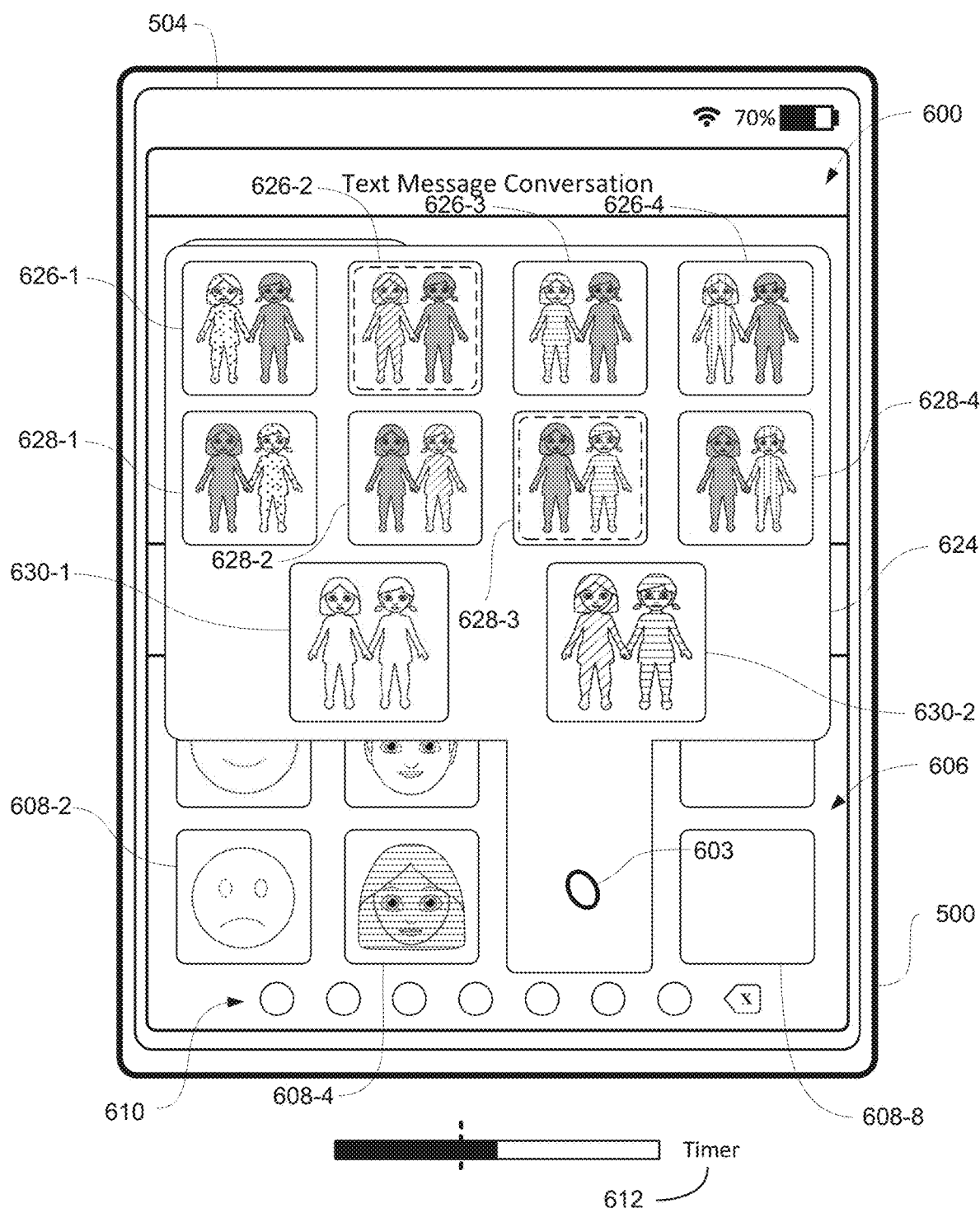
Figure 6B:
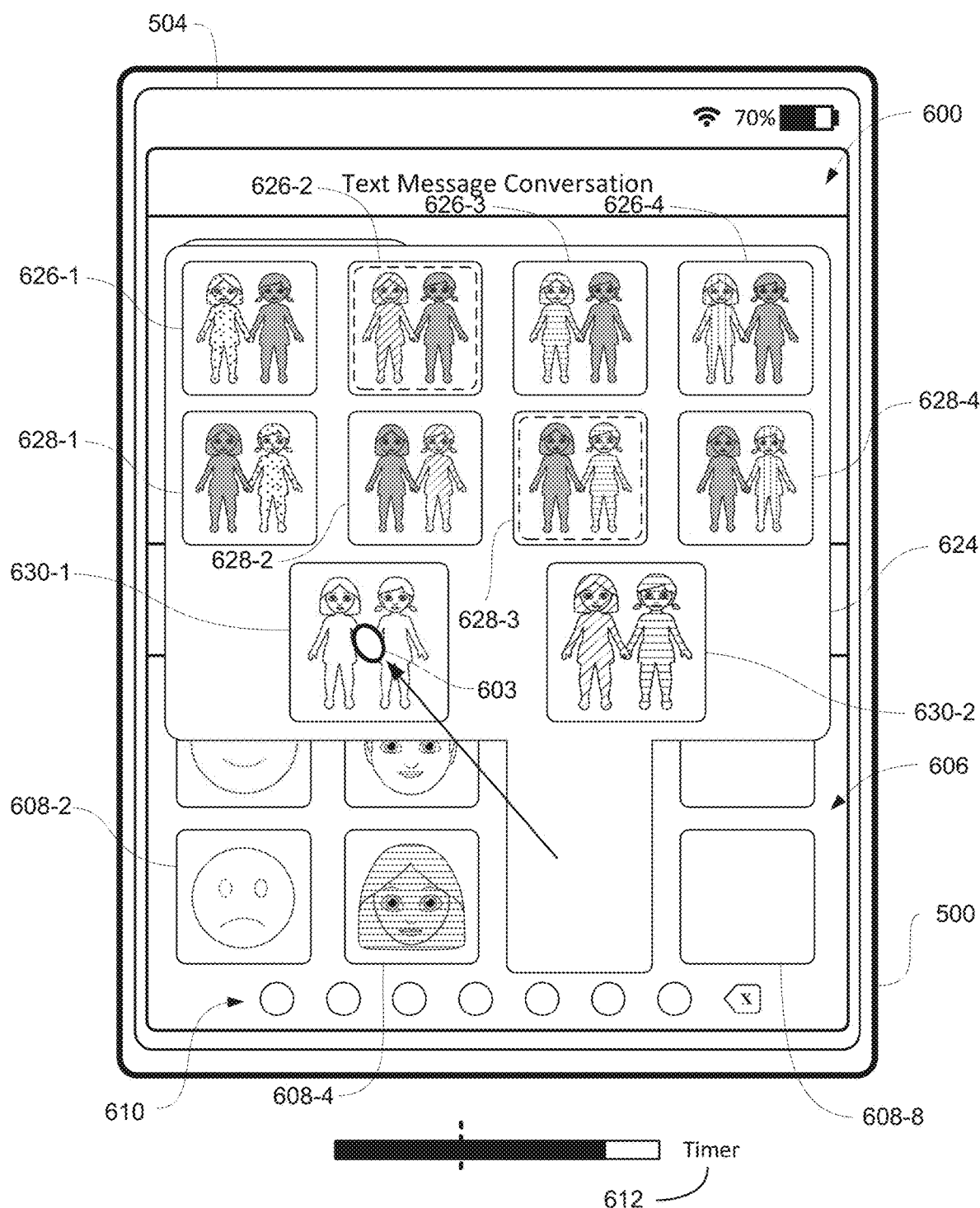
Figure 6C:
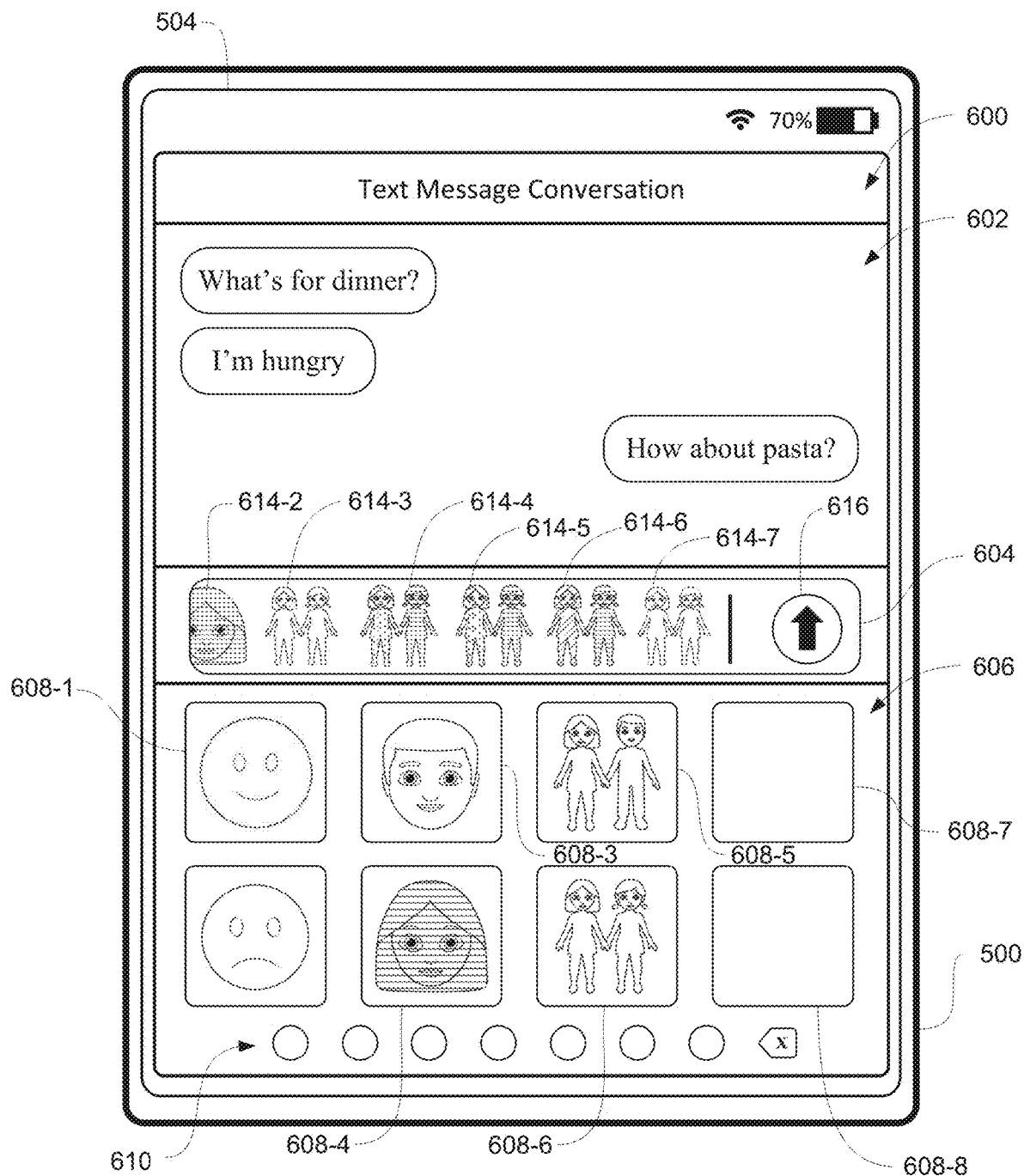
Figure 6D:
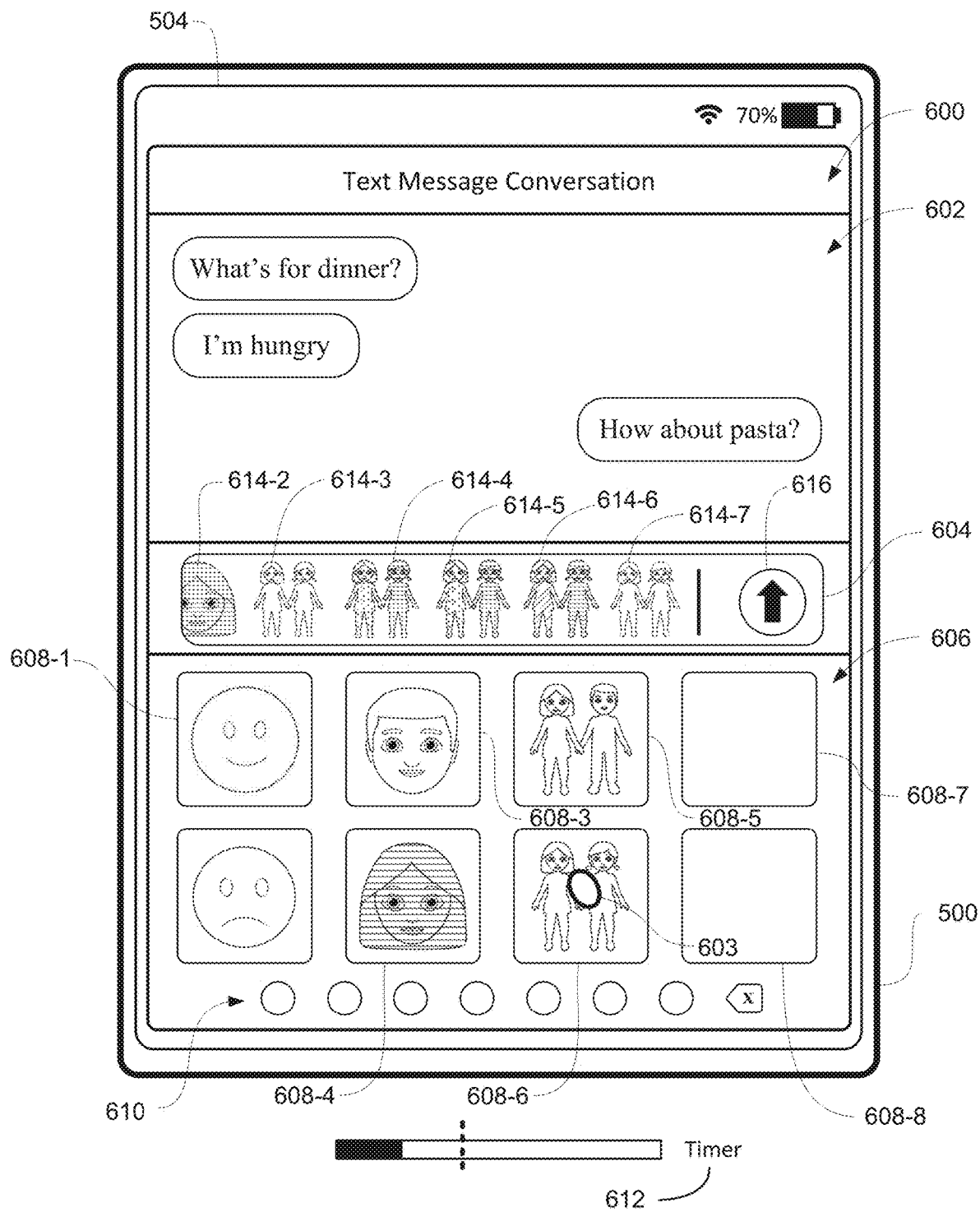
Figure 6E:
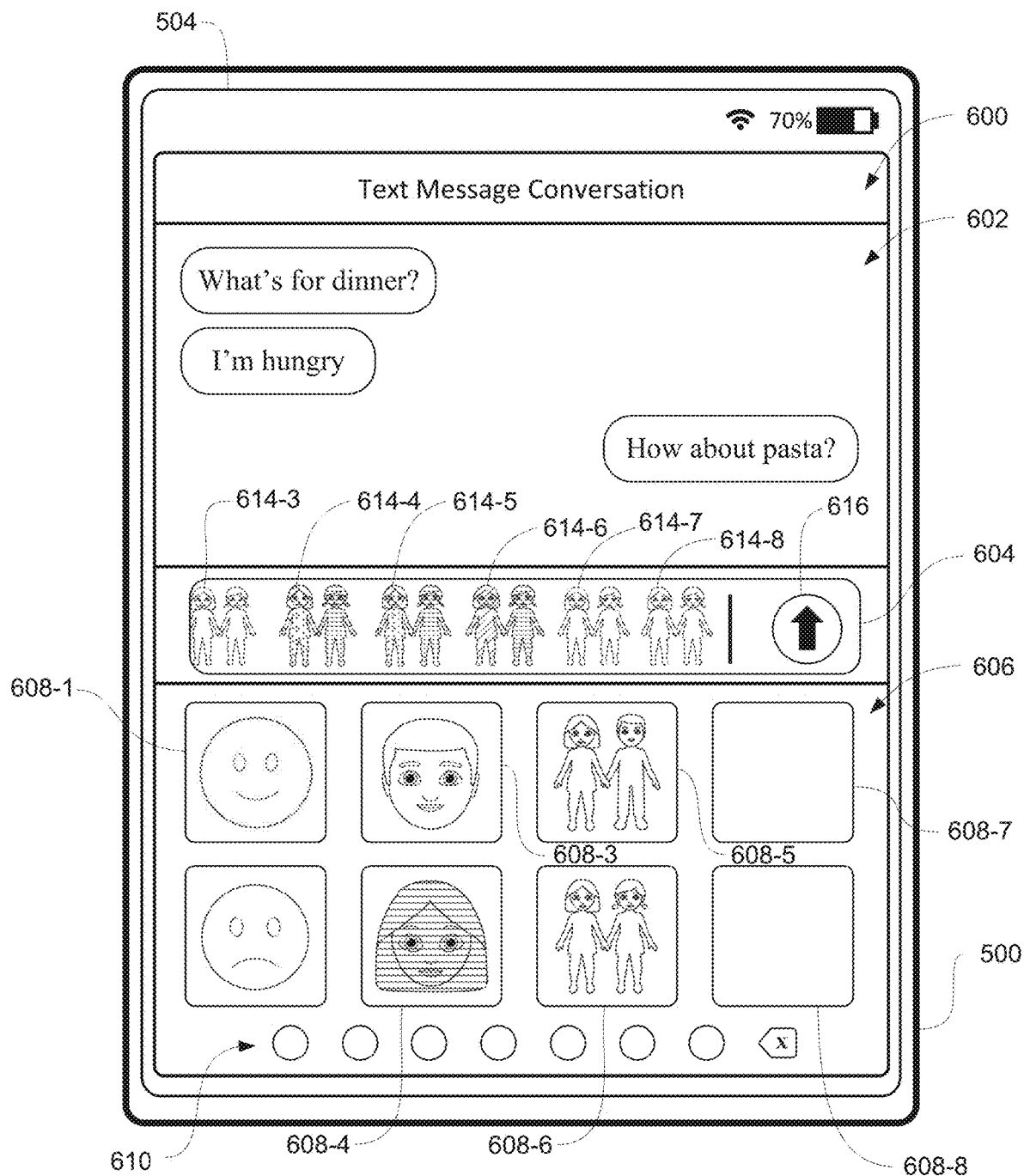
Figure 6F:
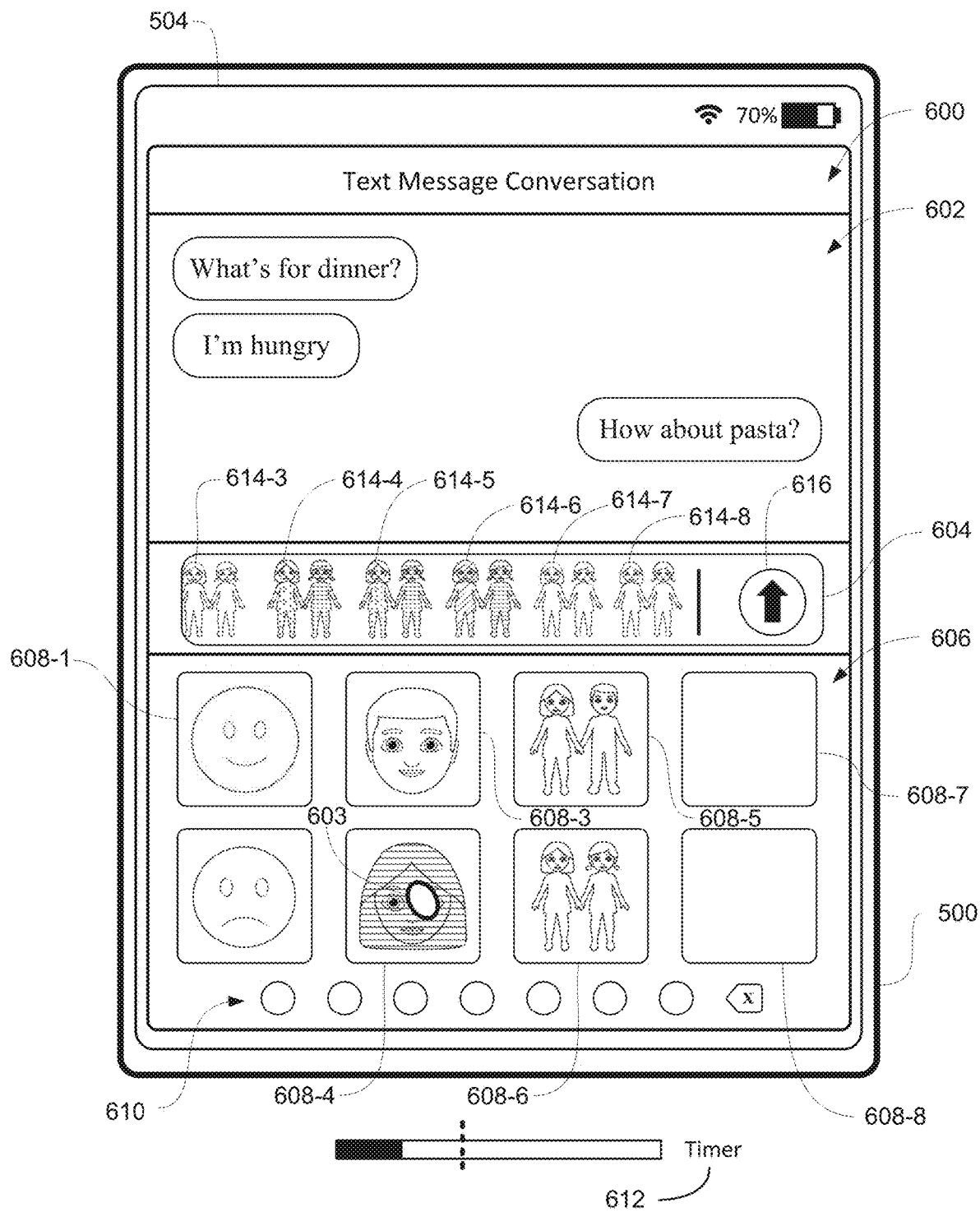
Figure 6G:
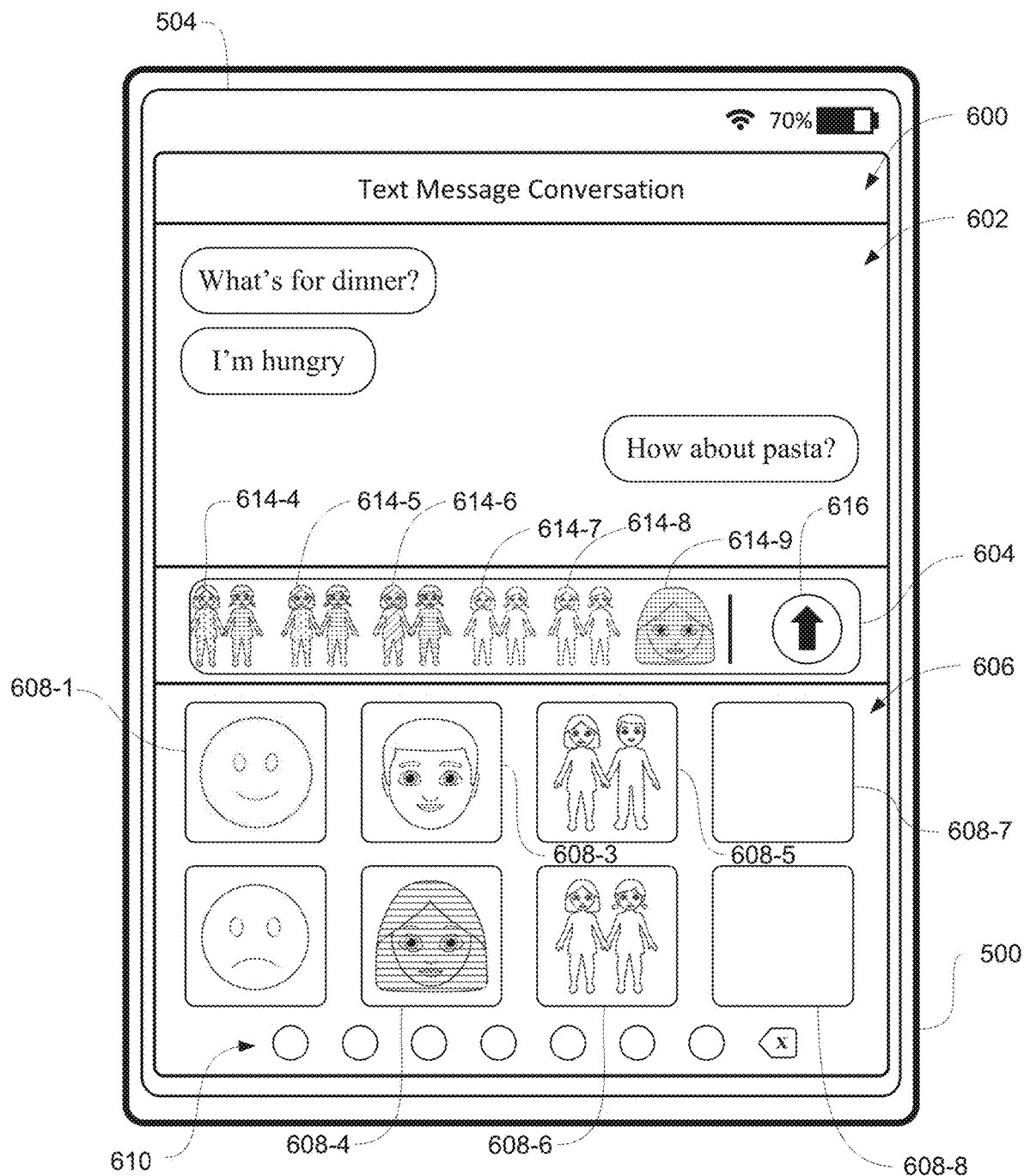
Figure 6H:
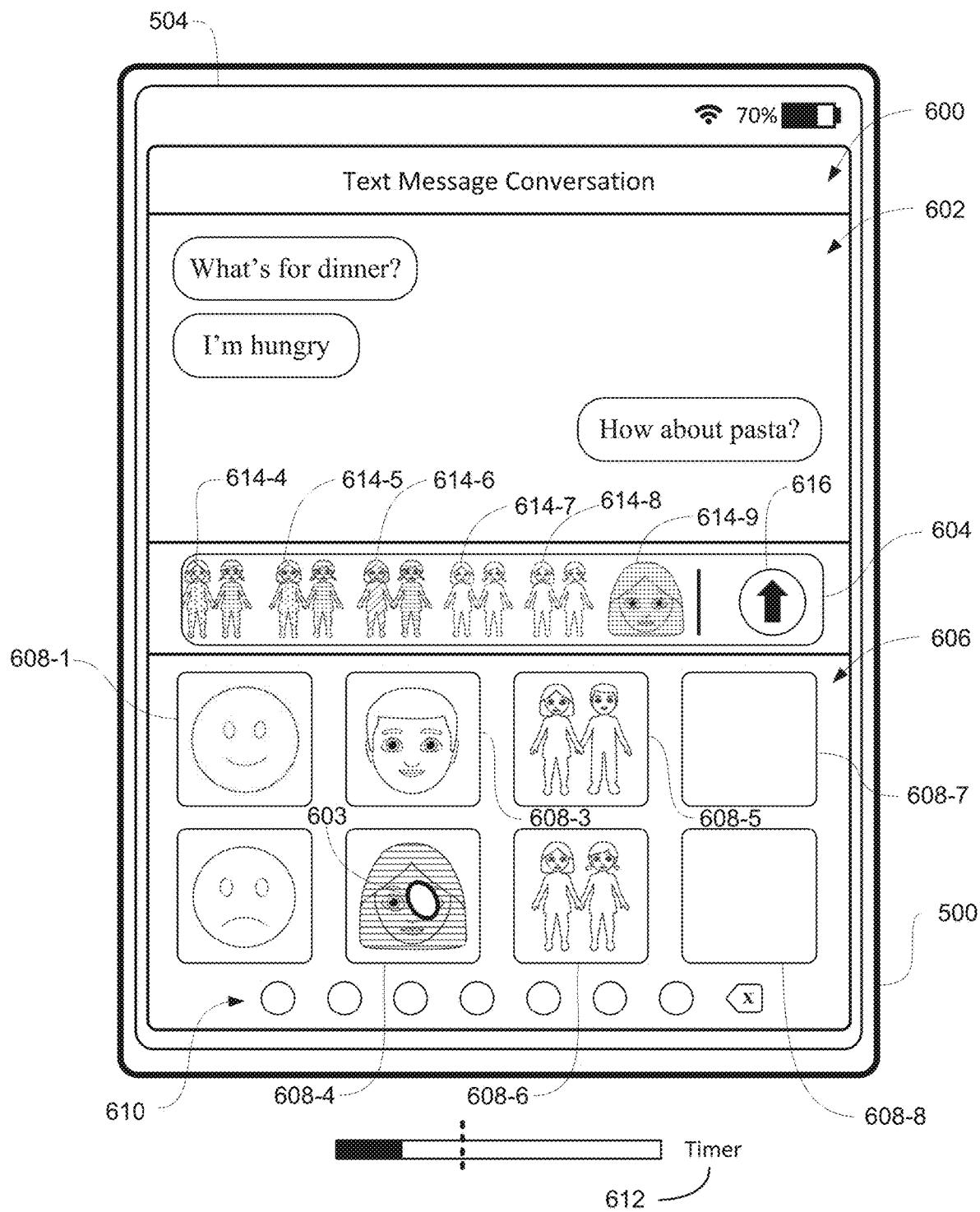
Figure 6I:
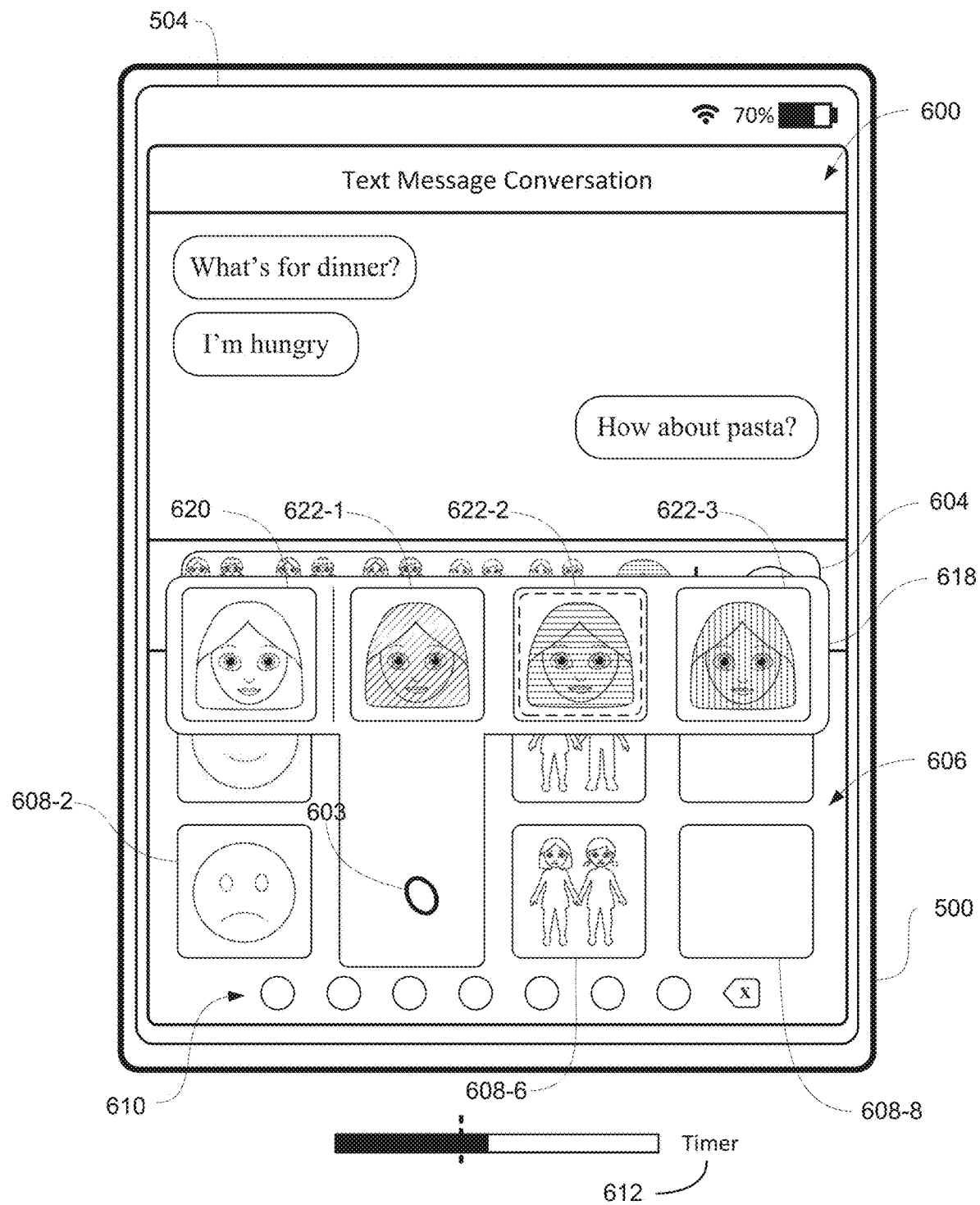
Figure 6J:
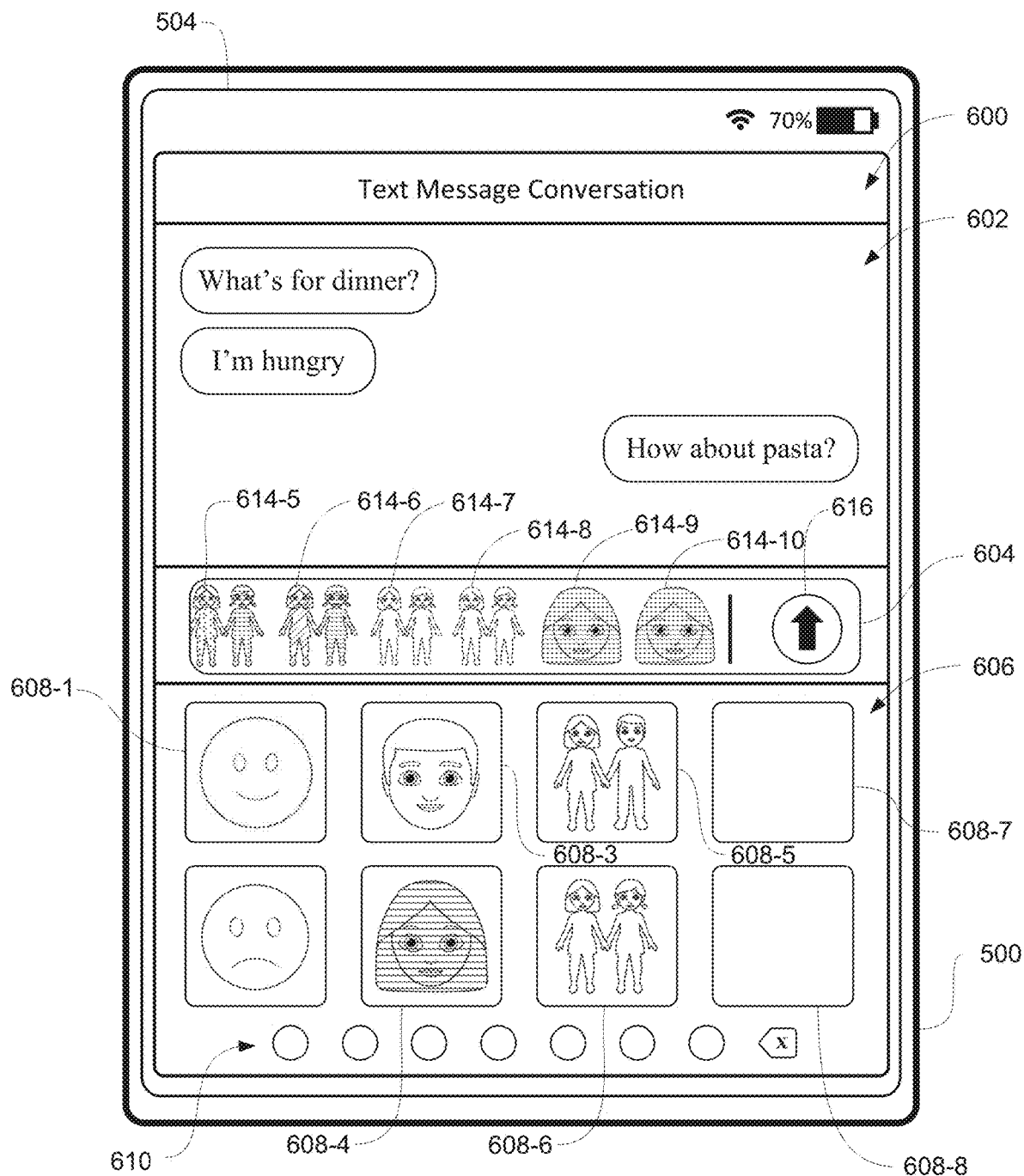
Figure 6K:
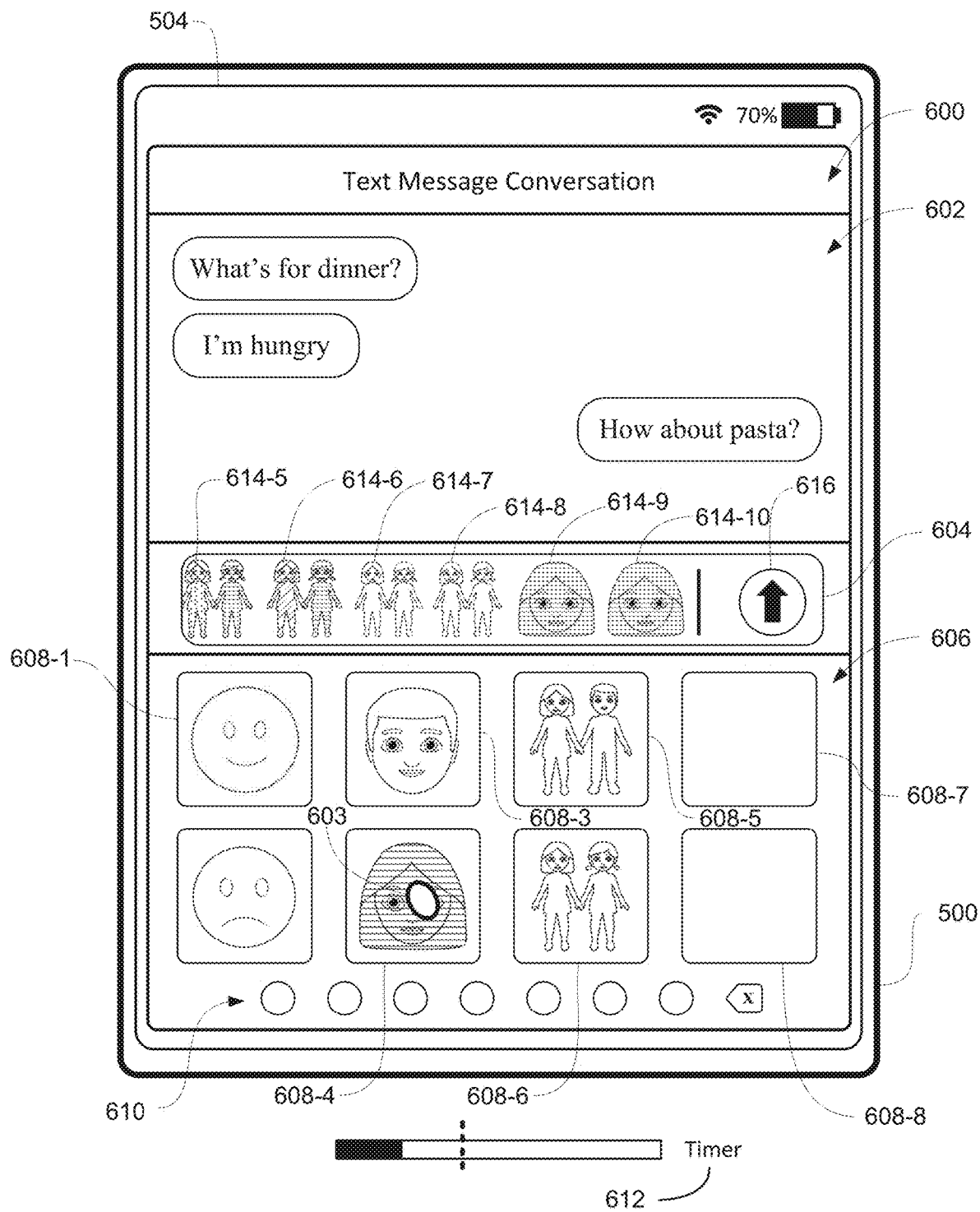
Figure 6L:
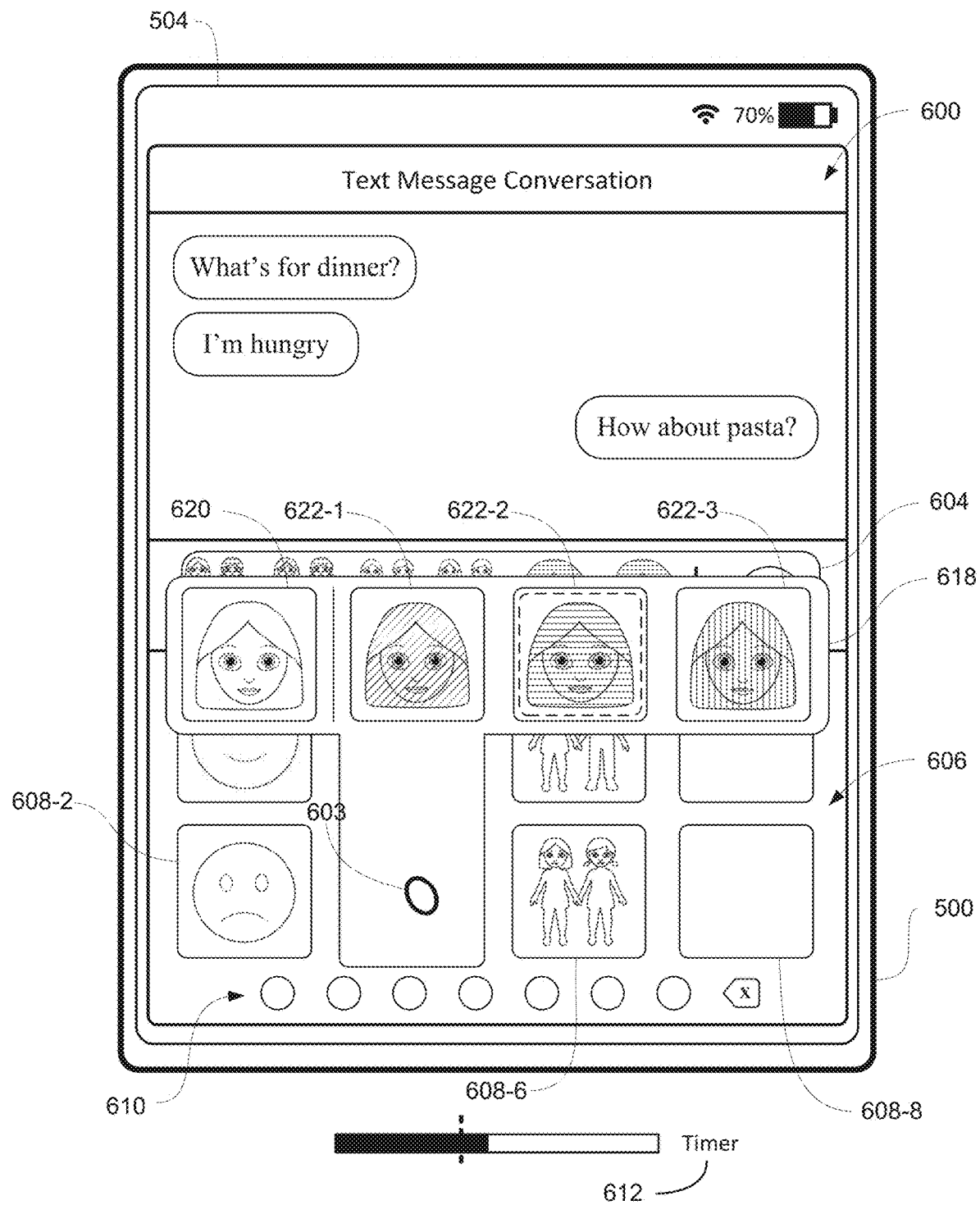
Figure 6M:
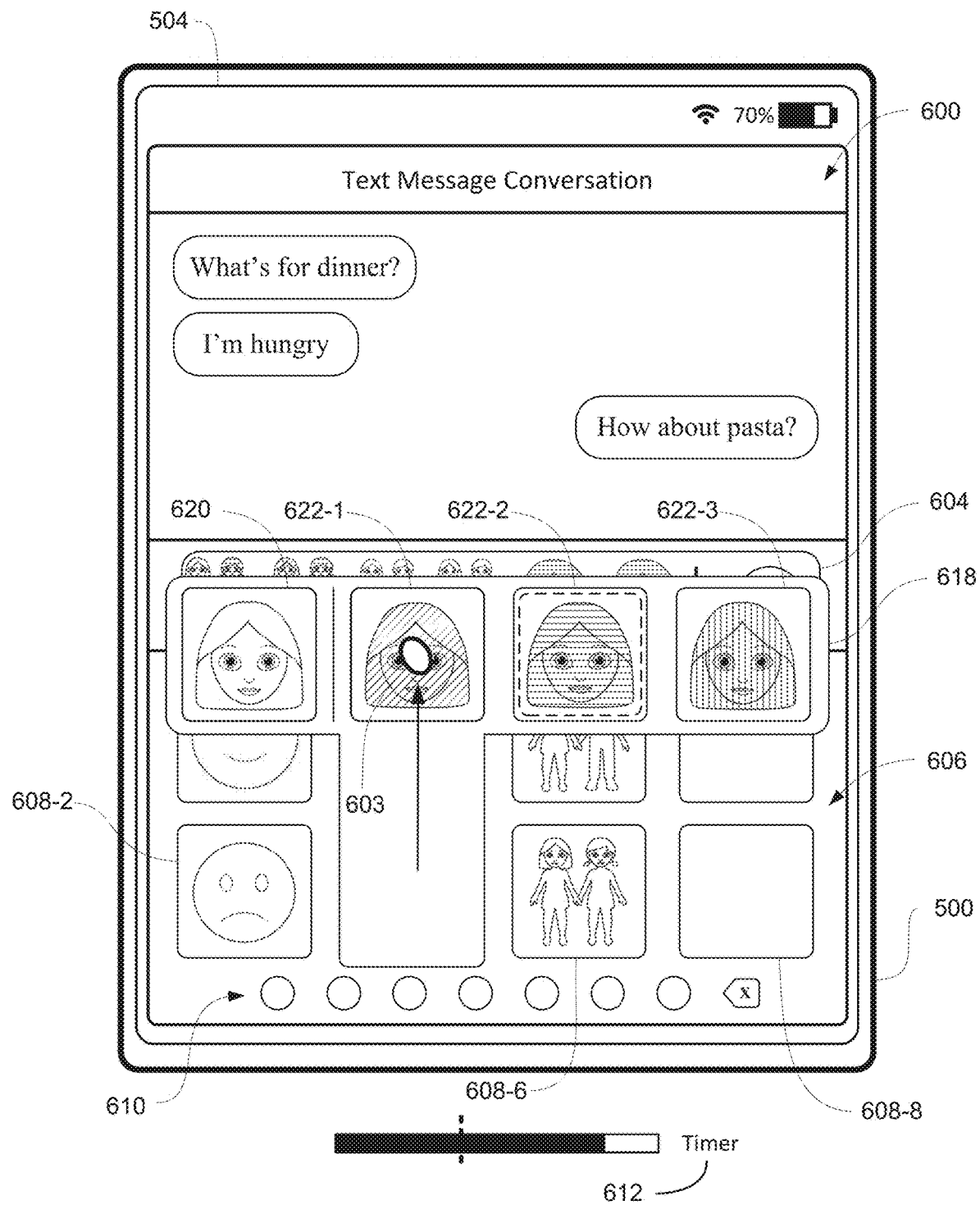
Figure 6N:
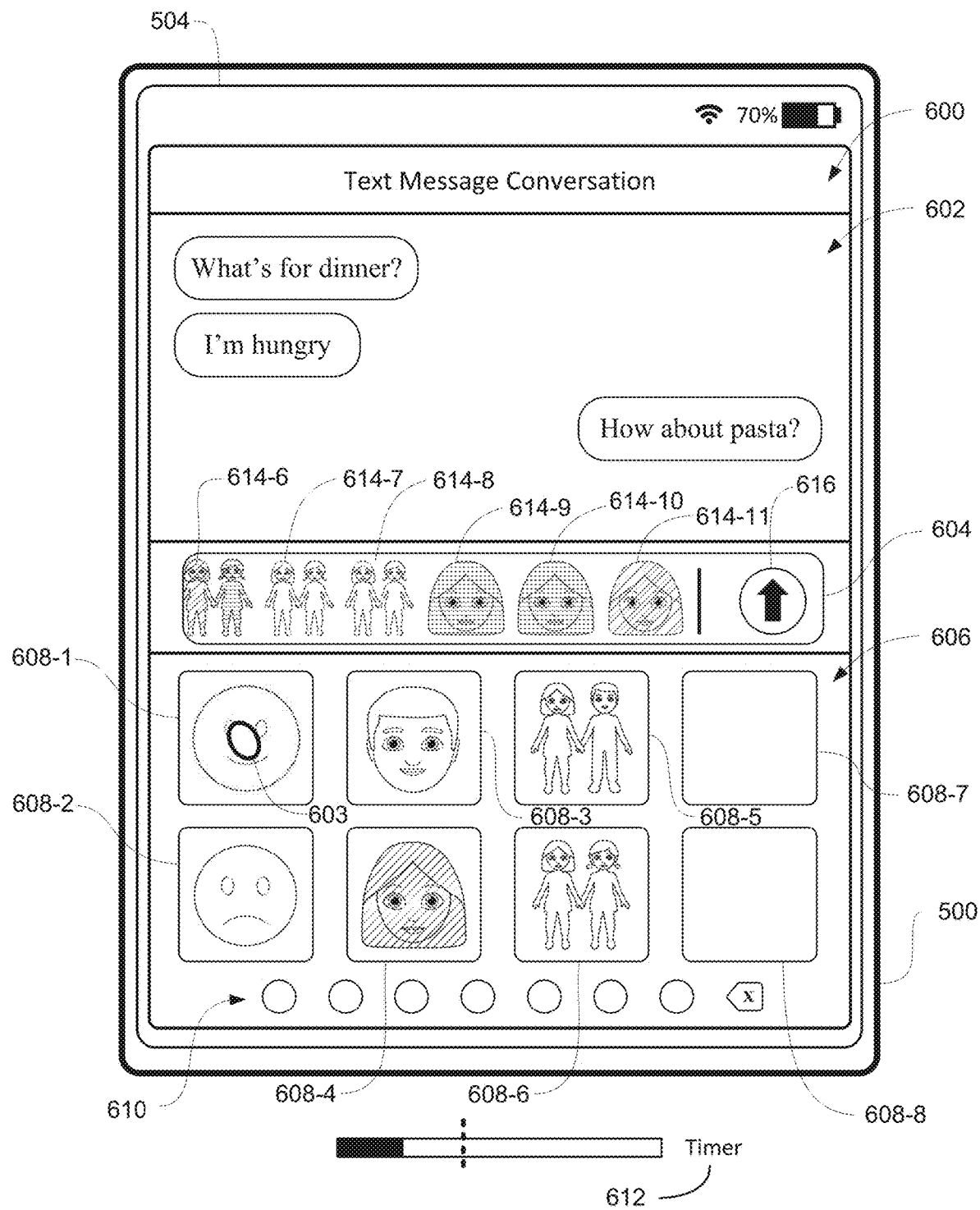
Figure 6O:
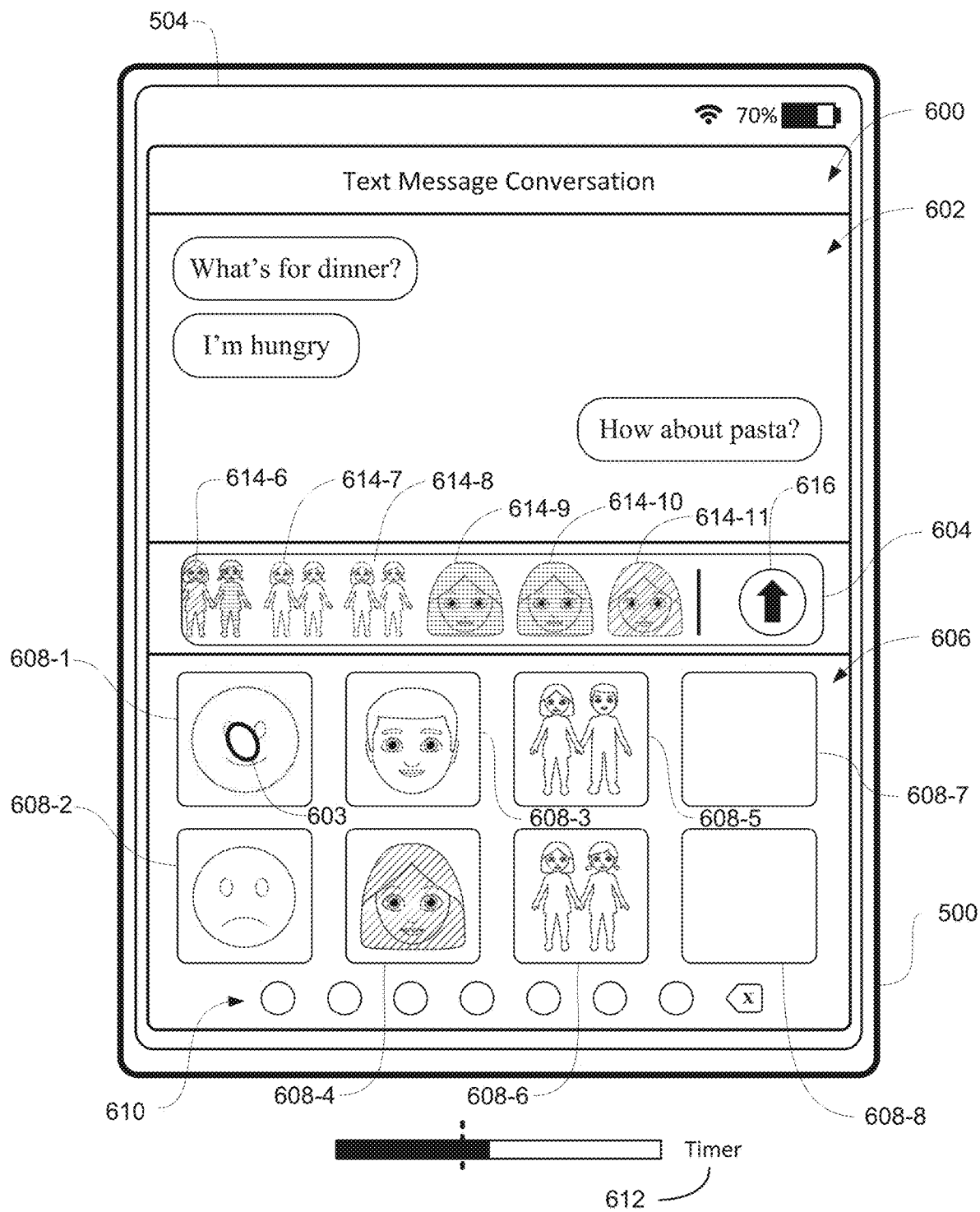
Figure 6P:
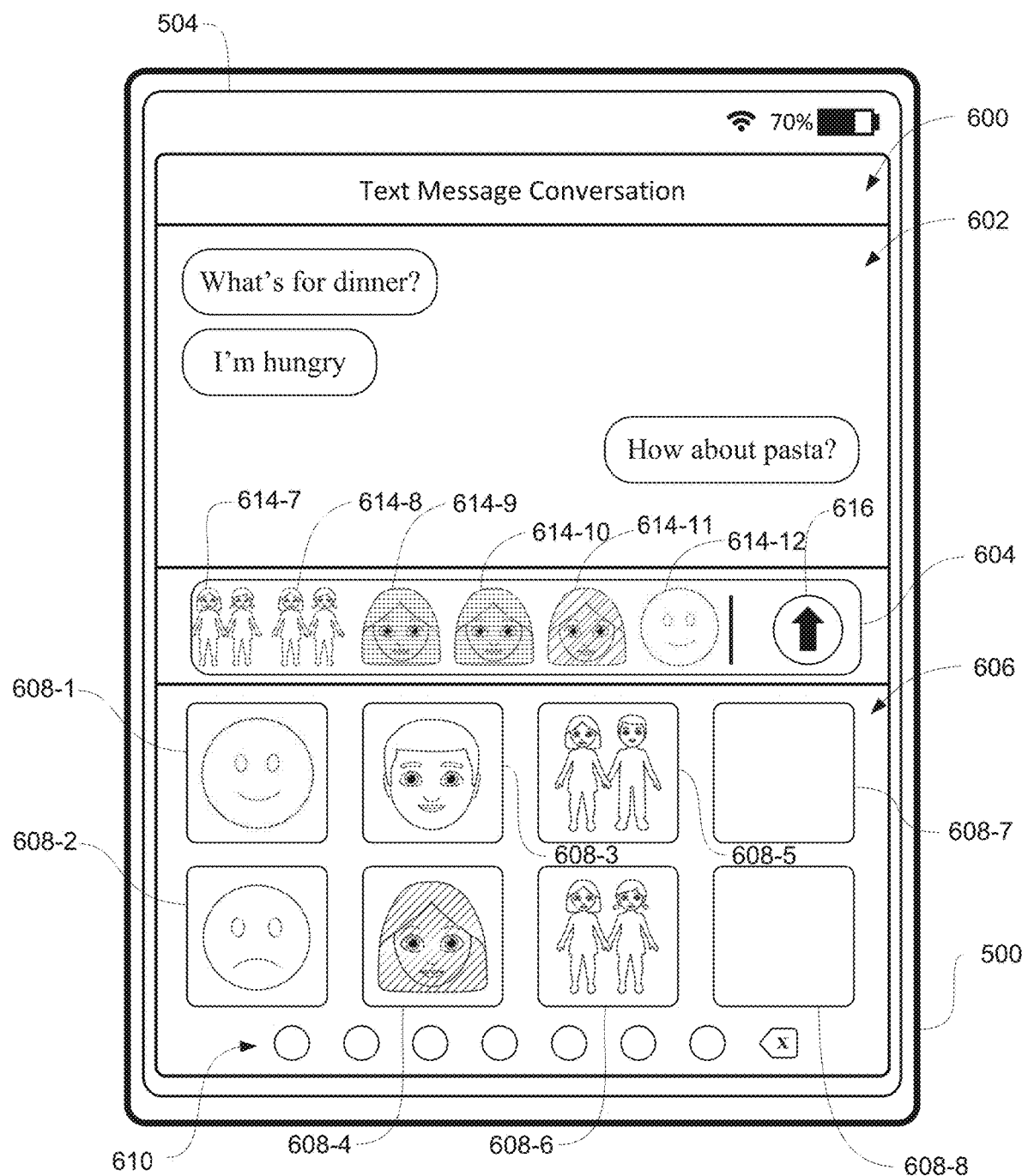
Figure 6Q:
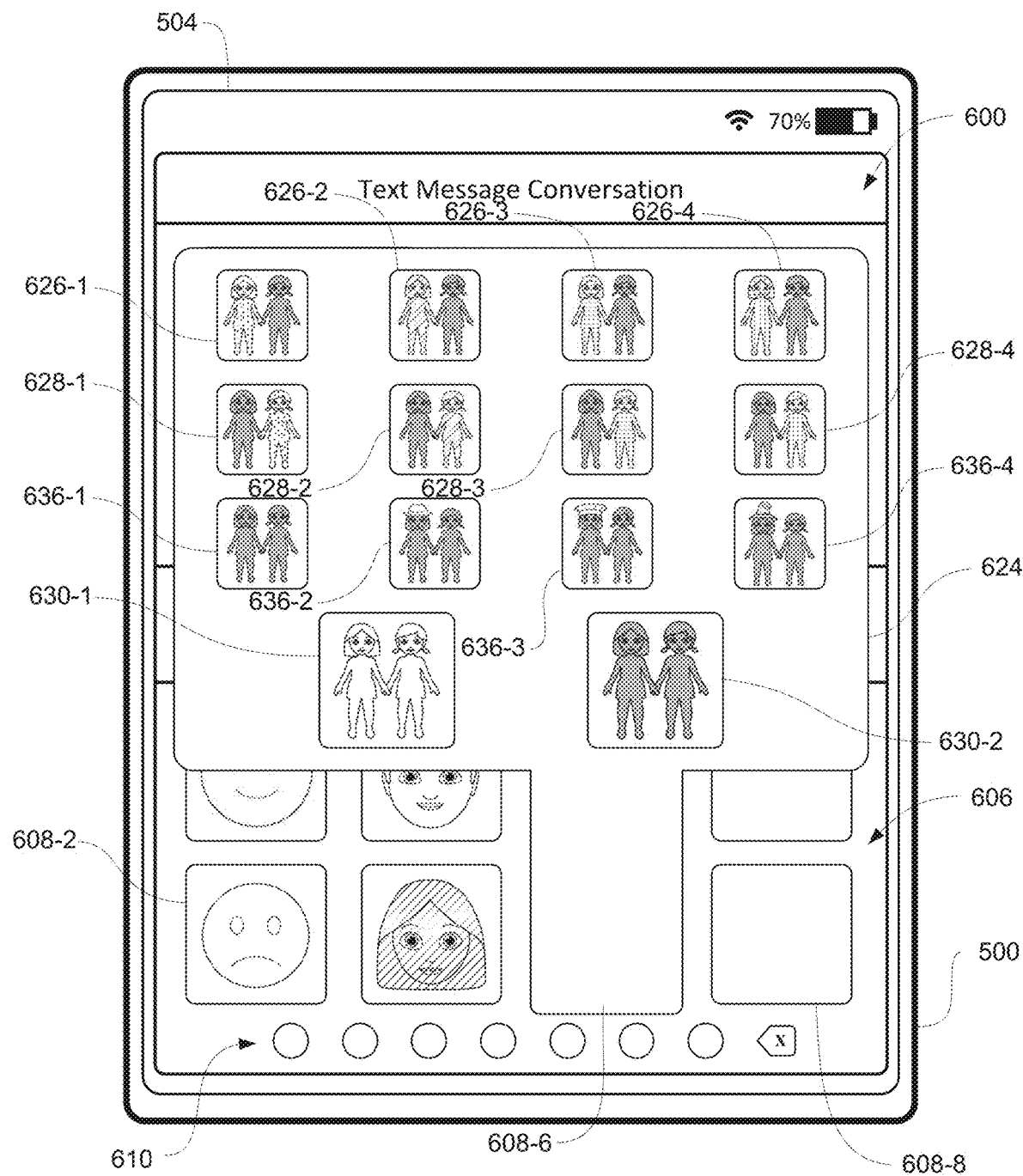
Figure 6R:
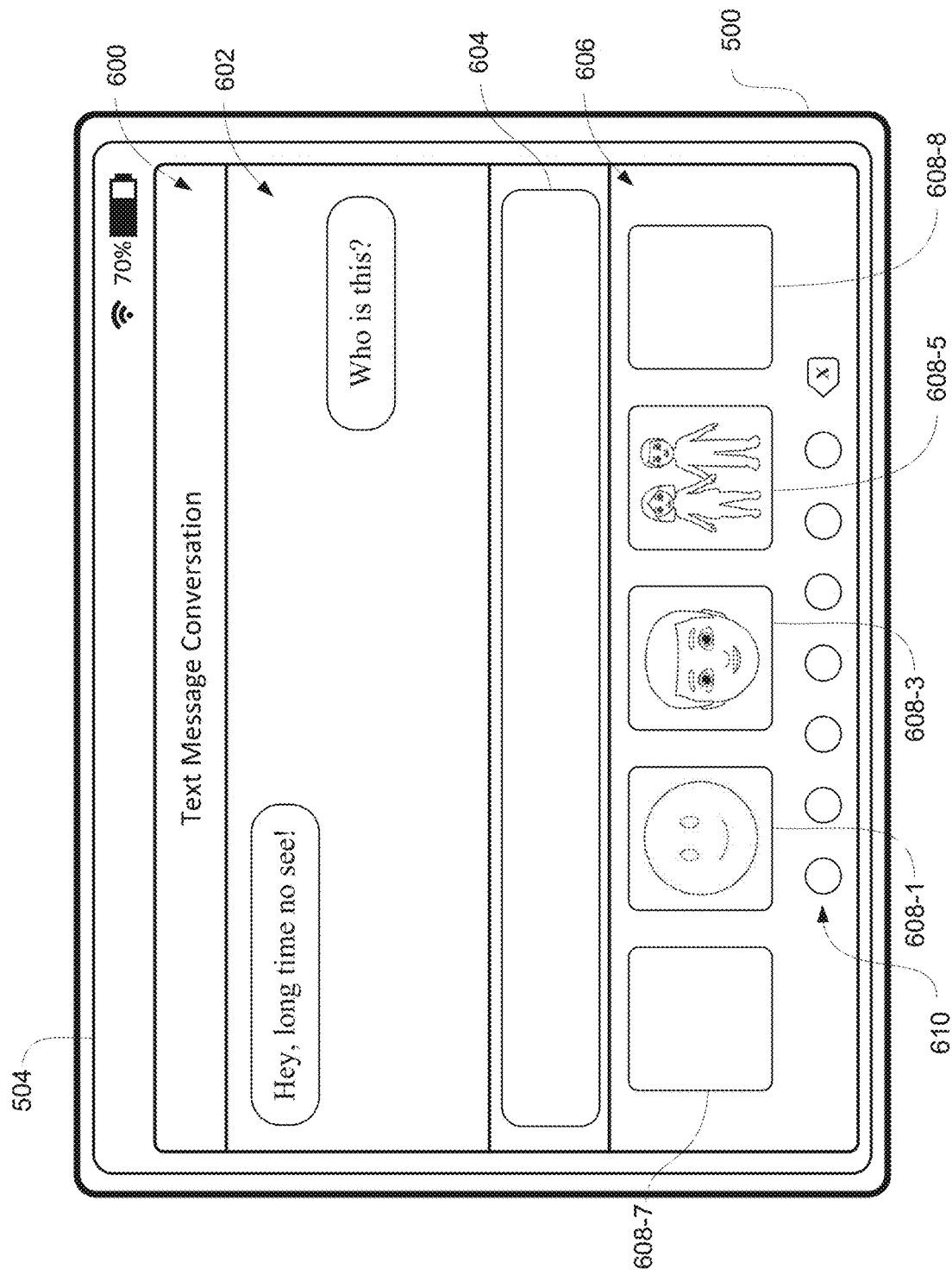
Figure 6S:
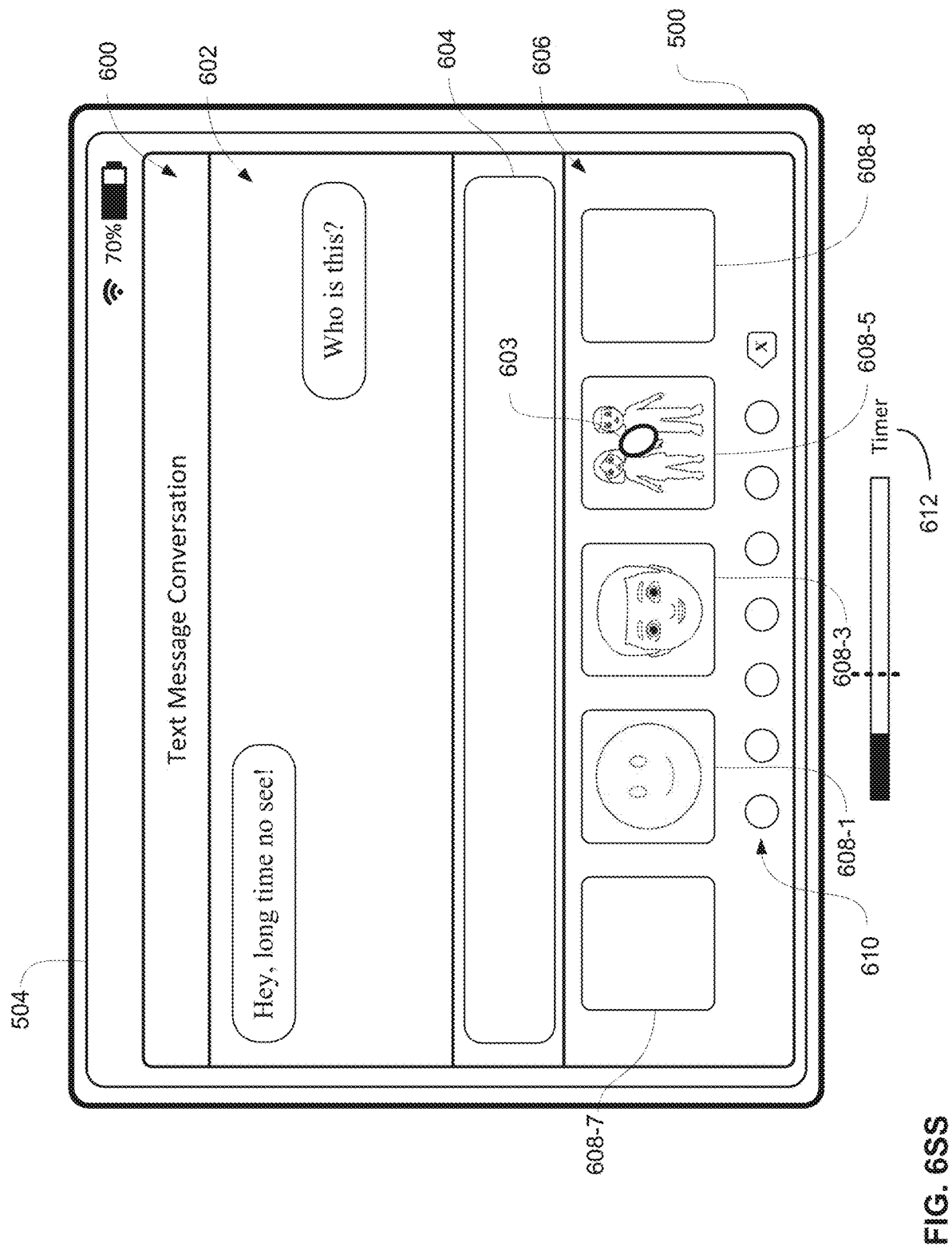
Figure 6T:
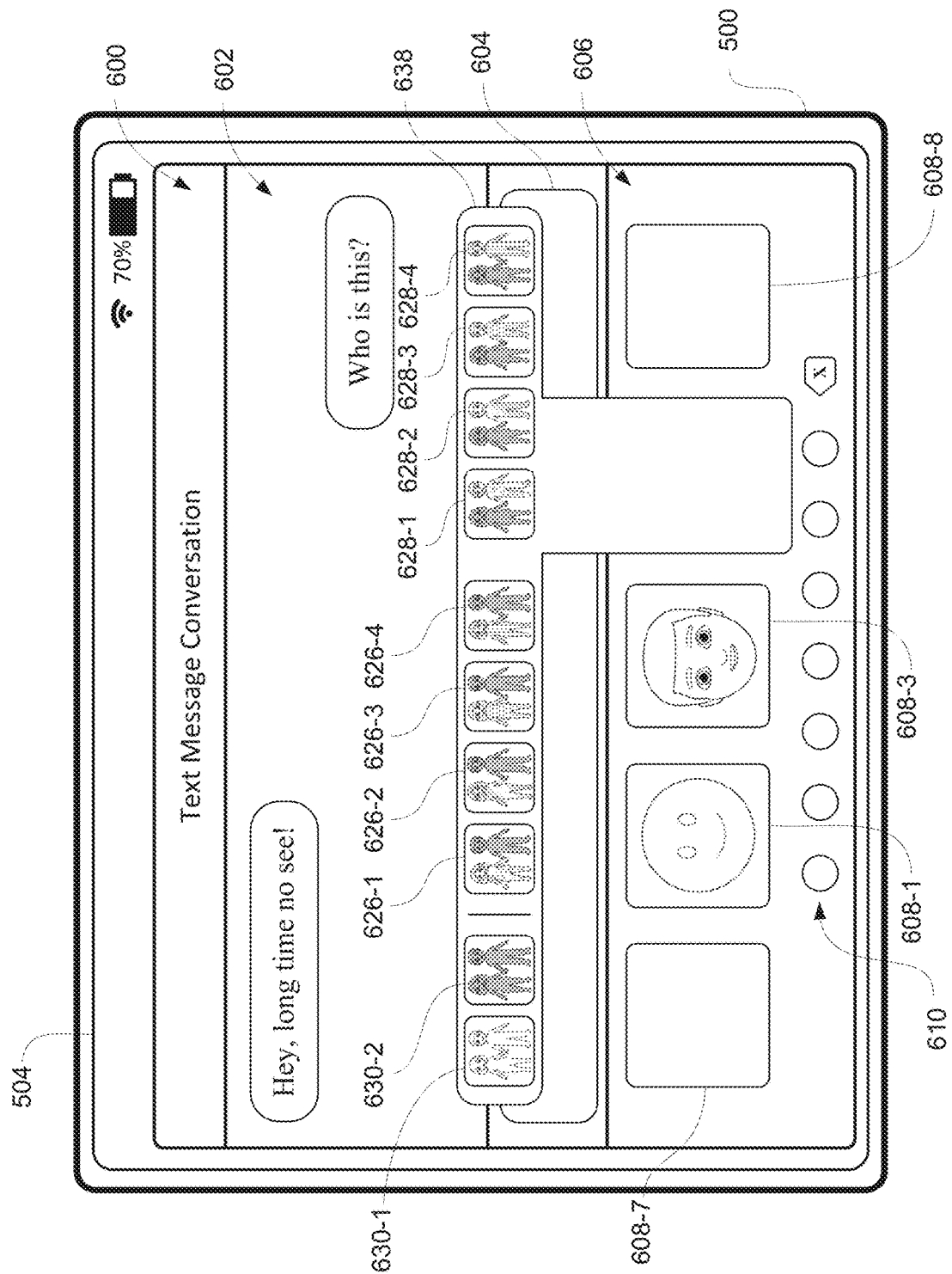
Figure 6U:
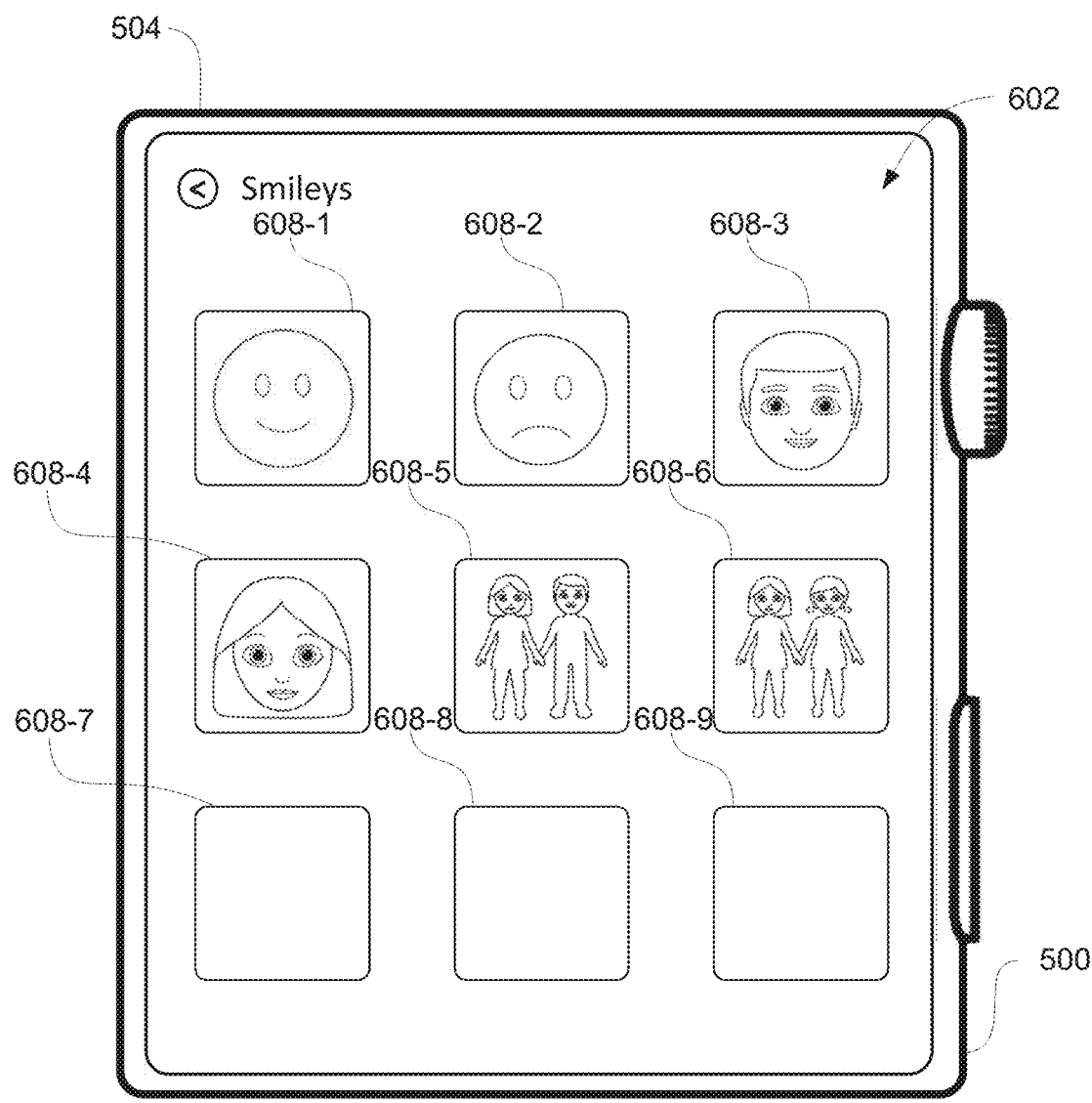
Figure 6V:
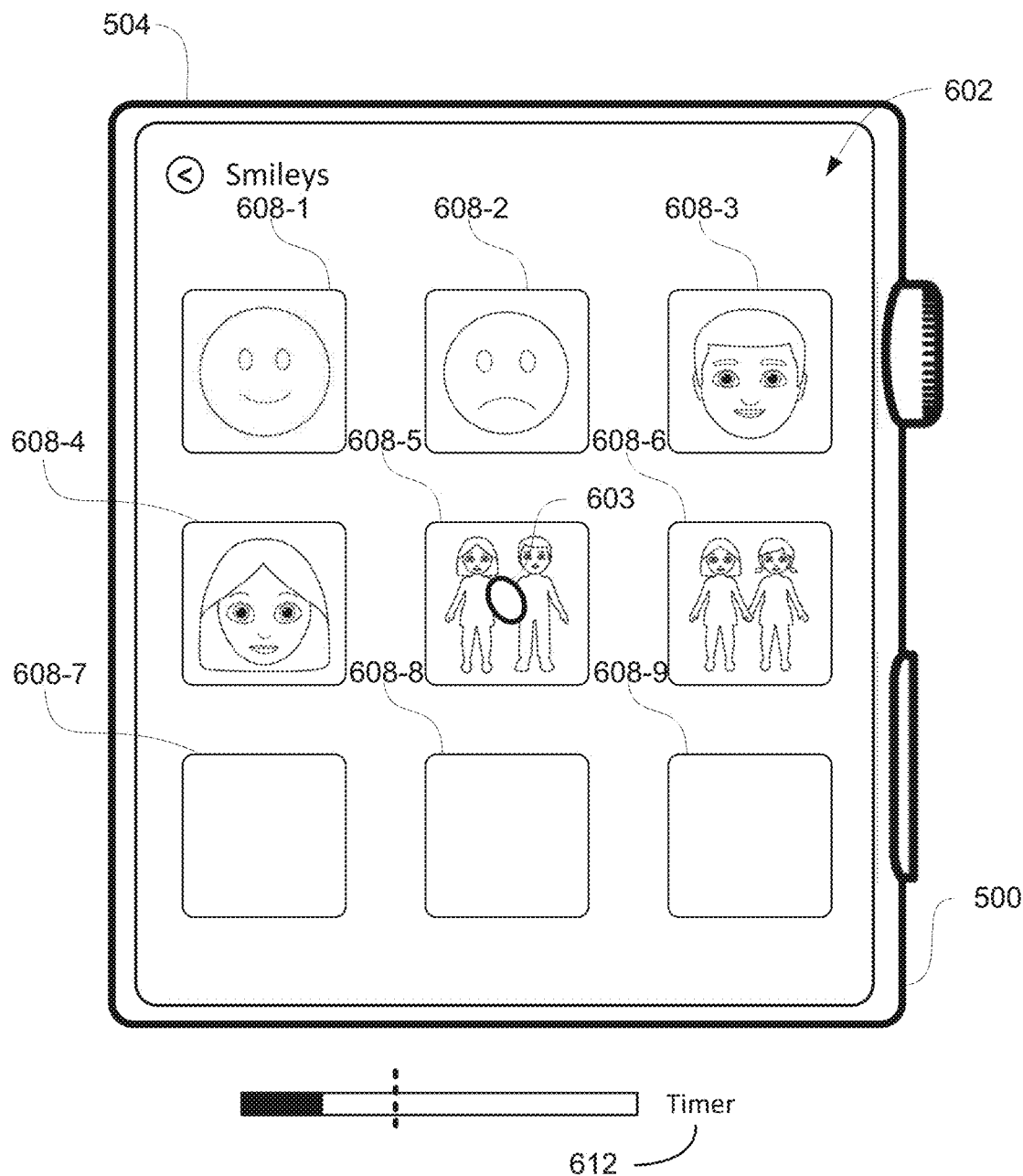
Figure 6W:
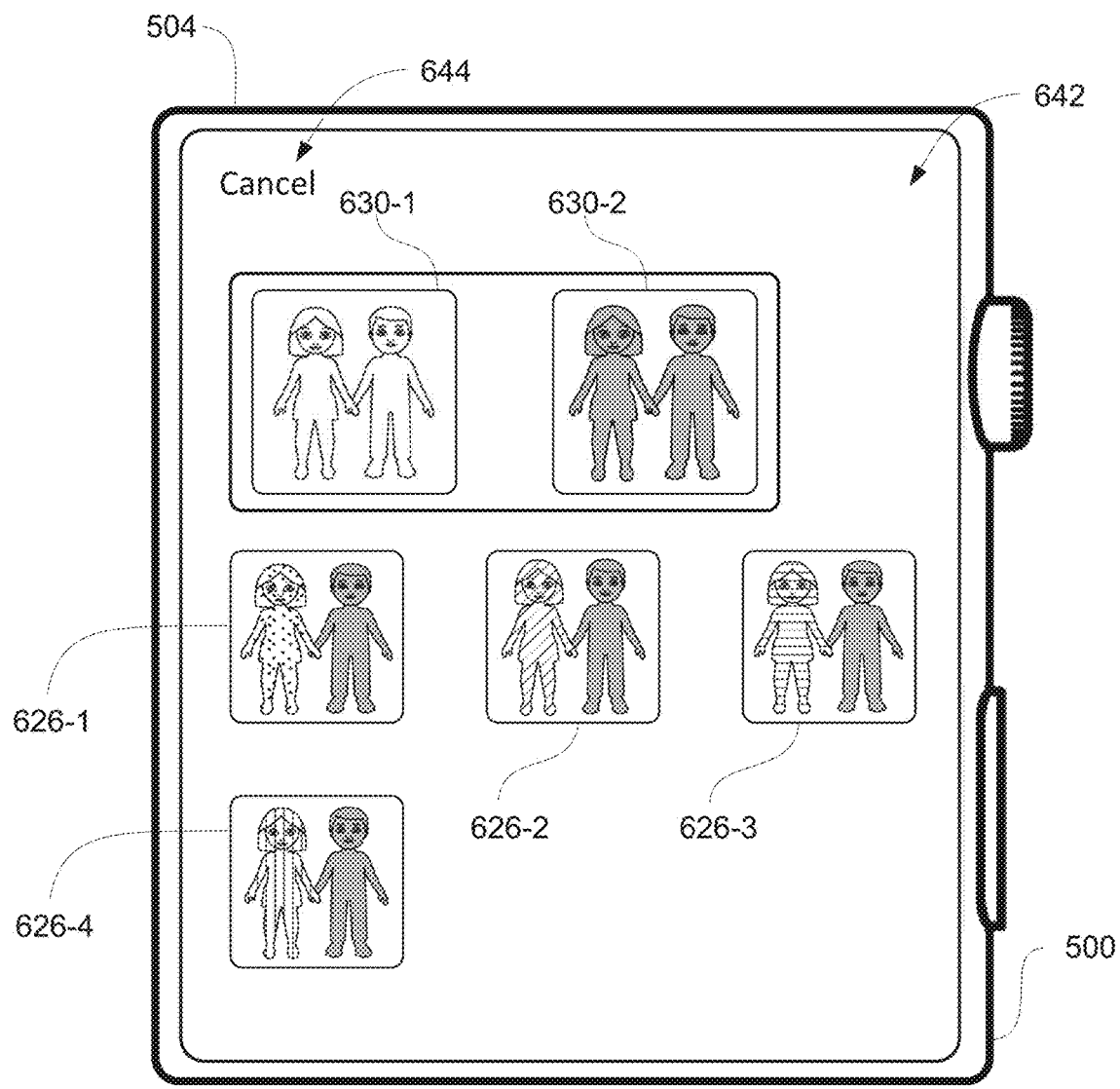
Figure 6X:
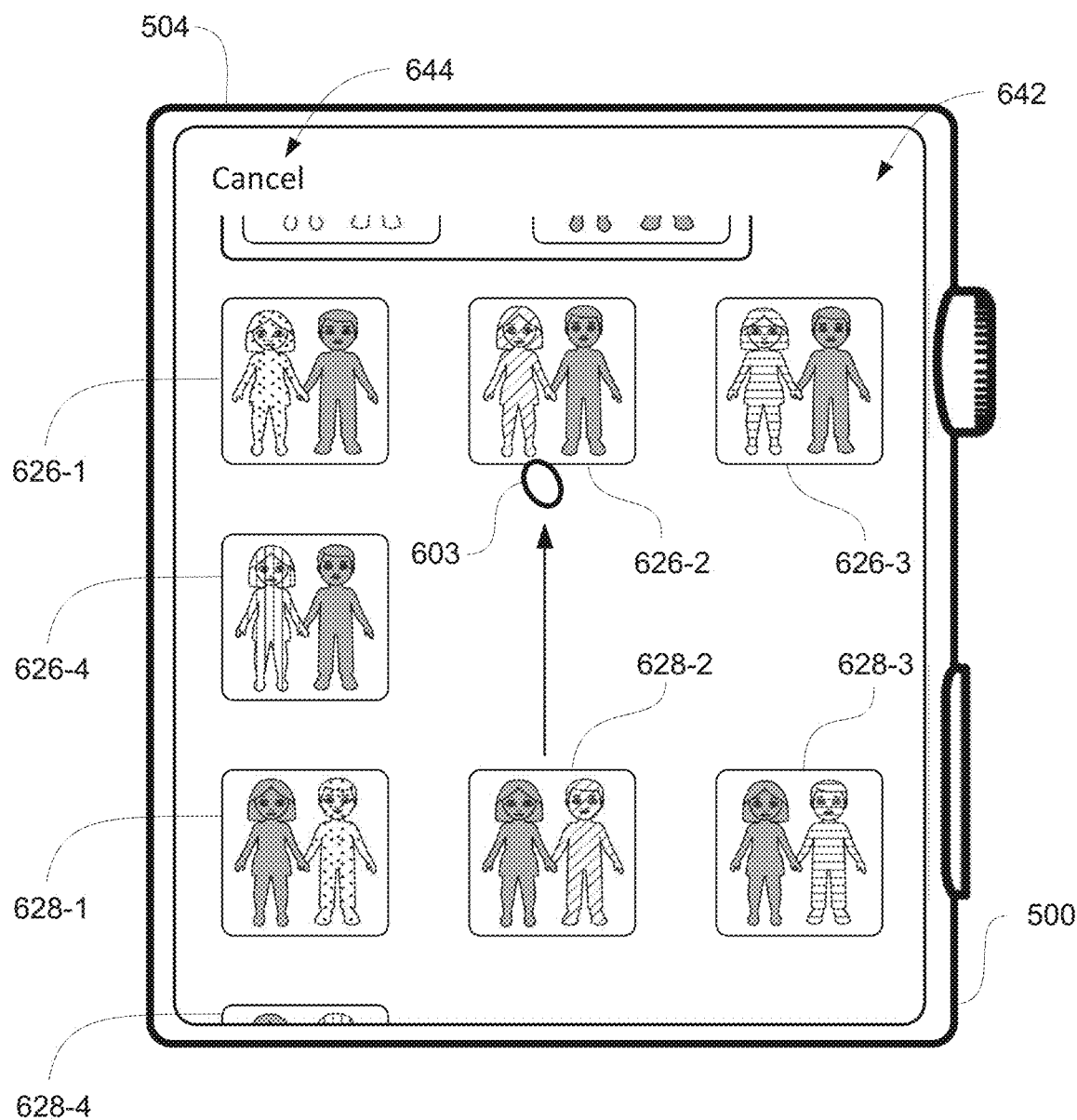
Figure 7B:
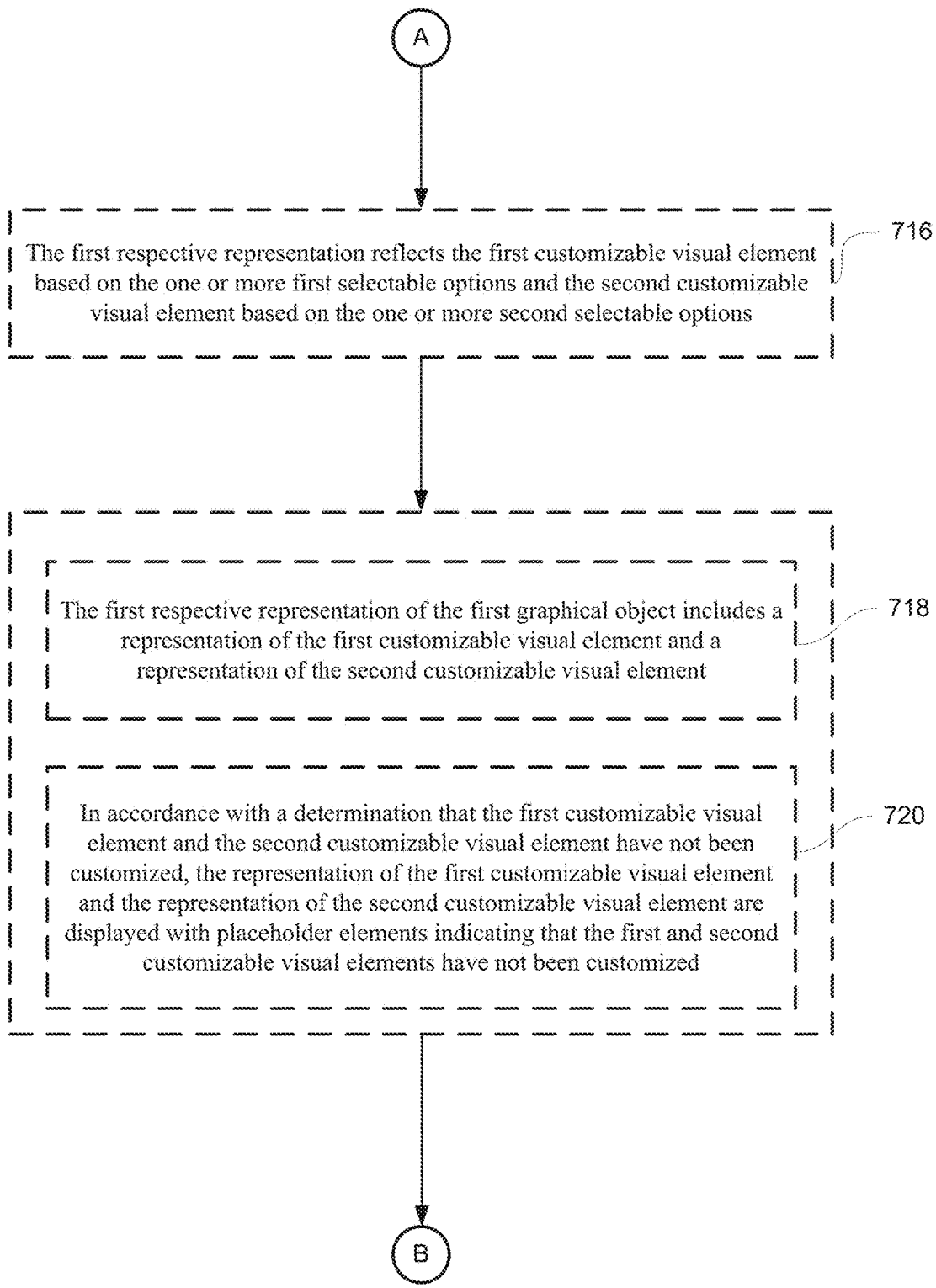
Figure 7C:
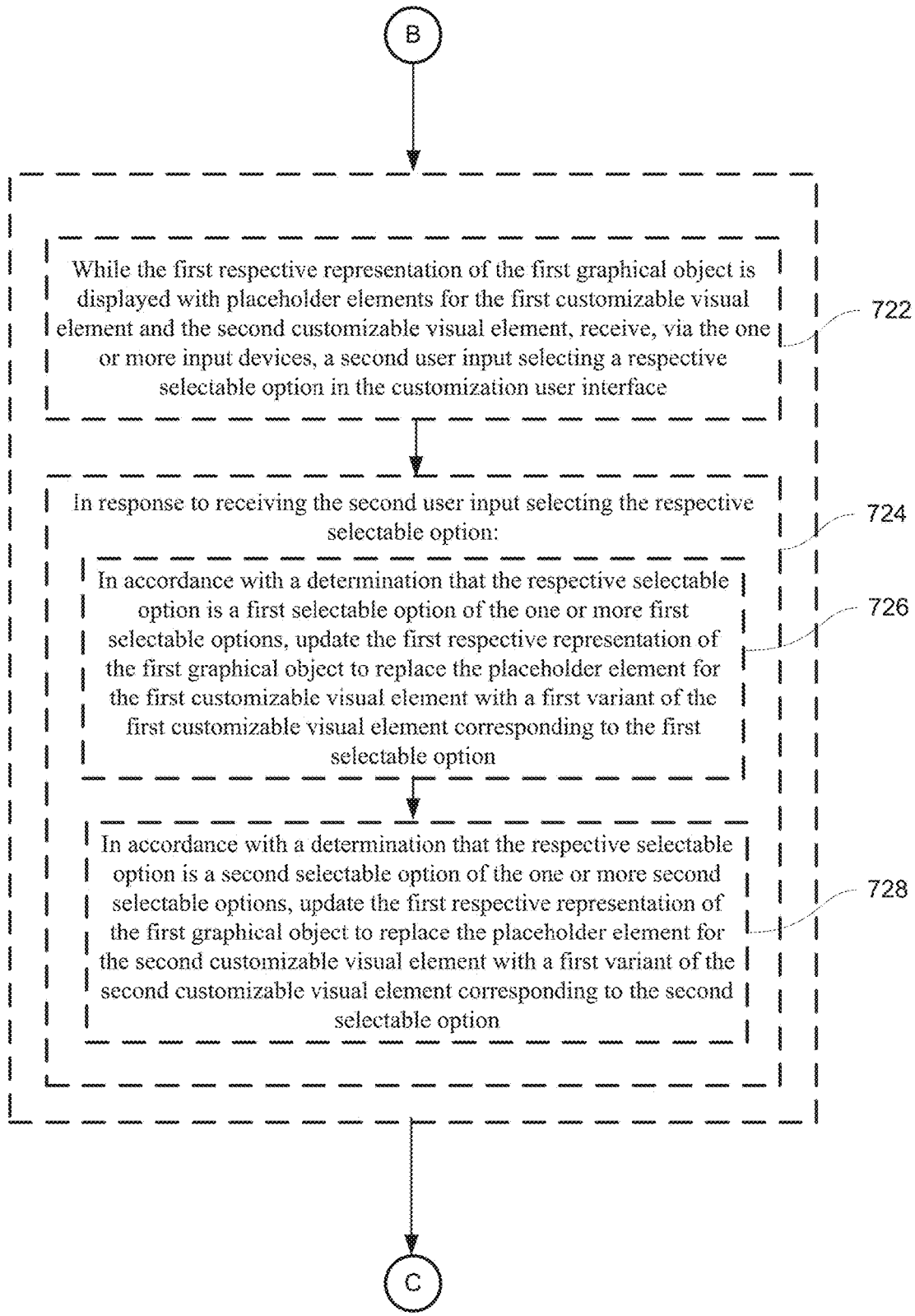
Figure 7D:
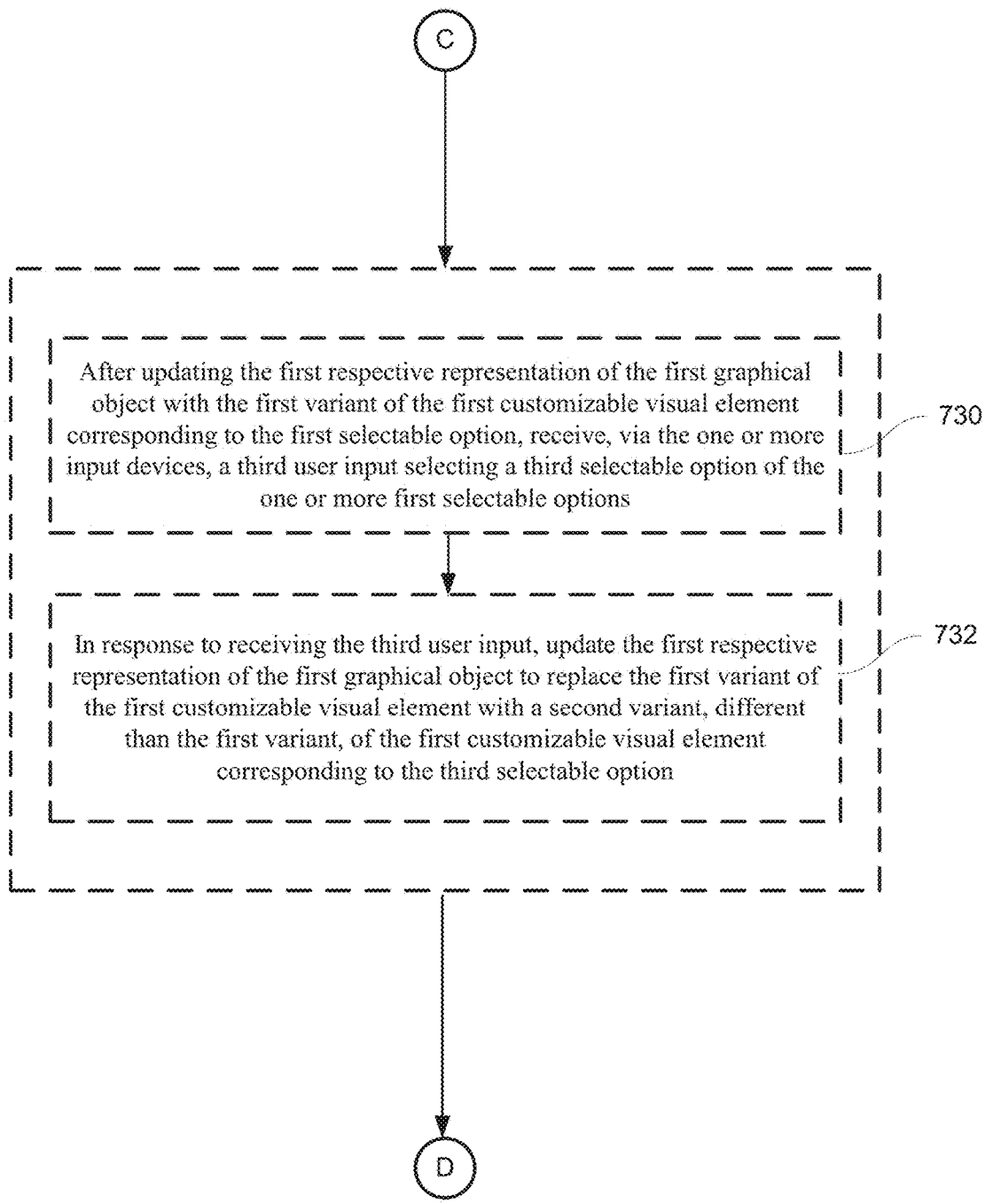
Figure 7E:
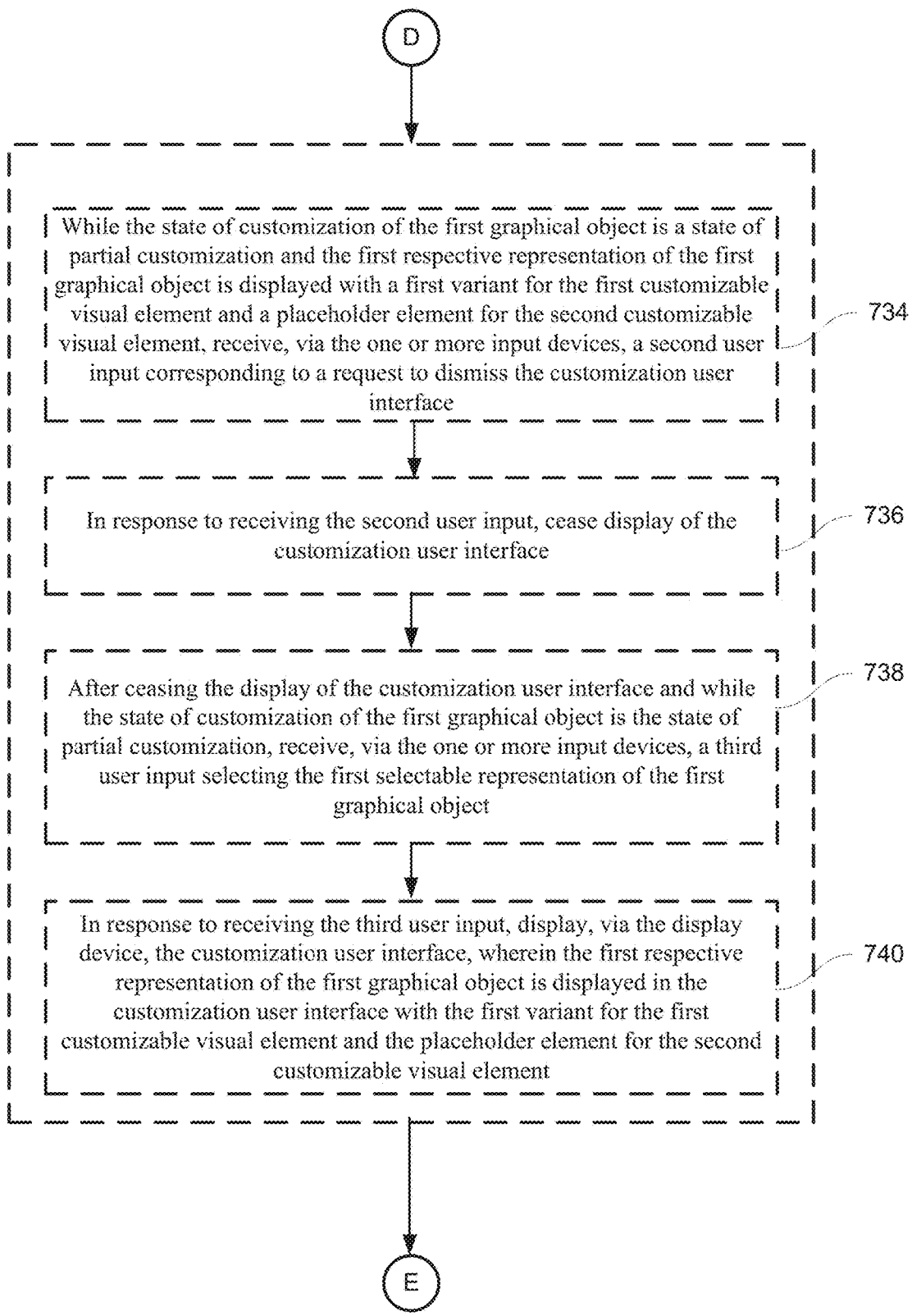
Figure 7F:
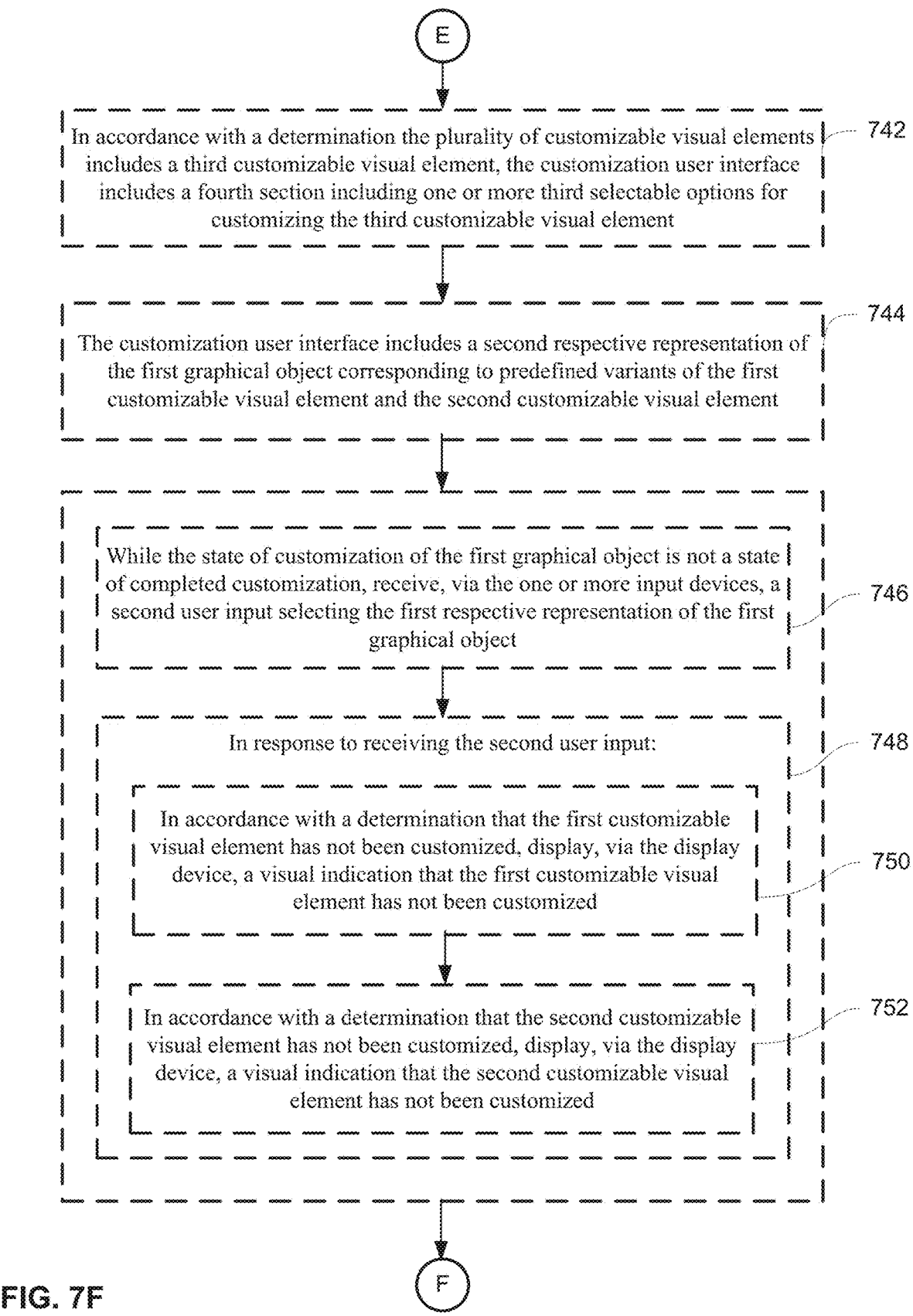
Figure 7G:
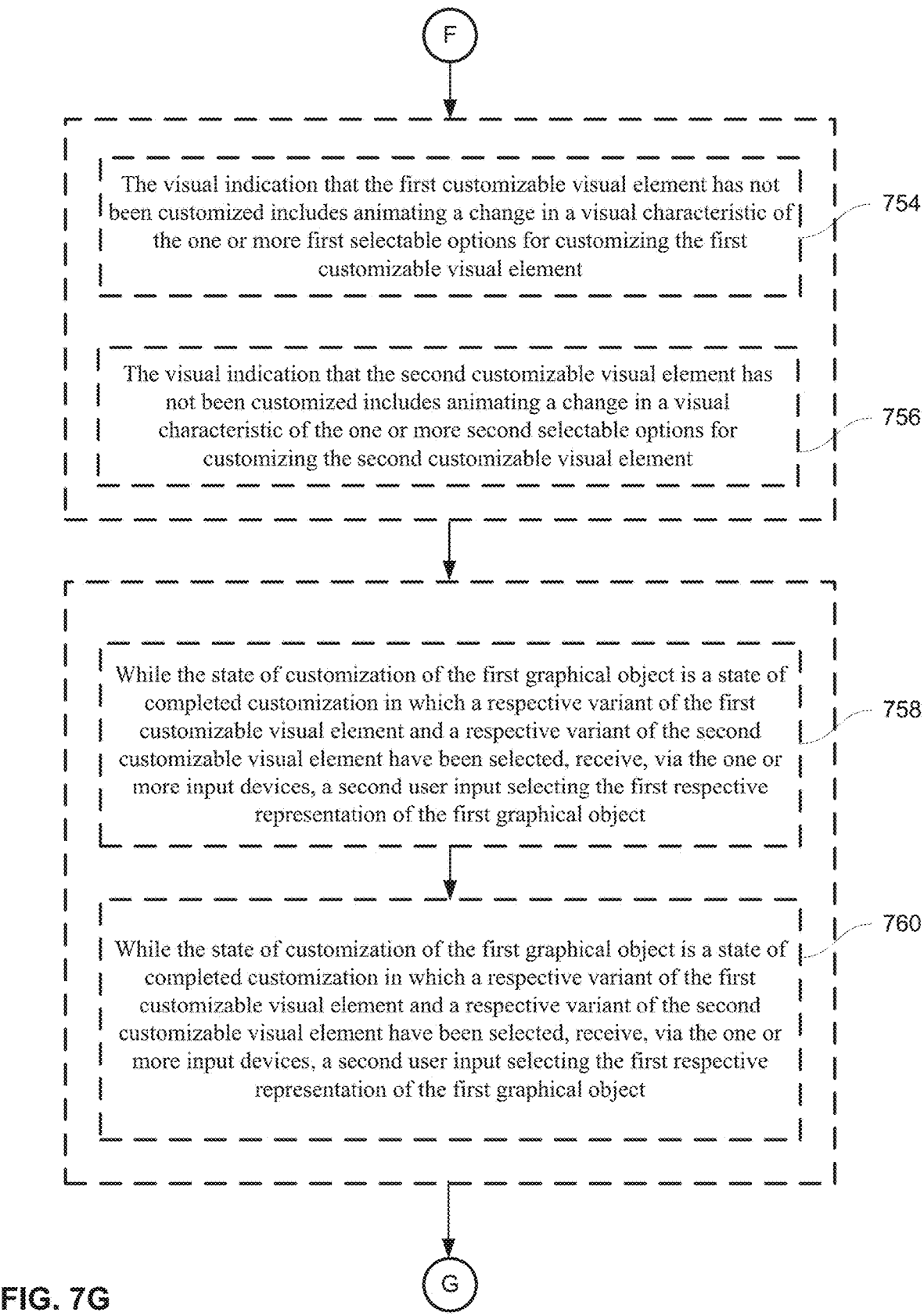
Figure 7H:
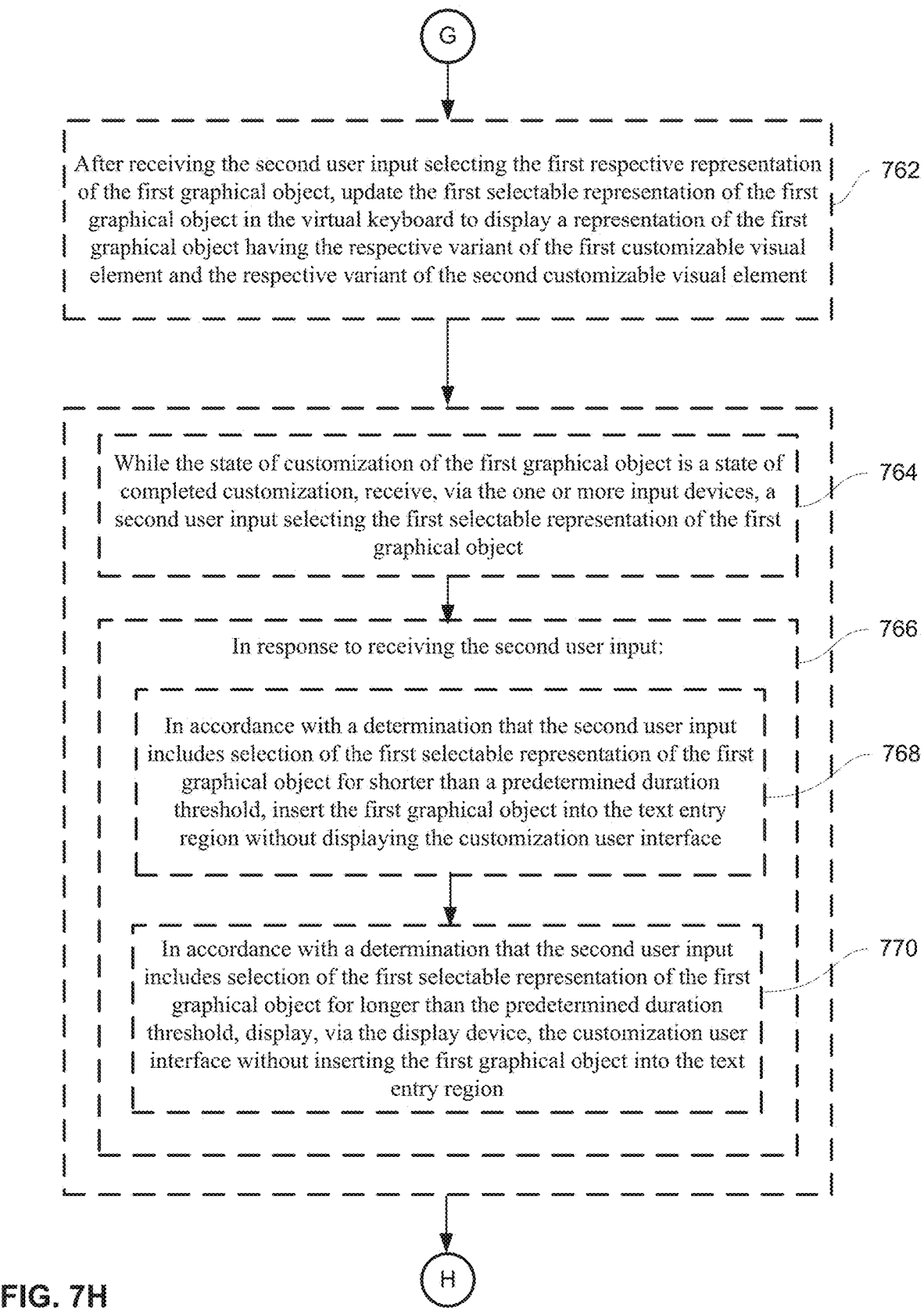
Figure 71:
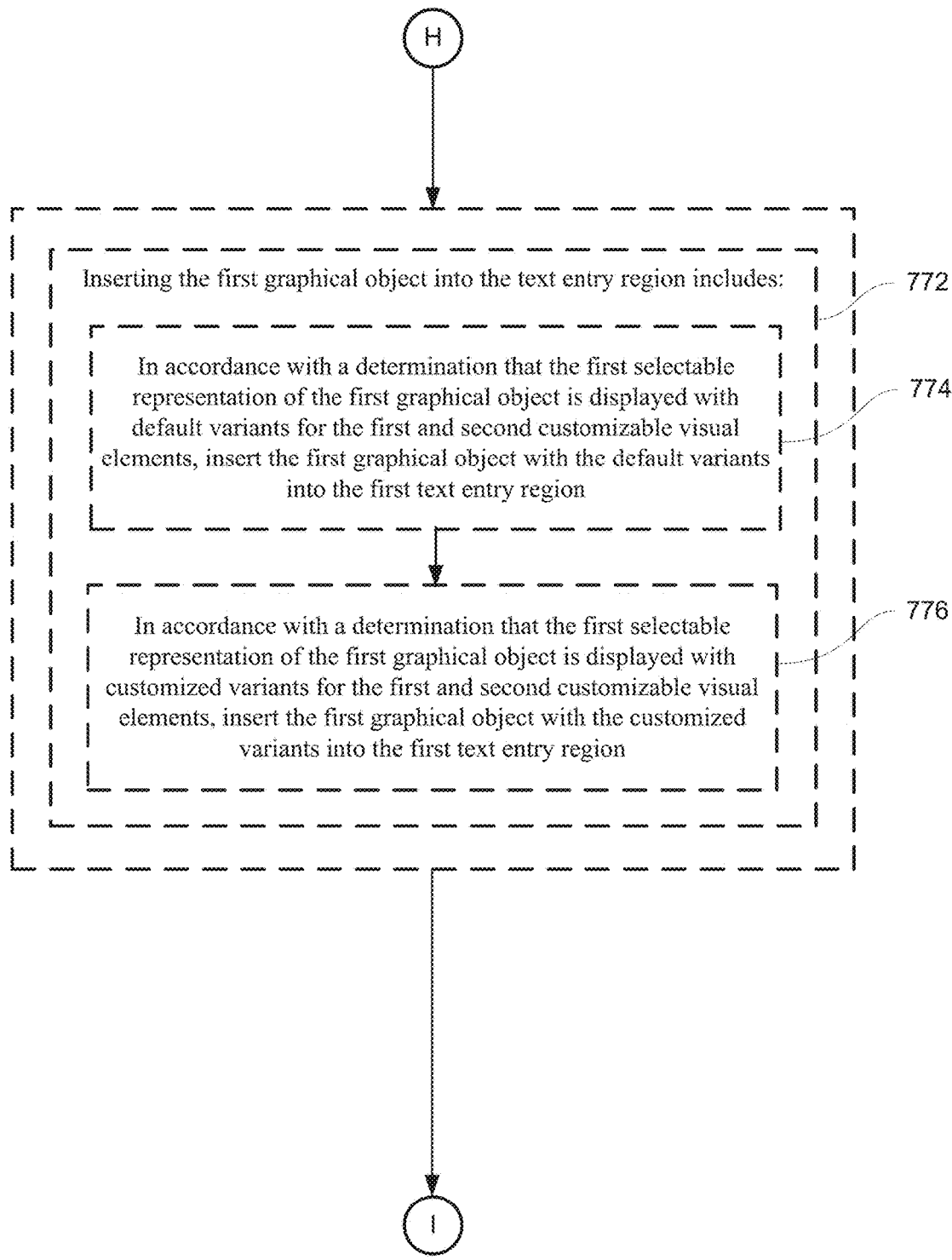
Figure 7J:
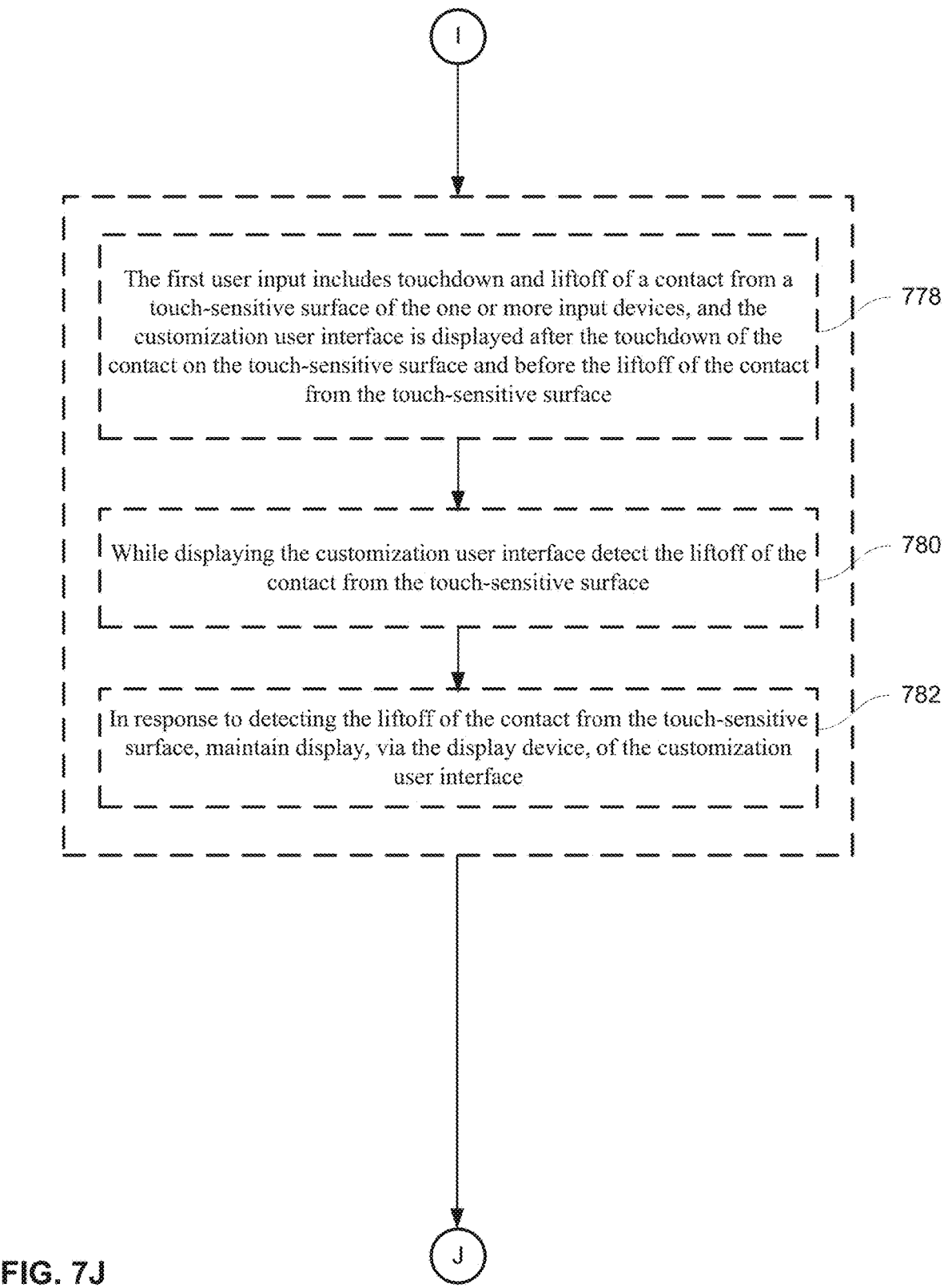
Figure 7K:
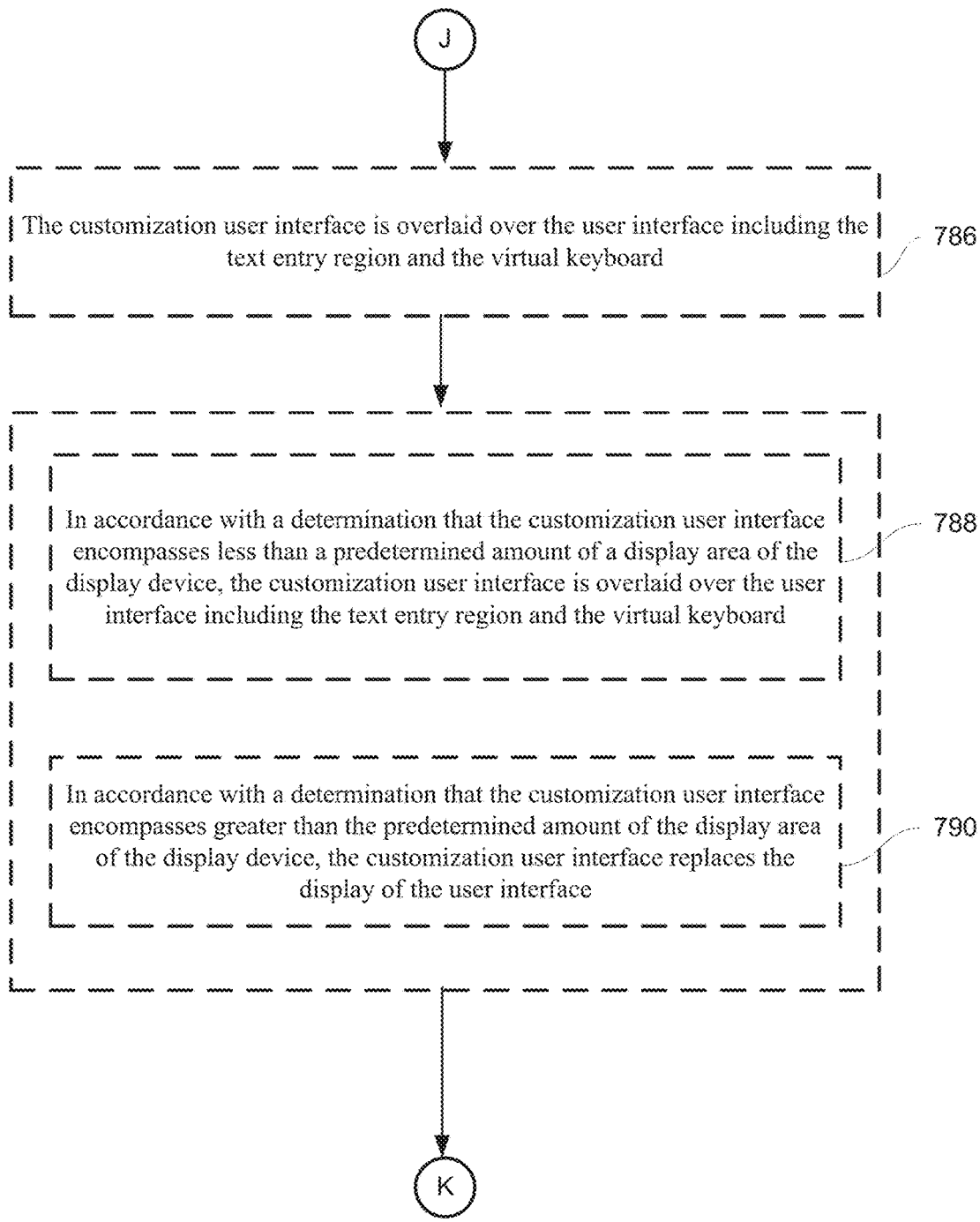
Figure 7L:
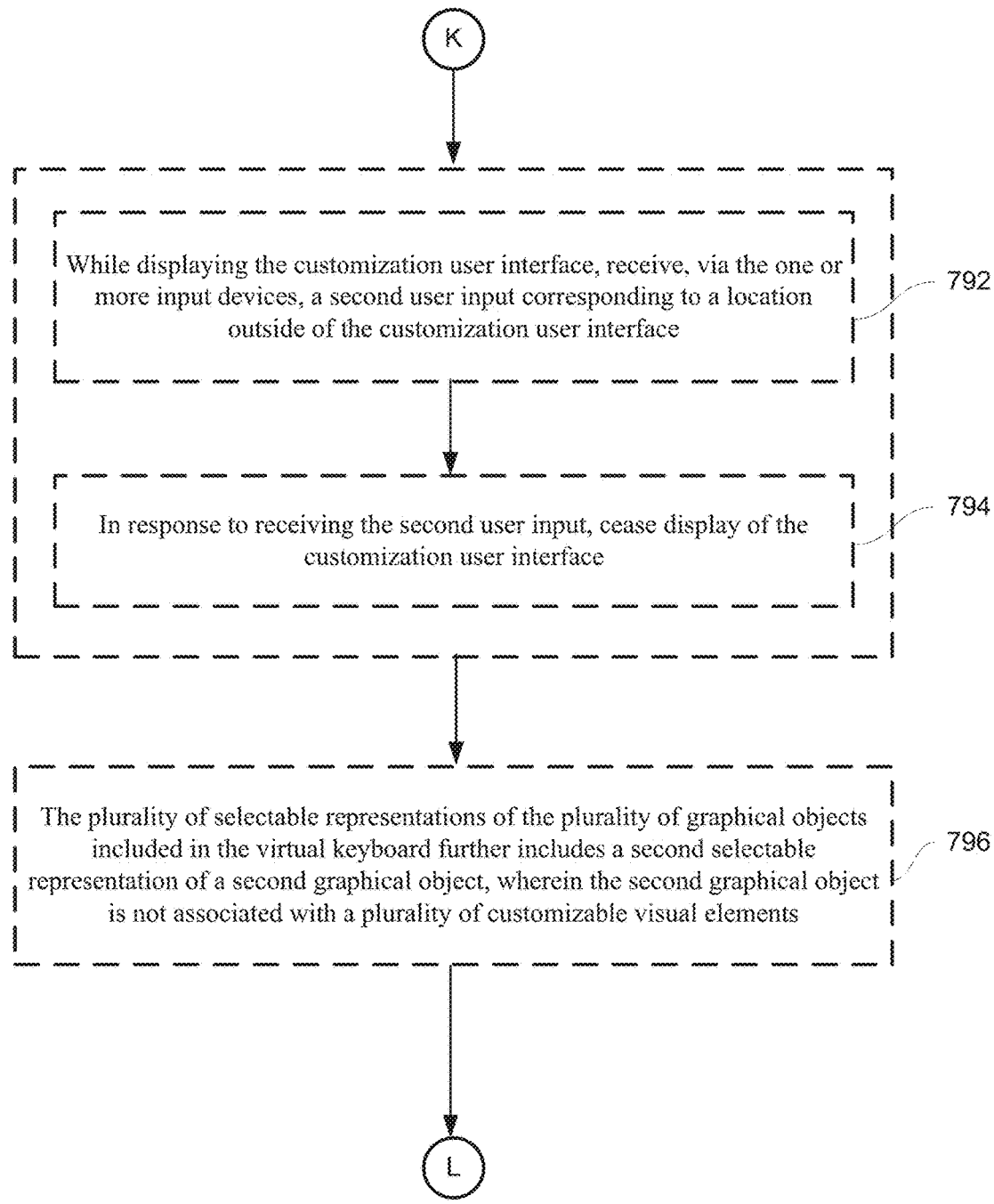
Figure 7M:
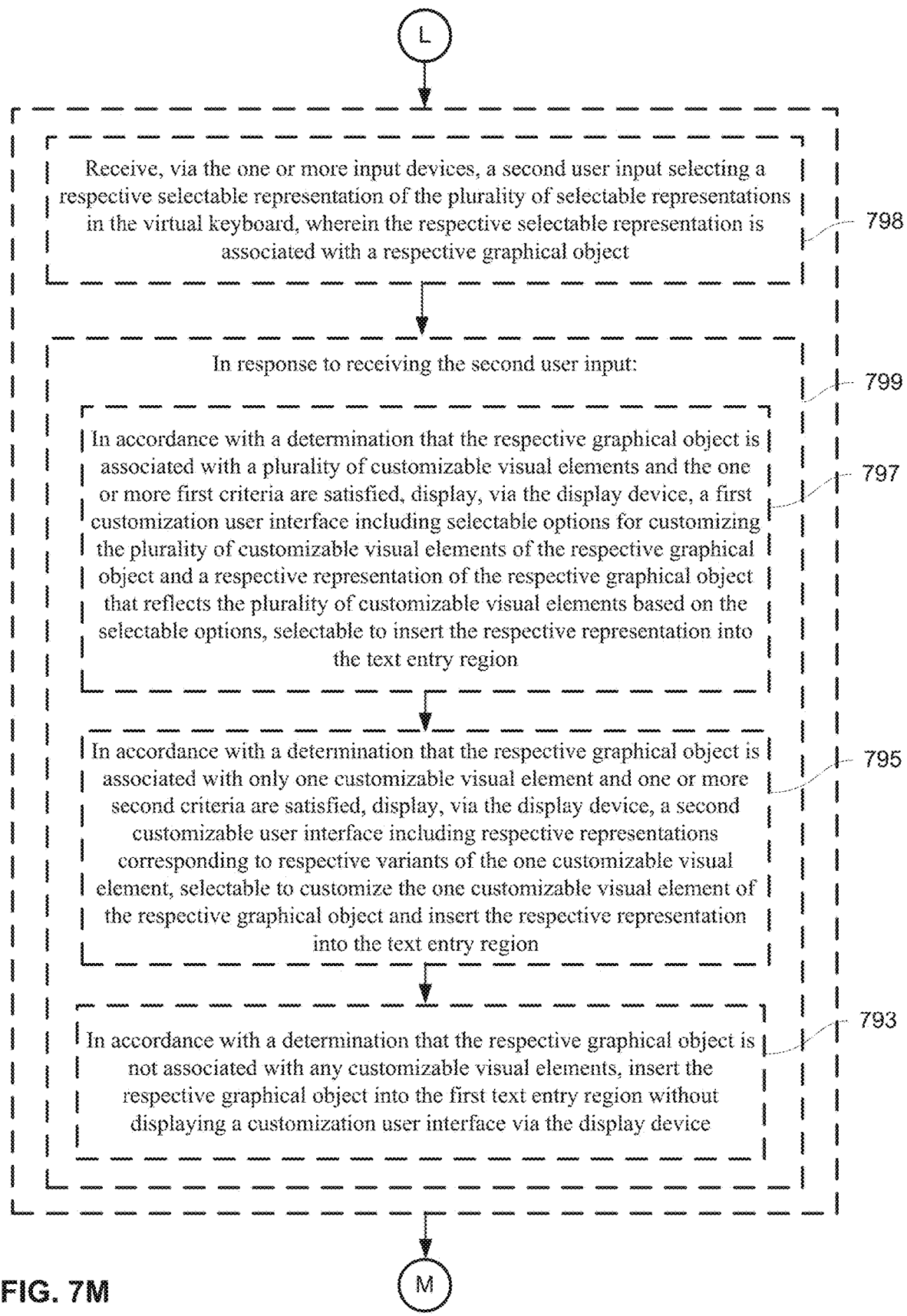

In FIG. 6Z, a touch-down of contact 603 is detected on emoji 608-6. In FIG. 6AA, contact 603 on emoji 608-6 is held for longer than a predetermined threshold duration (e.g., 0.1 seconds, 0.25 seconds, 0.5 seconds, 1 second, 3 seconds, 5 seconds, etc.), as indicated by timer 612. In some embodiments, in response to detecting that contact 603 on emoji 608-6 has been held for longer than the predetermined threshold duration, multi-element customization user interface 624 is displayed, as shown in FIG. 6AA. In FIG. 6BB, contact 603 is detected moving to default variant 630-1 while maintaining contact with the touch screen 504 (e.g., a swipe gesture to default variant 630-1). In some embodiments, lift-off of contact 603 after the swipe gesture moving contact 603 to default variant 630-1 is interpreted as a selection input of default variant 630-1. In some embodiments, in response to detecting the gesture moving contact 603 to default variant 630-1 and lift-off of contact 603 while positioned on default variant 630-1, default variant 630-1 is inserted into text entry region 604 as character 614-7, as shown in FIG. 6CC. In some embodiments, emoji 608-6 on emoji keyboard 606 is updated to display default variant 630-1 (e.g., as the most recently selected variant of emoji 608-6).

In FIG. 6DD, user input 603 is received selecting (e.g., tapping on) emoji 608-6 while emoji 608-6 is displaying default variant 630-1 (e.g., the default emoji coloration for both the left and right person, such as yellow). In some embodiments, in response to user input 603, default variant 630-1 is inserted into text entry region 604 as character 614-8, as shown in FIG. 6EE. Thus, in some embodiments, a user input selecting emoji 608-6 after emoji 608-6 has been fully customized (e.g., the user has, in the past, selected a variant for each of the customizable elements of emoji 608-6, independent of whether the current display state of emoji 608-6 is the default variant or the customized variant), will cause the currently displayed variant to be inserted into the text entry region (e.g., either the default variant or the customized variant). As illustrated above, after customization has been completed for a respective emoji, multi-element customization user interface 624 is optionally displayed for that respective emoji only in response to a long-press user input (e.g., a contact for longer than a predetermined duration threshold). It is understood that each emoji on the emoji keyboard is able to maintain its own state of customization. Thus, whether a respective emoji has been partially or fully customized is specific and unique to the respective emoji and the behavior of the customization user interface is also specific and unique to the respective emoji. For example, completing customization of a first emoji with multiple customizable elements does not change the customization state of a second emoji with multiple customizable elements such that if the second emoji was not customized when the user customized the first emoji, then a customization user interface for the second emoji is still displayed in response to a tap on the second emoji, including placeholder elements on the customized variant of the second emoji.

In some embodiments, other behaviors are possible. For example, in some embodiments, the multi-element customization user interface is always displayed in response to a user input (e.g., a tap), regardless of the state of customization of the respective emoji. In other embodiments, the multi-element customization user interface is only displayed in response to a long-press user input regardless of the state of customization of the respective emoji and selection (e.g., tapping) of an emoji with multiple customizable elements causes insertion of the default variant until the user defines and inserts a different variant (e.g., via the multi-element customization user interface).

FIGS. 6FF-6NN illustrate methods of customizing and inserting emojis with only one customizable element. In FIG. 6FF, user input 603 is detected selecting emoji 608-4 while emoji 608-4 is displayed as variant 622-2 (e.g., the previously selected variant of emoji 608-4). In some embodiments, user input 603 is a contact for less than a predetermined threshold (e.g., 0.1 seconds, 0.25 seconds, 0.5 seconds, 1 second, 3 seconds, 5 seconds, etc.), as illustrated by timer 612. In some embodiments, in response to user input 603, device 500 inserts variant 622-2 of emoji 608-4 (e.g., the previously selected variant of emoji 608-4) into text entry field 604 as character 614-9, as shown in FIG. 6GG.

In FIG. 6HH, touchdown of contact 603 is detected on emoji 608-4 while emoji 608-4 is displayed as variant 622-2. In FIG. 6II, contact 603 on emoji 608-4 is held for longer than a predetermined threshold duration (e.g., 0.1 seconds, 0.25 seconds, 0.5 seconds, 1 second, 3 seconds, 5 seconds, etc.), as indicated by timer 612. In some embodiments, in response to detecting that contact 603 has been held for longer than the predetermined threshold duration, single-element customization user interface 618 is displayed, as shown in FIG. 6II. In FIG. 6JJ, lift-off of contact 603 from touch screen 504 is detected while contact 603 is not positioned over variants 620, 622-1, 622-2 or 622-3. In some embodiments, in response to detecting the lift-off of contact 603, device 500 dismisses display of single-element customization user interface 618 and inserts variant 622-2 of emoji 608-4 (e.g., the previously selected variant of emoji 608-4) into text entry field 604 as character 614-10, as shown in FIG. 6JJ. Thus, in some embodiments, lift-off of contact 603 does not cause display of single-element customization user interface 618 to be maintained.

FIG. 6KK-6LL illustrate touchdown of contact 603 on emoji 608-4 for longer than a predetermined threshold duration (e.g., 0.1 seconds, 0.25 seconds, 0.5 seconds, 1 second, 3 seconds, 5 seconds, etc.) that causes display of single-element customization user interface 618. In FIG. 6MM, contact 603 is detected moving to variant 622-1 while maintaining contact with the touch screen 504 (e.g., a swipe gesture to variant 622-1). In some embodiments, lift-off of contact 603 after the swipe gesture moving contact 603 to variant 622-1 is interpreted as a selection input of variant 622-1. In some embodiments, in response to detecting the gesture moving contact 603 to variant 622-1 and lift-off of contact 603 while positioned over variant 622-1, variant 622-1 is inserted into text entry region 604 as character 614-11, as shown in FIG. 6NN. In some embodiments, emoji 608-4 on emoji keyboard 606 is updated to display variant 622-1 (e.g., as the most recently selected variant of emoji 608-4).

In FIG. 6NN, touchdown of contact 603 is detected over emoji 608-1. In some embodiments, emoji 608-1 is not associated with any customizable elements (e.g., has no customizable elements). In FIG. 6OO, contact 603 on emoji 608-1 is held for longer than a predetermined threshold duration (e.g., 0.1 seconds, 0.25 seconds, 0.5 seconds, 1 second, 3 seconds, 5 seconds, etc.), as indicated by timer 612. In some embodiments, in response to detecting that contact 603 has been held for longer than the predetermined threshold duration, device 500 does not display a customization user interface or insert emoji 608-1 into text entry region 604. In some embodiments, an overlay is displayed with a preview of emoji 608-1 (e.g., a larger preview than is shown in virtual keyboard 606) in response to contact being held for longer than the predetermined threshold (e.g., optionally for as long as contact 603 is held). In FIG. 6PP, lift-off of contact 603 from touch screen 504 is detected. In some embodiments, in response to detecting the lift-off of contact 603, device 500 inserts emoji 608-1 into text-entry region 604 as character 614-12, as shown in FIG. 6PP. Thus, in some embodiments, a short tap and long press on an emoji that does not have any customizable elements does not cause display of a customization user interface and optionally inserts the emoji into the text entry region.

FIG. 6QQ illustrates an embodiment of a multi-element customization user interface 624 of an emoji with three customizable elements. In the embodiment displayed in FIG. 6QQ, emoji 608-6 has three customizable elements: the skin tone for the left person, the skin tone for the right person, and a hat accessory for the left person. In some embodiments, as shown in FIG. 6QQ, multi-element customization user interface 624 includes three rows of variants for customizing emoji 606-8. In some embodiments, the first row includes variants 626-1 to 626-4 of emoji 608-4 corresponding to variants of the first customizable element (e.g., similar to the first row of variants described above). In some embodiments, the second row includes variants 628-1 to 628-4 of emoji 608-4 corresponding to the second customizable element (e.g., similar to the second row of variants described above). In some embodiments, the third row includes variants 636-1 to 636-4 of emoji 608-4 corresponding to the third customizable element. In some embodiments, the third customizable element is an optional element. For example, as illustrated by variant 636-1, a user is able to select variant 636-1 to not include a hat for the left person of emoji 608-4. In some embodiments, variants 636-2 to 636-4 correspond to different hat options for the left person of emoji 608-4. Similarly to variants 626-1 to 626-4 and 628-1 to 628-4, the left and right person in variants 636-1 to 636-4 are displayed with placeholder appearances (e.g., grey) to indicate that the left and right people are not customizable via variants 636-1 to 636-4. In some embodiments, a fourth row includes default variant 630-1 and customized variant 630-2 (e.g., similar to default variant 630-1 and customized variant 630-2 described above). Thus, multi-element customization user interface 624 optionally includes any number of sections based on the number of customizable elements for the respective emoji. It is understood that emoji 608-4 optionally has any number of customizable elements, such as accessory options for the right person. The user is able to customize/insert/etc. the multi-element emoji in the same ways described above with reference to FIGS. 6E-6EE.

FIGS. 6RR-66TT illustrate an embodiment of a multi-element customization user interface 624 that extends horizontally in one row (e.g., when device 500 is in landscape mode and/or the touch sensitive display is only able to support one or a limited number of rows of content). In FIG. 6RR, device 500 is displaying user interface 600 in landscape mode with conversation region 602, text entry field 604, and emoji keyboard 606. It is understood that emoji keyboard 606 is displayed in FIG. 6RR with a single row of emojis as merely exemplary and any number of rows is possible. In some embodiments, emoji keyboard includes five emojis 608-1, 608-3, 608-5, 608-7, and 608-8.

In FIG. 6SS, user input 603 is received selecting emoji 608-5. In some embodiments, user input 603 is a contact for less than a predetermined threshold (e.g., 0.1 seconds, 0.25 seconds, 0.5 seconds, 1 second, 3 seconds, 5 seconds, etc.), as illustrated by timer 612. In the embodiment illustrated in FIG. 6SS, emoji 608-5 has two customizable elements (e.g., the skin tone of the left person and the skin tone of the right person) and has not yet been customized. In response to user input 603, device 500 displays multi-element customization user interface 638, as shown in FIG. 6TT. In some embodiments, multi-element customization user interface 638 is the multi-element customization user interface used when device 500 is in landscape mode. As shown in FIG. 6TT, multi-element customization user interface 638 includes a single row of selectable options. In some embodiments, the single row includes default variant 630-1 and customized variant 630-2 (e.g., similar to default variant 630-1 and customized variant 630-2 described above), variants 626-1 to 626-4 for customizing the first customizable element and variants 628-1 to 628-4 for customizing the second customizable element. In some embodiments, the multi-element customization user interface is divided into three sections: one section each for the variants of the two customizable elements, and one section for the variants for inserting the emoji into the text entry region (e.g., default variant and customized variant). In some embodiments, the sections are divided with a visual divider (e.g., a bar) and/or are divided by whitespace. In some embodiments, variants 626-1 to 626-4, 628-1 to 628-4 and default variant 630-1 and customized variant 630-2 behave similarly to the corresponding variants described above.

FIGS. 6UU-6XX illustrate an embodiment of a multi-element customization user interface 624 when the multi-element customization user interface is displayed in full-screen mode. In some embodiments, device 500 is a wearable device and has a touch screen 504. In some embodiments, touch screen 504 has limited screen space. In some embodiments, elements displayed on the user interface are large in relation to the size of the display (e.g., due to the display being small). In FIG. 6UU, device 500 is displaying emoji keyboard 602 (e.g., a virtual keyboard displaying an emoji selection page). Thus, in some embodiments, emoji keyboard 602 is displayed in a full-screen mode (e.g., instead of concurrently with the text entry region and/or any other user interface element). In some embodiments, selection of an emoji on emoji keyboard 602 causes insertion of the respective emoji into a text entry region and dismissal of the emoji keyboard (e.g., and optionally displays the user interface that was displayed before emoji keyboard 602 was displayed). In FIG. 6UU, emoji keyboard 602 includes nine emojis 608-1 to 608-9.

In FIG. 6VV, user input 603 is received selecting (e.g., tapping on) emoji 608-5. In the embodiment illustrated in FIG. 6VV, emoji 608-5 has two customizable elements and has not been customized yet. In some embodiments, in response to user input 603, device 500 displays multi-element customization user interface 642, as shown in FIG. 6WW. In some embodiments, multi-element customization user interface 642 is displayed in full-screen mode and replaces display of virtual keyboard 602 (e.g., not as an overlay). In some embodiments, multi-element customization user interface 642 includes selectable option 644 that is selectable to dismiss multi-element customization user interface 642 and return to the user interface that was displayed before multi-element user interface was displayed (e.g., emoji keyboard 602). In some embodiments, multi-element customization user interface 642 includes three sections of selectable options (e.g., similar to multi-element customization user interface 624 described above). In some embodiments, the first section includes default variant 630-1 and custom variant 630-2. In some embodiments, the second section includes variants 626-1 to 626-4 for customizing the first customizable element. In some embodiments, the second section includes variants 628-1 to 628-4 (not shown) for customizing the second customizable element. In some embodiments, variants 630-1, 630-2, 626-1 to 626-4 and 628-1 to 628-4 behave similarly to the variants described above.

In some embodiments, multi-element customization user interface 642 is scrollable. For example, FIG. 6XX illustrates user input 603 corresponding to an upward swipe gesture to scroll the user interface upwards. In some embodiments, in response to user input 603, multi-element customization user interface 642 is scrolled upwards to reveal the third section including variants 628-1 to 628-4 for customizing the second customizable element. In some embodiments, turning the dial (e.g., crown) of the wearable device is also interpreted as an upward scrolling input. In some embodiments, selection of default variant 630-1 or custom variant 630-2 (if customization is complete) causes dismissal of the multi-element customization user interface 642, display of the user interface that was displayed before emoji keyboard 602 was displayed (e.g., the user interface in which the emoji will be inserted), and insertion of the respective variant into a text entry region in the user interface. In some embodiments, selection of default variant 630-1 or custom variant 630-2 (if customization is complete) causes dismissal of the multi-element customization user interface 642 and display of the emoji keyboard 602 with the respective emoji updated to display the selected variant (e.g., which is then selectable to insert the respective variant into the text entry region).

FIGS. 7A-7M are flow diagrams illustrating a method of presenting a customization user interface for customizing and inserting emojis. The method 700 is optionally performed at an electronic device such as device 100, device 300, and device 500, as described above with reference to FIGS. 1A-1B, 2-3, 4A-4B and 5A-5H. Some operations in method 700 are, optionally combined and/or order of some operations is, optionally, changed.

As described below, the method 700 provides ways to present customization user interfaces for customizing and inserting graphical objects such as emojis. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with a display device and one or more input devices (e.g., an electronic device, a mobile device (e.g., a tablet, a smartphone, a media player, or a wearable device) including a touch screen, or a computer including a touch screen, such as device 100, device 300, or device 500) displays (702), in a user interface via the display device, a text entry region and a virtual keyboard, wherein the virtual keyboard includes a plurality of selectable representations of a plurality of graphical objects, such as user interface 600 in FIG. 6A (e.g., a virtual keyboard that is displaying an emoji keyboard). In some embodiments, the user interface is any user interface in which a user can enter text using a virtual keyboard. In some examples, the emoji keyboard displays a plurality of emojis that are selectable to insert the selected emoji into the text entry region. In some embodiments, the emoji keyboard includes a plurality of categories of emojis.

In some embodiments, the electronic devices receives (704), via the one or more input devices, a first user input selecting a first selectable representation of a first graphical object of the plurality of representations of graphical objects (e.g., a tap, long press, or any other suitable selection input on the first emoji on the emoji keyboard), wherein the first graphical object is associated with a plurality of customizable visual elements, including a first customizable visual element and a second customizable visual element, such as user input 603 in FIG. 6E (e.g., the first emoji includes a plurality of customizable elements). In some embodiments, the first user input corresponds to a request to insert the first emoji into the text entry region. In some embodiments, the first user input corresponds to a request to customize the first emoji, as will be described below. In some embodiments, the first emoji optionally includes multiple people (such as group emojis, "family" emojis, etc.) and each person in the emoji is a customizable element. In some embodiments, the skin tone of each person in a multi-person emoji is individually customizable. In some embodiments, the first emoji includes customizable accessories (e.g., hat type, hat color, etc.). In some examples, a user is able to select a customization option for each customizable element.

In some embodiments, in response to receiving the first user input (706), in accordance with a determination that one or more first criteria are satisfied (e.g., if the one or more first criteria are satisfied, a customization user interface is displayed for the user to customize the elements of the first emoji), the electronic device displays (708), via the display device, a customization user interface, such as multi-element customization user interface 624 in FIG. 6F (e.g., displaying a user interface for customizing the customizable elements of the first emoji).

In some embodiments, if the one or more first criteria are not satisfied, the customization user interface is not displayed. In some embodiments, the customization user interface is displayed regardless of the one or more first criteria being satisfied. In some embodiments, if the one or more first criteria are not satisfied, the first emoji is inserted into the text entry region. In some embodiments, the one or more first criteria are satisfied if the user has not previously completed customization of the first emoji. In some embodiments, the one or more first criteria are satisfied if the user input is a long press (e.g., a touch-down and continued contact with a duration longer than a predetermined threshold, such as 0.1 seconds, 0.25 seconds, 0.5 seconds, 1 second, 3 seconds, 5 seconds, etc.). In some embodiments, the one or more first criteria are not satisfied if the user has previously completed customization of the first emoji (e.g., selected a customization option for each customizable element) or optionally if the user has previously selected and inserted a default variant of the first emoji into the text entry field. In some embodiments, the one or more first criteria are not satisfied if the first emoji is not a customizable emoji or not an emoji with multiple customizable elements (e.g., an emoji with only a single customizable element). In some embodiments, the customization user interface is a user interface element that is overlaid over the elements of the user interface that were displayed before the customization user interface was displayed (e.g., a pop-up user interface). In some embodiments, the customization user interface is a full-screen user interface. In some embodiments, the customization user interface is dismissible to display the user interface that was displayed before the customizable user interface was displayed.

In some embodiments, the customization user interface includes: a first section including one or more first selectable options for customizing the first customizable visual element (710), such as variants 626-1 to 626-4 in FIG. 6F (e.g., a first row that displays one or more variants for the first customizable visual element), a second section including one or more second selectable options for customizing the second customizable visual element (712), such as variants 628-1 to 628-4 in FIG. 6F (e.g., a second row that displays one or more variants for the second customizable visual element), and a third section for displaying a first respective representation of the first graphical object that indicates a current state of customization of the first graphical object (714), such as customized variant 630-2 in FIG. 6F (e.g., a third row that displays a representation of current state of customization of the emoji).

In some examples, the selectable options in the first row are a visual preview of the respective variant for the first customizable visual element. In some examples, the visual elements that are not customizable by the first selectable options are displayed with a different visual characteristic than the visual elements that are customizable by the first selectable options. For example, if the first emoji is a group emoji (e.g., two-person emoji), then the first section is optionally for customizing the left person. In such examples, the selectable options in the first section are optionally displayed with the right person having a placeholder appearance (e.g., greyed out to indicate that the first section is not for customizing the right person) and the left person is displayed with the respective variant. For example, the first section optionally includes one or more skin tone options for the left person. In some examples, the selectable options in the second row are a visual preview of the respective variant for the second customizable visual element. In some examples, the visual elements that are not customizable by the second selectable options are displayed with a different visual characteristic than the visual elements that are customizable by the second selectable options. For example, if the first emoji is a group emoji (e.g., two-person emoji), then the second section is optionally for customizing the right person. In such examples, the selectable options in the second section are optionally displayed with the left person having a placeholder appearance (e.g., greyed out to indicate that the second section is not for customizing the left person) and the right person is displayed with the respective variant. For example, the second section optionally includes one or more skin tone options for the right person. In some embodiments, if the emoji has not yet been customized, then the representation of the current state of customization indicates that the emoji has not been customized. For example, the representation can be displayed with a different visual characteristic than if the emoji has been partially or fully customized. In some embodiments, the representation is displayed with the visual elements having placeholder appearances (e.g., grey). In some embodiments, an uncustomized emoji is not selectable to insert the emoji into the text entry region. In some embodiments, the three sections are displayed as separate rows on the customization user interface. In some embodiments, the three sections are displayed in a single row, but visually separated (e.g., by whitespace or by a delineation marker).

The above-described manner of providing a customization user interface for an emoji with multiple customizable components (e.g., by receiving a user selection of an emoji on an emoji keyboard and if the emoji has not yet been customized, displaying a customization user interface with different sections to select options for each customizable component of the emoji) provides a quick and efficient manner of customizing the selected emoji when the user has shown a desire to insert the emoji (e.g., by presenting the user with customization options for each customizable component of the selected emoji), which simplifies the interaction between the user and the electronic device and enhances the operability of the electronic device and makes the user-device interface more efficient (e.g., by allowing the user to see the available options for each customizable component, see the current state of customization of the emoji, and select the desired customization options without requiring the user to navigate to a separate user interface to customize the components of the emoji before selecting the respective emoji on the emoji keyboard), which additionally reduces power usage and improves battery life of the electronic device by enabling the user to use the electronic device more quickly and efficiency while reducing errors in the usage of the device.

In some embodiments, the first respective representation reflects the first customizable visual element based on the one or more first selectable options and the second customizable visual element based on the one or more second selectable options (716), such as customized variant 630-2 in FIG. 6P reflecting the selection of variant 626-1 and 628-3 (e.g., if the emoji has been partially or fully customized, then the first respective representation displays the result of the user's customization (e.g., the representation reflects the selected customizations)).

In some embodiments, the first respective representation displays a preview of the user's selections from the first and second sections. For example, if the first emoji is a group emoji (e.g., two-person emoji), then the representation optionally initially displays both people with placeholder appearances (e.g., grey) to indicate that neither person has been customized yet. In such examples, in response to a user selecting an option in the first section, the representation is optionally updated such that the left person is shown with the selected option and the right person is still displayed with the placeholder appearance (e.g., because the user has not selected an option for the right person yet). In some embodiments, in response to the user selecting an option in the second section, the representation is optionally updated such that the right person is shown with the selected option. In some embodiments, selection of another option after completing the customization overrides the previous selection and the representation is updated to reflect the new selection. In some embodiments, if the user has completed customization (e.g., selected an option for each customizable element), then selection of the representation inserts the customized emoji into the text entry field. In some embodiments, if the user has not completed customization (e.g., has not selected options for each required customizable element), then selection of the representation does not cause insertion of the customized emoji into the text entry field.

The above-described manner of displaying a preview of the user's customization selections (e.g., by displaying a representation of the emoji that reflects the visual elements based on the user's selections) provides a quick and efficient manner of displaying the results of the user's customization as the user selects customization options (e.g., by displaying a representation that reflects the user's customizations on the same user interface on which the user performed selections of the customizations), which simplifies the interaction between the user and the electronic device and enhances the operability of the electronic device and makes the user-device interface more efficient (e.g., by allowing the user to see a preview of the custom emoji as the user is customizing the emoji without requiring the user to navigate to a separate user interface to preview the results of the user's customization, which avoids user error in creating the customizes emoji), which additionally reduces power usage and improves battery life of the electronic device by enabling the user to use the electronic device more quickly and efficiency while reducing errors in the usage of the device.

In some embodiments, the first respective representation of the first graphical object includes a representation of the first customizable visual element and a representation of the second customizable visual element (718), such as the left and right people on customized variant 630-2 in FIG. 6H (e.g., the first respective representation is an image of the respective emoji including the customizable visual elements).

In some embodiments, in accordance with a determination that the first customizable visual element and the second customizable visual element have not been customized (e.g., variants for either the left person or the right person of a two-person emoji have not been selected), the representation of the first customizable visual element and the representation of the second customizable visual element are displayed with placeholder elements indicating that the first and second customizable visual elements have not been customized (720), such as the grey outlined characters in customized variant 630-2 in FIG. 6H (e.g., if the visual elements have not yet been customized, the left and right person in the first respective representation are placeholder elements).

In some embodiments, the first respective representation is a full image of a two-person emoji, without cropping to either the left or right person. In some embodiments, the placeholder elements are representations of the customizable element with a visual characteristic different from a valid variant. For example, the left and right people are displayed with placeholder appearances such as grey, shaded, or any other visual characteristic that is different from a valid variant (e.g., the placeholder elements do not reflect a valid skin tone option, and optionally display an outline of each customizable element).

The above-described manner of displaying the preview of the graphical object with placeholder elements in the place of the customizable visual elements provides a quick and efficient manner of indicating to the user that certain customizable visual elements have not yet been customized (e.g., by displaying placeholder elements instead of valid custom variants), which simplifies the interaction between the user and the electronic device and enhances the operability of the electronic device and makes the user-device interface more efficient (e.g., by allowing the user to see that certain customizable visual elements are not yet customized without requiring the user to perform additional inputs or navigate to a separate user interface to determine whether further customization is required before the first respective representation can be inserted into the text entry region), which additionally reduces power usage and improves battery life of the electronic device by enabling the user to use the electronic device more quickly and efficiency while reducing errors in the usage of the device.

In some embodiments, while the first respective representation of the first graphical object is displayed with placeholder elements for the first customizable visual element and the second customizable visual element, receiving, via the one or more input devices, a second user input selecting a respective selectable option in the customization user interface (722), such as user input 603 in FIG. 6J (e.g., while the respective emoji has not had any customizations such that the respective representation is displaying only placeholder elements (e.g., outlines of people), receiving an input on the customization user interface selecting a variant option).

In some embodiments, in response to receiving the second user input selecting the respective selectable option (724), in accordance with a determination that the respective selectable option is a first selectable option of the one or more first selectable options, the electronic device updates (726) the first respective representation of the first graphical object to replace the placeholder element for the first customizable visual element with a first variant of the first customizable visual element corresponding to the first selectable option, such as the left person of customized variant 630-2 updating to show the skin tone option of variant 626-1 in FIG. 6K (e.g., in response to the user selecting a variant for the first customizable visual element (e.g., the left person), updating the first respective representation with the selected variant).

For example, if the user selected a skin tone option for the left person, then the left person in the first respective representation is updated to have the selected skin tone option. Thus, in some embodiments, the first respective representation displays a preview of the user's selections. In some embodiments, the customizable visual element that was not selected continues to be displayed as a placeholder element (e.g., the right person continues to be displayed with a placeholder appearance such as grey). In some embodiments, in response to the user selecting a variant for the first customizable visual element, the selected variant is displayed with an indication that it has been selected. For example, the selected variant is optionally highlighted with a particular color, enlarged, or is displayed with any other suitable visual characteristic.

In some embodiments, in response to receiving the second user input selecting the respective selectable option (724), in accordance with a determination that the respective selectable option is a second selectable option of the one or more second selectable options, the electronic device updates (728) the first respective representation of the first graphical object to replace the placeholder element for the second customizable visual element with a first variant of the second customizable visual element corresponding to the second selectable option, such as the right person of customized variant 630-2 updating to show the skin tone option of variant 628-3 in FIG. 6P (e.g., in response to the user selecting a variant for the second customizable visual element (e.g., the right person), updating the first respective representation with the selected variant).

For example, if the user selected a skin tone option for the right person, then the right person in the first respective representation is updated to have the selected skin tone option. Thus, in some embodiments, the first respective representation displays a preview of the user's selections. In some embodiments, the customizable visual element that was not selected continues to be displayed as a placeholder element (e.g., the left person continues to be displayed with a placeholder appearance such as grey). In some embodiments, in response to the user selecting a variant for the second customizable visual element, the selected variant is displayed with an indication that it has been selected. For example, the selected variant is optionally highlighted with a particular color, enlarged, or have any other suitable visual characteristic. In some embodiments, if both options have now been selected, the first respective representation no longer displays any placeholder elements. In some embodiments, if the user input completes the customization, then an indication is displayed that customization has completed. In some embodiments, the indication is an animation on the first respective representation similar to the animation of the variants described above (e.g., temporarily enlarging the size of the representation).

The above-described manner of replacing the placeholder elements in the preview of the graphical object with the user's selections as the user selects variants for the first and second customizable visual elements provides a quick and efficient manner for the user to preview how the selections look in combination (e.g., by replacing the placeholder elements with the user's selected variants as the user selects them), which simplifies the interaction between the user and the electronic device and enhances the operability of the electronic device and makes the user-device interface more efficient (e.g., by allowing the user to preview the result of the user's customization without requiring the user to insert the emoji, perform additional inputs, or navigate to a separate user interface, which also reduces user error in customizing/inserting the emoji), which additionally reduces power usage and improves battery life of the electronic device by enabling the user to use the electronic device more quickly and efficiency while reducing errors in the usage of the device.

In some embodiments, after updating the first respective representation of the first graphical object with the first variant of the first customizable visual element corresponding to the first selectable option, the electronic device receives (730), via the one or more input devices, a third user input selecting a third selectable option of the one or more first selectable options, such as user input 603 in FIG. 6W (e.g., while the respective representation has a customized skin tone for the left person, receiving an option selecting another skin tone for the left person).

In some embodiments, in response to receiving the third user input, the electronic device updates (732) the first respective representation of the first graphical object to replace the first variant of the first customizable visual element with a second variant, different than the first variant, of the first customizable visual element corresponding to the third selectable option, such as the left person in customized variant 630-2 updating to reflect the skin tone of variant 626-2 in FIG. 6X (e.g., updating the first respective representation with the new skin tone selection).

For example, if the left person in the first respective representation was displaying a first skin tone and the user selects a second skin tone option, the left person in the first respective representation is updated to have the second skin tone. In some embodiments, a user input selecting a new skin tone variant for the right person (e.g., the second customizable element) will similarly cause the first respective representation to update the skin tone of the right person to the newly selected skin tone. Thus, in some embodiments, previously selected variants are overridden or replaced with the selection of another variant. It is understood that changing the customization of a respective emoji optionally does not cause previously inserted instances of the respective emoji to be updated to the new customization (e.g., previous versions of the respective emoji that have been inserted into the text entry regions maintain the variants that applied when they were inserted) and optionally only applies to future insertions of the respective emoji. In some embodiments, after customization has completed, customization of the emoji can be modified or updated with a selection of a different variant. In some embodiments, customization of the emoji can only be modified or replaced but cannot be cleared or reset (e.g., reset to the state in which there is no customization and placeholder elements are shown).

The above-described manner of updating the customization selections (e.g., by receiving a user input selecting a different variant than the variant currently selected and updating the preview to reflect the newly selected variant) provides a quick and efficient manner of sampling different variants and changing the user's selections (e.g., by updating the preview of the variant based on the user's new selections), which simplifies the interaction between the user and the electronic device and enhances the operability of the electronic device and makes the user-device interface more efficient (e.g., by allowing the user to change the user's previous selections and preview the changes without requiring the user to navigate to a separate user interface or perform additional inputs), which additionally reduces power usage and improves battery life of the electronic device by enabling the user to use the electronic device more quickly and efficiency while reducing errors in the usage of the device.

In some embodiments, while the state of customization of the first graphical object is a state of partial customization and the first respective representation of the first graphical object is displayed with a first variant for the first customizable visual element and a placeholder element for the second customizable visual element (e.g., the left person has been customized but the right person has not yet been customized), the electronic device receives (734), via the one or more input devices, a second user input corresponding to a request to dismiss the customization user interface, such as user input 603 in FIG. 6M.

In some embodiments, in response to receiving the second user input, the electronic device ceases display (736) of the customization user interface, such as in FIG. 6N (e.g., dismissing or otherwise ceasing to display the customization user interface and optionally displaying the user interface that was displayed before the customization user interface was displayed). In some embodiments, because the emoji did not complete customization, the respective emoji displayed on the virtual keyboard maintains display of the default variant for both the left and right person (e.g., emoji with a default color such as yellow).

In some embodiments, after ceasing the display of the customization user interface and while the state of customization of the first graphical object is the state of partial customization, the electronic device receives (738), via the one or more input devices, a third user input selecting the first selectable representation of the first graphical object, such as user input 603 in FIG. 6N (e.g., receiving a user input selecting the partially customized emoji on the virtual keyboard).

In some embodiments, in response to receiving the third user input, the electronic device displays (740), via the display device, the customization user interface, wherein the first respective representation of the first graphical object is displayed in the customization user interface with the first variant for the first customizable visual element and the placeholder element for the second customizable visual element, such as in FIG. 6O (e.g., re-displaying the customization user interface). In some embodiments, the customization user interface preserves the state of the customization. For example, because the left person of the respective emoji has previously been customized but the right person of the respective emoji has not been customized, the respective representation displays the customized variant for the left person and the placeholder element for the right person. In some embodiments, the selectable options in the customizable user interface also maintain their selection state. For example, the variant for the left person that was previously selected (e.g., and is being applied to the first respective representation) continues to be displayed with an indication that it has been selected (e.g., highlighted, enlarged, etc.).

The above-described manner of maintaining the user's customization selections (e.g., by saving the user's selections even if the user has only partially customized the graphical object and after dismissal of the customization user interface, displaying the user's previous selections upon a subsequent display of the customization user interface) provides a quick and efficient manner for the user to continue customizing the previously-partially customized graphical object, which simplifies the interaction between the user and the electronic device and enhances the operability of the electronic device and makes the user-device interface more efficient (e.g., by allowing the user to continue the customization process where the user left off without requiring the user to perform additional user inputs to re-select variant(s) that the user has already previously selected), which additionally reduces power usage and improves battery life of the electronic device by enabling the user to use the electronic device more quickly and efficiency while reducing errors in the usage of the device.

In some embodiments, in accordance with a determination the plurality of customizable visual elements includes a third customizable visual element, the customization user interface includes a fourth section including one or more third selectable options for customizing the third customizable visual element (742), such as in FIG. 6QQ (e.g., if the respective emoji has a third customizable visual element, then the customization user interface includes another row of selectable options for customizing the third customizable visual element). Thus, in some embodiments, the customization user interface includes a section of selectable options (e.g., row) for each customizable visual element of the respective emoji. In some embodiments, any number of customizable visual elements are possible (e.g., 2, 3, 4, 5, 10 customizable visual elements, etc.).

The above-described manner of displaying sections of selectable options for each customizable visual element in the graphical object provides a quick and efficient manner of presenting different variants for each customizable visual element (e.g., by displaying more or fewer sections of variant options based on how many customizable visual elements the graphical object has), which simplifies the interaction between the user and the electronic device and enhances the operability of the electronic device and makes the user-device interface more efficient (e.g., by adjusting the number of sections in the customization user interface based on the number of visual elements to customize while maintaining consistency of user interaction with the customization user interface, and without requiring the user to navigate to a separate user interface or perform additional inputs to view and select all the available variants for each customizable visual element), which additionally reduces power usage and improves battery life of the electronic device by enabling the user to use the electronic device more quickly and efficiency while reducing errors in the usage of the device.

In some embodiments, the customization user interface includes a second respective representation of the first graphical object corresponding to predefined variants of the first customizable visual element and the second customizable visual element (744), such as default variant 630-1 in FIG. 6F (e.g., the customization user interface includes a predefined default representation that is selectable to insert the default variant into the text entry region). For example, the predefined default representation is optionally the default color such as yellow for each element in the emoji. In some embodiments, the predefined default representation is not customizable and selection of variants in the customization user interface only customizes the first respective representation and does not customize the second respective representation. In some embodiments, the second respective representation is displayed in the third section of the customization user interface, optionally adjacent to the first respective representation.

The above-described manner of providing a predefined default version of the first graphical object (e.g., by including a representation of the first graphical object with default variants for the customizable visual elements) provides a quick and efficient manner of selecting the default version of the first graphical object without selecting a customization—even after customization is performed—which simplifies the interaction between the user and the electronic device and enhances the operability of the electronic device and makes the user-device interface more efficient (e.g., by allowing the user to easily select the default variants if the user is not interested in customizing the first graphical object without requiring the user to perform additional inputs to construct a default version of the first graphical object), which additionally reduces power usage and improves battery life of the electronic device by enabling the user to use the electronic device more quickly and efficiency while reducing errors in the usage of the device.

In some embodiments, while the state of customization of the first graphical object is not a state of completed customization (e.g., partially customized or no customization), the electronic device receives (746), via the one or more input devices, a second user input selecting the first respective representation of the first graphical object, such as user input 603 in FIG. 6H and FIG. 6K (e.g., a user input selecting the first respective representation while it is displayed with placeholder elements for any or all of the customizable visual elements).

In some embodiments, in response to receiving the second user input (748), in accordance with a determination that the first customizable visual element has not been customized, the electronic device displays (750), via the display device, a visual indication that the first customizable visual element has not been customized, such as indication 632 in FIG. 6I (e.g., display a visual indication on the first selectable options for customizing the first customizable visual element if the first customizable visual element has not been customized). In some embodiments, in response to the second user input, the first respective representation is not inserted into the text entry field.

In some embodiments, in response to receiving the second user input (748), in accordance with a determination that the second customizable visual element has not been customized, the electronic device displays (752), via the display device, a visual indication that the second customizable visual element has not been customized, such as indication 632 in FIG. 6L (e.g., display a visual indication on the second selectable options for customizing the second customizable visual element if the second customizable visual element has not been customized). In some embodiments, in response to the second user input, the respective emoji is not inserted into the text entry region. In some embodiments, the customization user interface continues to be displayed (e.g., is not dismissed).

The above-described manner of indicating that customization has not been completed (e.g., by displaying an indication that a respective customizable visual element has not yet been customized when the user attempts to select and insert the customized version of the graphical object) provides a quick and efficient manner of indicating that customization has not been completed (e.g., by hinting to the user that selections of respective variants are still required before selecting the first respective representation will insert the customized version of the graphical object), which simplifies the interaction between the user and the electronic device and enhances the operability of the electronic device and makes the user-device interface more efficient (e.g., by displaying an indication that customization has not been completed without requiring the user to navigate to a separate user interface or perform additional inputs to determine whether customization has completed and the custom version of the graphical object is available to be inserted), which additionally reduces power usage and improves battery life of the electronic device by enabling the user to use the electronic device more quickly and efficiency while reducing errors in the usage of the device.

In some embodiments, the visual indication that the first customizable visual element has not been customized includes animating a change in a visual characteristic of the one or more first selectable options for customizing the first customizable visual element (754), such as in FIG. 6I (e.g., animating the first selectable options). In some embodiments, the animation includes temporarily increasing and decreasing the size of the first selectable options. In some embodiments, the animation travels from one end of the first selectable options to another end, in a wave-like movement. For example, a first of the first selectable options increases in size while the others of the first selectable options maintain their original size, then as the first of the first selectable options decreases in size, the second of the first selectable options increases in size, and so on and so forth until the animation reaches the last of the first selectable options.

In some embodiments, the visual indication that the second customizable visual element has not been customized includes animating a change in a visual characteristic of the one or more second selectable options for customizing the second customizable visual element (756), such as in FIG. 6L (e.g., animating the second selectable options). In some embodiments, the animation includes temporarily increasing and decreasing the size of the second selectable options. In some embodiments, the animation travels from one end of the second selectable options to another end, in a wave-like movement. For example, a first of the second selectable options increases in size while the others of the second selectable options maintain their original size, then as the first of the second selectable options decreases in size, the second of the second selectable options increases in size, and so on and so forth until the animation reaches the last of the second selectable options.

The above-described manner of indicating that customization has not been completed and that selection of certain selectable options is required to complete customization (e.g., by animating the selectable options for the respective customizable visual element that require selection to complete customization) provides a quick and efficient manner of indicating which options to select to complete customization (e.g., by displaying an animation on the selectable options for the respective customizable visual element that have not yet been customized), which simplifies the interaction between the user and the electronic device and enhances the operability of the electronic device and makes the user-device interface more efficient (e.g., by displaying the indication on the respective selectable options themselves without requiring the user to determine which of the customizable elements have not been customized and which selectable options are for customizing the not-yet-customized customizable element), which additionally reduces power usage and improves battery life of the electronic device by enabling the user to use the electronic device more quickly and efficiency while reducing errors in the usage of the device.

In some embodiments, while the state of customization of the first graphical object is a state of completed customization in which a respective variant of the first customizable visual element and a respective variant of the second customizable visual element have been selected (e.g., customization of the emoji has been completed and the first respective representation is displayed with valid variants for the first and second customizable visual elements, without any placeholder elements), the electronic device receives (758), via the one or more input devices, a second user input selecting the first respective representation of the first graphical object, such as user input 603 in FIG. 6Q (e.g., a user input selecting the completed first respective representation).

In some embodiments, in response to receiving the second user input, the electronic device inserts (760) the first graphical object having the respective variant of the first customizable visual element and the respective variant of the second customizable visual element into the text entry region, such as inserting customized variant 630-2 into text entry region 604 as character 614-4 in FIG. 6R (e.g., inserting the respective emoji with the respective variants for the first and second customizable visual elements into the text entry region). In some embodiments, the version of the emoji that is inserted is the same as the preview provided by the first respective representation. In some embodiments, in response to the second user input, the customization user interface is dismissed (e.g., ceased to be displayed).

The above-described manner of inserting a customized graphical object (e.g., inserting the first graphical object with the user's customizations in response to the user selecting the representation of the first graphical object and after the user has completed customization of the first graphical object) provides a quick and efficient manner of inserting custom graphical objects (e.g., by displaying a preview of the customizations applied to the first graphical object on the same user interface that is used to select the customizations and inserting the customized first graphical object in response to the user selecting the preview), which simplifies the interaction between the user and the electronic device and enhances the operability of the electronic device and makes the user-device interface more efficient (e.g., by enabling the user to preview and insert the customized first graphical object without requiring the user to navigate to a separate user interface or perform additional inputs to customize and insert a customized graphical element), which additionally reduces power usage and improves battery life of the electronic device by enabling the user to use the electronic device more quickly and efficiency while reducing errors in the usage of the device.

In some embodiments, after receiving the second user input selecting the first respective representation of the first graphical object, the electronic device updates (762) the first selectable representation of the first graphical object in the virtual keyboard to display a representation of the first graphical object having the respective variant of the first customizable visual element and the respective variant of the second customizable visual element, such as emoji 608-6 updating to display customized variant 630-2 in FIG. 6R (e.g., after the user selects and inserts the customized version of the emoji into the text entry region, the respective emoji on the virtual keyboard is updated to reflect the customized version of the emoji).

For example, the respective emoji on the virtual keyboard includes the respective variants for the first and second customizable visual elements (e.g., left and right people have the skin tones selected on the customization user interface). In some embodiments, if the respective emoji is displaying the customized version of the emoji, then if the user updates or modifies the customization (e.g., by selecting different variants in the customization user interface), but does not insert the customized version of the emoji into a text entry region, then the virtual keyboard will update to display the customized version. Thus, in some embodiments, the respective emoji on the virtual keyboard is set to a "customized" mode that will always display the latest customized state of the respective emoji (e.g., regardless of whether the user has inserted the custom emoji after updating the customization) until the user changes the respective emoji into a "default" mode that displays the default variants of the emoji in the virtual keyboard (e.g., by selecting the default version of the respective emoji on the customization user interface, which causes the default emoji to be inserted into the text entry region).

The above-described manner of displaying a graphical object on the virtual keyboard (e.g., displaying the graphical object in the virtual keyboard with the variants of the customizable visual elements that was most recently selected and inserted) provides a quick and efficient manner of previewing the version of the graphical object that will be inserted upon selection of the representation of the graphical object (e.g., by displaying a preview of the customizations applied to the graphical object on the virtual keyboard itself that is selectable to insert the customized version of the graphical object), which simplifies the interaction between the user and the electronic device and enhances the operability of the electronic device and makes the user-device interface more efficient (e.g., by enabling the user to preview and insert the customized first graphical object without requiring the user to navigate to a separate user interface or perform additional inputs to determine what version of the graphical element will be inserted upon selection of the representation), which additionally reduces power usage and improves battery life of the electronic device by enabling the user to use the electronic device more quickly and efficiency while reducing errors in the usage of the device.

In some embodiments, while the state of customization of the first graphical object is a state of completed customization, the electronic device receives (764), via the one or more input devices, a second user input selecting the first selectable representation of the first graphical object, such as user input 603 in FIG. 6R (e.g., receiving a user input selecting the respective emoji on the virtual keyboard after the respective emoji has been fully customized).

In some embodiments, in response to receiving the second user input (766), in accordance with a determination that the second user input includes selection of the first selectable representation of the first graphical object for shorter than a predetermined duration threshold (e.g., 0.1 seconds, 0.25 seconds, 0.5 seconds, 1 second, 3 seconds, 5 seconds, etc.), the electronic device inserts (768) the first graphical object into the text entry region without displaying the customization user interface, such as inserting customized variant 630-2 into text entry region 604 as character 614-5 in FIG. 6S (e.g., if the user input is a tap input, then insert the respective emoji into the text entry region and do not display the customization user interface).

In some embodiments, the version of the emoji that is inserted is the same version that is displayed on the virtual keyboard. For example, if the respective emoji on the virtual keyboard includes the respective variants for the first and second customizable visual elements, then the inserted emoji has the respective variants for the first and second customizable visual elements. In some embodiments, if the respective emoji on the virtual keyboard includes the default variants for the first and second customizable visual elements (e.g., emoji with a default color such as yellow), then the inserted emoji has the default variants for the first and second customizable visual elements.

In some embodiments, in response to receiving the second user input (766), in accordance with a determination that the second user input includes selection of the first selectable representation of the first graphical object for longer than the predetermined duration threshold, the electronic device displays (770), via the display device, the customization user interface without inserting the first graphical object into the text entry region, such as in FIG. 6U (e.g., if the user input is a press-and-hold input, then display the customization user interface and do not insert the respective emoji into the text entry region). In some embodiments, after customization of the respective emoji has been completed, a press-and-hold user input is the only method of causing display of the customization user interface (e.g., to allow the user to update the customization). In some embodiments, the customization user interface displays the state of customization for the first graphical object. For example, the respective variants for the first and second customizable elements are highlighted and the first respective representation (e.g., the preview) displays the user's customizations.

The above-described manner of inserting and customizing a graphical object (e.g., inserting the graphical object if the user input is a short tap or displaying the customization user interface if the user input is a long press) provides a quick and efficient manner of either inserting the graphical object or providing a user interface to view or update the customization of the graphical object (e.g., by providing the user with the option to either insert the graphical object or customize the graphical object using the same representation based on the duration of the user input), which simplifies the interaction between the user and the electronic device and enhances the operability of the electronic device and makes the user-device interface more efficient (e.g., by enabling the user to perform either the function of inserting the graphical object or further customizing the graphical object without requiring the user to perform additional inputs or navigate to a separate user interface to perform customization), which additionally reduces power usage and improves battery life of the electronic device by enabling the user to use the electronic device more quickly and efficiency while reducing errors in the usage of the device.

In some embodiments, inserting the first graphical object into the text entry region includes (772), in accordance with a determination that the first selectable representation of the first graphical object is displayed with default variants for the first and second customizable visual elements, inserting (774) the first graphical object with the default variants into the first text entry region, such as inserting default variant 630-1 into text entry region 604 as character 614-8 in FIG. 6EE (e.g., the inserted emoji is the same version that is displayed on the virtual keyboard). In some embodiments, if the respective emoji on the virtual keyboard includes the default variants for the first and second customizable visual elements (e.g., emoji with a default color such as yellow), then the inserted emoji has the default variants for the first and second customizable visual elements.

In some embodiments, inserting the first graphical object into the text entry region includes (772), in accordance with a determination that the first selectable representation of the first graphical object is displayed with customized variants for the first and second customizable visual elements, inserting (776) the first graphical object with the customized variants into the first text entry region, such as inserting customized variant 630-2 into text entry region 604 as character 614-5 in FIG. 6S (e.g., if the respective emoji on the virtual keyboard includes the respective variants for the first and second customizable visual elements, then the inserted emoji has the respective variants for the first and second customizable visual elements). Thus, in some embodiments, selecting the respective emoji on the virtual keyboard will automatically insert the previously selected version of the respective emoji.

The above-described manner of inserting a graphical object (e.g., inserting the version of the graphical object as it is displayed on the virtual keyboard) provides a quick and efficient manner of verifying that the graphical object to be inserted is the graphical object that is displayed to the user (e.g., by inserting the graphical object with either the customized variants if customized variants are displayed on the virtual keyboard or with the default variants if the default variants are displayed on the virtual keyboard), which simplifies the interaction between the user and the electronic device and enhances the operability of the electronic device and makes the user-device interface more efficient (e.g., by enabling the user to preview and verify the version of the graphical object that will be inserted without requiring the user to perform additional inputs or navigate to a separate user interface to determine which version would be inserted upon selection of the first selectable representation), which additionally reduces power usage and improves battery life of the electronic device by enabling the user to use the electronic device more quickly and efficiency while reducing errors in the usage of the device.

In some embodiments, the first user input includes touchdown and liftoff of a contact from a touch-sensitive surface of the one or more input devices, and the customization user interface is displayed after the touchdown of the contact on the touch-sensitive surface and before the liftoff of the contact from the touch-sensitive surface (778), such as the display of multi-element customization user interface 624 in response to contact 603 being held for longer than the predetermined duration threshold in FIG. 6U (e.g., the customization user interface is displayed in response to detecting a touchdown of a contact on an emoji in the virtual keyboard that is associated with a plurality of customizable elements). In some embodiments, if customization has not been completed, then the customization user interface is displayed in response to any touchdown of the contact. In some embodiments, if customization has been completed, then the customization user interface is displayed in response to the touchdown being held in contact with the touch screen for a threshold duration of time (e.g., 0.1 seconds, 0.25 seconds, 0.5 seconds, 1 second, 3 seconds, 5 seconds, etc.).

In some embodiments, while displaying the customization user interface (e.g., which is displayed either in response to a short contact if customization has not been completed or a long contact if customization has been completed), the electronic device detects (780) the liftoff of the contact from the touch-sensitive surface, such as in FIG. 6V.

In some embodiments, in response to detecting the liftoff of the contact from the touch-sensitive surface, the electronic device maintains (782) display, via the display device, of the customization user interface, such as in FIG. 6V (e.g., the customization user interface is not dismissed when the user releases contact with the touch screen). In some embodiments, the customization user interface is displayed until the user selects an emoji to insert into the text entry region or selects a location outside of the customization user interface. In some embodiments, if the user input includes a swipe (e.g., while maintaining contact) from the original touchdown to the location of either the default version of the emoji or the customized version of the emoji (e.g., on the customization user interface), then upon liftoff of the user input, the respective version of the emoji (e.g., default or customized) is selected and inserted into the text entry region and the customization user interface is dismissed. In some embodiments, for a single-element customization user interface (e.g., emojis that have only one customizable element), detecting liftoff of the contact always causes the customization user interface to be dismissed and a version of the emoji to be inserted into the text entry region (e.g., either the user's previous selection or the user's new selection if the user input includes a swipe to a new variant before liftoff).

The above-described manner of displaying the customization user interface (e.g., displaying the customization user interface in response to detecting a touch-down of a contact and maintaining display of the customization user interface even after detecting lift-off of the contact) provides a quick and efficient manner of customizing the graphical object (e.g., by maintaining display of the customization user interface so the user can perform additional inputs to select desired variants on the customization user interface), which simplifies the interaction between the user and the electronic device and enhances the operability of the electronic device and makes the user-device interface more efficient (e.g., by enabling the user to customize the multiple elements of the graphical object after displaying the customization user interface without requiring the user to redisplay the customization user interface for each element to be customized), which additionally reduces power usage and improves battery life of the electronic device by enabling the user to use the electronic device more quickly and efficiency while reducing errors in the usage of the device.

In some embodiments, the customization user interface is overlaid over the user interface including the text entry region and the virtual keyboard (786), such as the multi-element customization user interface 624 in FIG. 6F (e.g., the customization user interface is a pop-up user interface element that is displayed overlaid on top of whatever was displayed when the user input for displaying the customization user interface was received).

The above-described manner of displaying the customization user interface (e.g., displaying the customization user interface as an overlay over the user interface that was displayed when the customization user interface was displayed) provides contextual continuity of the user interface, which simplifies the interaction between the user and the electronic device and enhances the operability of the electronic device and makes the user-device interface more efficient (e.g., by visually indicating to the user that customization and insertion of the graphical object is associated with the previously displayed interface and providing the user with a customization user interface with a minimally intrusive user interface element), which additionally reduces power usage and improves battery life of the electronic device by enabling the user to use the electronic device more quickly and efficiency while reducing errors in the usage of the device.

In some embodiments, in accordance with a determination that the customization user interface encompasses less than a predetermined amount of a display area of the display device (788) (e.g., the customization user interface takes up less than 25%, 50%, 66%, 75% of the total display area of the display device), the customization user interface is overlaid over the user interface including the text entry region and the virtual keyboard, such as the multi-element customization user interface 624 in FIG. 6F (e.g., the customization user interface is displayed as a pop-up user interface element that is overlaid on top of whatever was displayed when the user input for displaying the customization user interface was received).

In some embodiments, in accordance with a determination that the customization user interface encompasses greater than the predetermined amount of the display area of the display device (e.g., the customization user interface takes up more than 25%, 50%, 66%, 75% of the total display area of the display device), the customization user interface replaces the display of the user interface (790), such as multi-element customization user interface 642 in FIG. 6WW (e.g., the customization user interface is displayed as a full-screen user interface). In some embodiments, the customization user interface includes a selectable option to dismiss the customization user interface. In some embodiments, in response to a user input dismissing the customization user interface, the device displays (e.g., resumes display of) the user interface that was displayed when the user input for displaying the customization user interface was received.

The above-described manner of displaying a customization user interface (e.g., displaying the customization user interface as an overlay if the customization user interface takes up less than a certain amount of screen area or as a full screen user interface if the customization user interface takes up more than a certain amount of screen area) provides contextual continuity of the user interface if appropriate, which simplifies the interaction between the user and the electronic device and enhances the operability of the electronic device and makes the user-device interface more efficient (e.g., by automatically adjusting the style of the customization user interface to enable the user to view and perform customizations regardless of the size of the display device), which additionally reduces power usage and improves battery life of the electronic device by enabling the user to use the electronic device more quickly and efficiency while reducing errors in the usage of the device.

In some embodiments, while displaying the customization user interface, the electronic device receives (792), via the one or more input devices, a second user input corresponding to a location outside of the customization user interface, such as user input 603 in FIG. 6M (e.g., receiving a user input on a location on the touch screen outside of the customization user interface).

In some embodiments, in response to receiving the second user input, the electronic device ceases (794) display of the customization user interface, such as in FIG. 6N (e.g., dismissing the customization user interface and redisplaying the full user interface including the virtual keyboard and the text entry region (e.g., unobstructed by the customization user interface)). In some embodiments, a user input selecting the "paddle" portion of the customization user interface also causes the customization user interface to be dismissed. In some embodiments, the "paddle" portion of the customization user interface is the portion that is overlaid over the corresponding emoji on the virtual keyboard. Thus, in some embodiments, selecting the same location that caused display of the customization user interface causes the customization user interface to be dismissed. In some embodiments, after ceasing to display the customization user interface, a further input selecting the respective emoji in the virtual keyboard will cause re-display of the customization user interface if customization has not yet completed.

The above-described manner of dismissing the customization user interface (e.g., dismissing the customization user interface in response to a user input on the touch screen outside of the customization user interfaces) provides an intuitive and efficient manner of dismissing the customization user interface (e.g., by quickly dismissing the customization user interface if the user taps outside of the customization user interface indicating that the user is not interested in performing customizations or seeing the customization user interface), which simplifies the interaction between the user and the electronic device and enhances the operability of the electronic device and makes the user-device interface more efficient (e.g., by dismissing the customization user interface in response to any input that is outside of the area of the customization user interface without requiring the user to select a "close" or "x" option or perform additional inputs), which additionally reduces power usage and improves battery life of the electronic device by enabling the user to use the electronic device more quickly and efficiency while reducing errors in the usage of the device.

In some embodiments, the plurality of selectable representations of the plurality of graphical objects included in the virtual keyboard further includes a second selectable representation of a second graphical object, wherein the second graphical object is not associated with a plurality of customizable visual elements, such as emoji 608-1 in FIG. 6A (796) (e.g., the virtual keyboard displays a plurality of different emojis that are selectable to customize or insert the respective emoji). In some embodiments, the plurality of different emojis include emojis with no customizable visual elements, emojis with one customizable visual element, and emojis with multiple customizable visual elements.

The above-described manner of presenting graphical objects on a virtual keyboard (e.g., displaying, on the virtual keyboard, graphical objects that are associated with a plurality of customizable visual elements alongside graphical objects that are not associated with a plurality of graphical objects) provides a quick and efficient manner of selecting different graphical objects (e.g., by providing the user with the option to select from a plurality of graphical objects regardless of whether they're associated with a plurality of customizable objects), which simplifies the interaction between the user and the electronic device and enhances the operability of the electronic device and makes the user-device interface more efficient (e.g., by enabling the user to select from a plurality of graphical objects from the same user interface without requiring the user to navigate to a user interface to access graphical objects that are not associated with a plurality of graphical objects and another user interface to access graphical objects that are associated with a plurality of graphical objects), which additionally reduces power usage and improves battery life of the electronic device by enabling the user to use the electronic device more quickly and efficiency.

In some embodiments, the electronic device receives (798), via the one or more input devices, a second user input selecting a respective selectable representation of the plurality of selectable representations in the virtual keyboard, wherein the respective selectable representation is associated with a respective graphical object, such as user input 603 in FIG. 6B (e.g., receiving a user input selecting an emoji on the virtual keyboard).

In some embodiments, in response to receiving the second user input (799), in accordance with a determination that the respective graphical object is associated with a plurality of customizable visual elements and the one or more first criteria are satisfied (e.g., if the selected emoji has multiple customizable visual elements and either customization has not been completed or the user input is a contact for longer than a predetermined duration threshold), the electronic device displays (797), via the display device, a first customization user interface including selectable options for customizing the plurality of customizable visual elements of the respective graphical object and a respective representation of the respective graphical object that reflects the plurality of customizable visual elements based on the selectable options, wherein the respective representation of the respective graphical object is selectable to insert the respective representation into the text entry region, such as multi-element customization user interface 624 in FIG. 6F (e.g., display a customization user interface similar to the multi-element customization user interface described above including the plurality of sections for customizing the plurality of customizable visual elements and the respective representation that previews the user's customizations and is selectable to insert the customized emoji into the text entry region). In some embodiments, the selectable options for customizing the plurality of customizable visual elements of the respective graphical object are selectable to customize the respective graphical object, without inserting the respective graphical object into the text entry region.

In some embodiments, in response to receiving the second user input (799), in accordance with a determination that the respective graphical object is associated with only one customizable visual element and one or more second criteria are satisfied (e.g., if the selected emoji has only one customizable visual element and either customization has not been completed or the user input is a contact for longer than a predetermined duration threshold), the electronic device displays (795), via the display device, a second customization user interface including respective representations corresponding to respective variants of the one customizable visual element, wherein the respective representations corresponding to the respective variants are selectable to customize the one customizable visual element of the respective graphical object and insert the respective graphical object into the text entry region, such as single-element customization user interface 618 in FIG. 6D (e.g., display a single-element customization user interface without the plurality of sections for customizing the plurality of customizable visual elements).

In some embodiments, the single-element customization user interface displays a plurality of variants of the one customizable visual element in a single row. In some embodiments, the single-element customization user interface does not include a respective representation that previews the user's customization. In some embodiments, if the selected emoji has not been customized (e.g., no variant has been selected), then upon detecting lift-off of the contact, display of the single-element customization user interface is maintained. In some embodiments, selection of a respective variant of the plurality of variants causes insertion of the respective variant into the text entry region (e.g., as opposed to updating a preview, the preview being selectable to cause insertion as in the case of the graphical object with multiple customizable elements). In some embodiments, if the selected emoji has already been customized (e.g., the user has previously selected one of the variants for the one customizable visual element), then upon detecting a lift-off of the contact, the emoji is inserted in the text entry region and the single-element customization user interface is dismissed (e.g., the single-element customization user interface is displayed only for as long as the user input is contacting the touch screen). In some embodiments, the inserted emoji is the previously selected variant of the emoji. In some embodiments, if the contact moved to a respective variant of the plurality of variants, then upon lift-off, the inserted emoji is the respective variant.

In some embodiments, in response to receiving the second user input (799), in accordance with a determination that the respective graphical object is not associated with any customizable visual elements (e.g., if the selected emoji does not have any customizable visual elements), the electronic device inserts (793) the respective graphical object into the first text entry region without displaying a customization user interface via the display device, such as inserting emoji 608-1 into text entry region 604 as character 614-1 in FIG. 6C (e.g., inserting the selected emoji into the text entry region without displaying a customization user interface). In some embodiments, if the user input is a contact for longer than a predetermined duration threshold, then a popup is displayed. In some embodiments, the popup includes a representation of the selected emoji. In some embodiments, upon detecting a lift-off of the contact, the emoji is inserted into the text entry region. In some embodiments, the popup does not include any selectable options for customizing the emoji. In some embodiments, the popup merely provides the user with a larger preview (e.g., larger than the display of the emoji in the virtual keyboard) of the emoji that will be inserted.

The above-described manner of customizing and inserting graphical objects (e.g., by receiving a user input on a graphical object on a virtual keyboard and displaying a multi-element customization user interface if the graphical object is associated with a plurality of customizable elements, a single-element customization user interface if the graphical object is associated with only one customizable element, or simply inserting the graphical object if the graphical object is not associated with any customizable elements) provides a quick and efficient manner of inserting graphical objects and only presenting customization options if necessary (e.g., by determining whether the selected graphical object can be customized and how much customization is available and automatically displaying the appropriate customization user interface (or not)), which simplifies the interaction between the user and the electronic device and enhances the operability of the electronic device and makes the user-device interface more efficient (e.g., by automatically presenting the appropriate customization user interface if customizations are available or inserting the graphical object if customizations are not available without requiring the user to separately determine whether a certain graphical object supports customizations and performing additional inputs to navigate to a separate user interface to customize and/or insert graphical objects that support customizations), which additionally reduces power usage and improves battery life of the electronic device by enabling the user to use the electronic device more quickly and efficiency while reducing errors in the usage of the device.

It should be understood that the particular order in which the operations in FIGS. 7A-7M have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 7A-7M are, optionally, implemented by components depicted in FIGS. 1A-1B. For example, displaying operations 702, 708, 740, 750, 752, 770, 797, and 795, and receiving operations 704, 730, 734, 738, 746, 758, 764, 792, and 798, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology potentially involves the gathering and use of data available from specific and legitimate sources to facilitate the customization of graphical objects. The present disclosure contemplates that in some instances, this gathered data may include personal information data that uniquely identifies or can be used to identify a specific person. Such personal information data can include demographic data, location-based data, online identifiers, usage history, skin tone (or other visual appearance information), skin tone (or other visual appearance) preferences, customization preferences, or any other personal information, etc.

The present disclosure recognizes that the use of such personal information data, in the present technology, can be used to the benefit of users. For example, the personal information data can be used to automatically perform operations with respect to interacting with the electronic device using a virtual keyboard (e.g., customization and/or insertion of graphical objects using the virtual keyboard). Accordingly, use of such personal information data enables users to enter fewer inputs to perform an action with respect to a graphical object. Further, other uses for personal information data that benefit the user are also contemplated by the present disclosure. For instance, a user's customization selections may be used to generate suggested customizations for the user.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows the particular electronic device from accessing the user's customization selections (e.g., and not to share the customization selections to another electronic device and/or not to transmit the selections to a server). In another example, users can manage the privacy of their customization selections.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a user is able to interact with graphical objects and insert the graphical objects into text entry regions without the need to provide any customization selections.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising, at an electronic device in communication with a display device and one or more input devices:

displaying, in a user interface via the display device, a text entry region and a virtual keyboard, wherein the virtual keyboard includes a plurality of selectable representations of a plurality of graphical objects;

receiving, via the one or more input devices, a first user input selecting a first selectable representation of a first graphical object of the plurality of selectable representations of graphical objects, wherein the first graphical object comprises a plurality of customizable visual elements corresponding to a plurality of different portions of the first graphical object, including a first customizable visual element corresponding to a first portion of the first graphical object and a second customizable visual element corresponding to a second portion, different from the first portion, of the first graphical object; and in response to receiving the first user input:

in accordance with a determination that one or more first criteria are satisfied, displaying, via the display device, a customization user interface, wherein the customization user interface includes:

a first section including one or more first selectable options for customizing the first portion of the first graphical object corresponding to the first customizable visual element;

a second section including one or more second selectable options for customizing the second portion of the first graphical object corresponding to the second customizable visual element; and a third section for displaying a first respective representation of the first graphical object that indicates a current state of customization of the first graphical object, wherein:

the first respective representation of the first graphical object includes a representation of the first customizable visual element and a representation of the second customizable visual element, and in accordance with a determination that the first customizable visual element and the second customizable visual element have not been customized, the representation of the first customizable visual element and the representation of the second customizable visual element are displayed with placeholder elements indicating that the first and second customizable visual elements have not been customized.

2. The method of claim 1, wherein the first respective representation reflects the first customizable visual element based on the one or more first selectable options and the second customizable visual element based on the one or more second selectable options.

3. The method of claim 1, further comprising:

while the first respective representation of the first graphical object is displayed with placeholder elements for the first customizable visual element and the second customizable visual element, receiving, via the one or more input devices, a second user input selecting a respective selectable option in the customization user interface; and in response to receiving the second user input selecting the respective selectable option:

in accordance with a determination that the respective selectable option is a first selectable option of the one or more first selectable options, updating the first respective representation of the first graphical object to replace the placeholder element for the first customizable visual element with a first variant of the first customizable visual element corresponding to the first selectable option; and in accordance with a determination that the respective selectable option is a second selectable option of the one or more second selectable options, updating the first respective representation of the first graphical object to replace the placeholder element for the second customizable visual element with a first variant of the second customizable visual element corresponding to the second selectable option.

4. The method of claim 3, further comprising:
after updating the first respective representation of the first graphical object with the first variant of the first customizable visual element corresponding to the first selectable option, receiving, via the one or more input devices, a third user input selecting a third selectable option of the one or more first selectable options; and
in response to receiving the third user input, updating the first respective representation of the first graphical object to replace the first variant of the first customizable visual element with a second variant, different than the first variant, of the first customizable visual element corresponding to the third selectable option.

5. The method of claim 1, further comprising:
while the state of customization of the first graphical object is a state of partial customization and the first respective representation of the first graphical object is displayed with a first variant for the first customizable visual element and a placeholder element for the second customizable visual element, receiving, via the one or more input devices, a second user input corresponding to a request to dismiss the customization user interface;
in response to receiving the second user input, ceasing display of the customization user interface;
after ceasing the display of the customization user interface and while the state of customization of the first graphical object is the state of partial customization, receiving, via the one or more input devices, a third user input selecting the first selectable representation of the first graphical object; and
in response to receiving the third user input, displaying, via the display device, the customization user interface, wherein the first respective representation of the first graphical object is displayed in the customization user interface with the first variant for the first customizable visual element and the placeholder element for the second customizable visual element.

6. The method of claim 1, wherein:
in accordance with a determination the plurality of customizable visual elements includes a third customizable visual element, the customization user interface includes a fourth section including one or more third selectable options for customizing the third customizable visual element.

7. The method of claim 1, wherein the customization user interface includes a second respective representation of the first graphical object corresponding to predefined variants of the first customizable visual element and the second customizable visual element.

8. The method of claim 1, further comprising:
while the state of customization of the first graphical object is not a state of completed customization, receiving, via the one or more input devices, a second user input selecting the first respective representation of the first graphical object; and
in response to receiving the second user input:
in accordance with a determination that the first customizable visual element has not been customized, displaying, via the display device, a visual indication that the first customizable visual element has not been customized; and
in accordance with a determination that the second customizable visual element has not been customized, displaying, via the display device, a visual indication that the second customizable visual element has not been customized.

9. The method of claim 8, wherein:
the visual indication that the first customizable visual element has not been customized includes animating a change in a visual characteristic of the one or more first selectable options for customizing the first customizable visual element, and
the visual indication that the second customizable visual element has not been customized includes animating a change in a visual characteristic of the one or more second selectable options for customizing the second customizable visual element.

10. The method of claim 1, further comprising:
while the state of customization of the first graphical object is a state of completed customization in which a respective variant of the first customizable visual element and a respective variant of the second customizable visual element have been selected, receiving, via the one or more input devices, a second user input selecting the first respective representation of the first graphical object; and
in response to receiving the second user input, inserting the first graphical object having the respective variant of the first customizable visual element and the respective variant of the second customizable visual element into the text entry region.

11. The method of claim 10, further comprising:
after receiving the second user input selecting the first respective representation of the first graphical object, updating the first selectable representation of the first graphical object in the virtual keyboard to display a representation of the first graphical object having the respective variant of the first customizable visual element and the respective variant of the second customizable visual element.

12. The method of claim 1, further comprising:
while the state of customization of the first graphical object is a state of completed customization, receiving, via the one or more input devices, a second user input selecting the first selectable representation of the first graphical object; and
in response to receiving the second user input:
in accordance with a determination that the second user input includes selection of the first selectable representation of the first graphical object for shorter than a predetermined duration threshold, inserting the first graphical object into the text entry region without displaying the customization user interface; and
in accordance with a determination that the second user input includes selection of the first selectable representation of the first graphical object for longer than the predetermined duration threshold, displaying, via the display device, the customization user interface without inserting the first graphical object into the text entry region.

13. The method of claim 12, wherein inserting the first graphical object into the text entry region includes:
in accordance with a determination that the first selectable representation of the first graphical object is displayed with default variants for the first and second customizable visual elements, inserting the first graphical object with the default variants into the text entry region; and
in accordance with a determination that the first selectable representation of the first graphical object is displayed with customized variants for the first and second customizable visual elements, inserting the first graphical object with the customized variants into the text entry region.

14. The method of claim 1, wherein the first user input includes touchdown and liftoff of a contact from a touch-sensitive surface of the one or more input devices, and the customization user interface is displayed after the touchdown of the contact on the touch-sensitive surface and before the liftoff of the contact from the touch-sensitive surface, the method further comprising:
while displaying the customization user interface, detecting the liftoff of the contact from the touch-sensitive surface; and
in response to detecting the liftoff of the contact from the touch-sensitive surface, maintaining display, via the display device, of the customization user interface.

15. The method of claim 1, wherein the customization user interface is overlaid over the user interface including the text entry region and the virtual keyboard.

16. The method of claim 1, wherein:
in accordance with a determination that the customization user interface encompasses less than a predetermined amount of a display area of the display device, the customization user interface is overlaid over the user interface including the text entry region and the virtual keyboard; and
in accordance with a determination that the customization user interface encompasses greater than the predetermined amount of the display area of the display device, the customization user interface replaces the display of the user interface.

17. The method of claim 1, further comprising:
while displaying the customization user interface, receiving, via the one or more input devices, a second user input corresponding to a location outside of the customization user interface; and
in response to receiving the second user input, ceasing display of the customization user interface.

18. The method of claim 1, wherein the plurality of selectable representations of the plurality of graphical objects included in the virtual keyboard further includes a second selectable representation of a second graphical object, wherein the second graphical object is not associated with a plurality of customizable visual elements.

19. The method of claim 18, further comprising:
receiving, via the one or more input devices, a second user input selecting a respective selectable representation of the plurality of selectable representations in the virtual keyboard, wherein the respective selectable representation is associated with a respective graphical object; and
in response to receiving the second user input:
in accordance with a determination that the respective graphical object is associated with a plurality of customizable visual elements and the one or more first criteria are satisfied, displaying, via the display device, a first customization user interface including selectable options for customizing the plurality of customizable visual elements of the respective graphical object and a respective representation of the respective graphical object that reflects the plurality of customizable visual elements based on the selectable options, wherein the respective representation of the respective graphical object is selectable to insert the respective representation into the text entry region;
in accordance with a determination that the respective graphical object is associated with only one customizable visual element and one or more second criteria are satisfied, displaying, via the display device, a second customization user interface including respective representations corresponding to respective variants of the one customizable visual element, wherein the respective representations corresponding to the respective variants are selectable to customize the one customizable visual element of the respective graphical object and insert the respective graphical object into the text entry region; and
in accordance with a determination that the respective graphical object is not associated with any customizable visual elements, inserting the respective graphical object into the text entry region without displaying a customization user interface via the display device.

20. The method of claim 1, wherein a respective selectable option of the one or more first selectable options includes a representation corresponding to the first portion of the first graphical object, and a respective selectable option of the one or more second selectable options includes a representation corresponding to the second portion of the first graphical object.

21. An electronic device, comprising:
one or more processors;
memory; and
one or more programs, wherein the one or more programs are stored in the memory and configured to be executed by the one or more processors, the one or more programs including instructions for:
displaying, in a user interface via a display device, a text entry region and a virtual keyboard, wherein the virtual keyboard includes a plurality of selectable representations of a plurality of graphical objects;
receiving, via one or more input devices, a first user input selecting a first selectable representation of a first graphical object of the plurality of selectable representations of graphical objects, wherein the first graphical object comprises a plurality of customizable visual elements corresponding to a plurality of different portions of the first graphical object, including a first customizable visual element corresponding to a first portion of the first graphical object and a second customizable visual element corresponding to a second portion, different from the first portion, of the first graphical object; and
in response to receiving the first user input:
in accordance with a determination that one or more first criteria are satisfied, displaying, via the display device, a customization user interface, wherein the customization user interface includes:
a first section including one or more first selectable options for customizing the first portion of the first graphical object corresponding to the first customizable visual element;
a second section including one or more second selectable options for customizing the second portion of the first graphical object corresponding to the second customizable visual element; and
a third section for displaying a first respective representation of the first graphical object that indicates a current state of customization of the first graphical object, wherein:
the first respective representation of the first graphical object includes a representation of the first customizable visual element and a representation of the second customizable visual element, and in accordance with a determination that the first customizable visual element and the second customizable visual element have not been customized, the representation of the first customizable visual element and the representation of the second customizable visual element are displayed with placeholder elements indicating that the first and second customizable visual elements have not been customized.

22. The electronic device of claim 21, wherein the first respective representation reflects the first customizable visual element based on the one or more first selectable options and the second customizable visual element based on the one or more second selectable options.

23. The electronic device of claim 21, the one or more programs further including instructions for:
while the first respective representation of the first graphical object is displayed with placeholder elements for the first customizable visual element and the second customizable visual element, receiving, via the one or more input devices, a second user input selecting a respective selectable option in the customization user interface; and
in response to receiving the second user input selecting the respective selectable option:
in accordance with a determination that the respective selectable option is a first selectable option of the one or more first selectable options, updating the first respective representation of the first graphical object to replace the placeholder element for the first customizable visual element with a first variant of the first customizable visual element corresponding to the first selectable option; and
in accordance with a determination that the respective selectable option is a second selectable option of the one or more second selectable options, updating the first respective representation of the first graphical object to replace the placeholder element for the second customizable visual element with a first variant of the second customizable visual element corresponding to the second selectable option.

24. The electronic device of claim 23, the one or more programs further including instructions for:
after updating the first respective representation of the first graphical object with the first variant of the first customizable visual element corresponding to the first selectable option, receiving, via the one or more input devices, a third user input selecting a third selectable option of the one or more first selectable options; and
in response to receiving the third user input, updating the first respective representation of the first graphical object to replace the first variant of the first customizable visual element with a second variant, different than the first variant, of the first customizable visual element corresponding to the third selectable option.

25. The electronic device of claim 21, the one or more programs further including instructions for:
while the state of customization of the first graphical object is a state of partial customization and the first respective representation of the first graphical object is displayed with a first variant for the first customizable visual element and a placeholder element for the second customizable visual element, receiving, via the one or more input devices, a second user input corresponding to a request to dismiss the customization user interface;

in response to receiving the second user input, ceasing display of the customization user interface;
after ceasing the display of the customization user interface and while the state of customization of the first graphical object is the state of partial customization, receiving, via the one or more input devices, a third user input selecting the first selectable representation of the first graphical object; and
in response to receiving the third user input, displaying, via the display device, the customization user interface, wherein the first respective representation of the first graphical object is displayed in the customization user interface with the first variant for the first customizable visual element and the placeholder element for the second customizable visual element.

26. The electronic device of claim 21, wherein:
in accordance with a determination the plurality of customizable visual elements includes a third customizable visual element, the customization user interface includes a fourth section including one or more third selectable options for customizing the third customizable visual element.

27. The electronic device of claim 21, wherein the customization user interface includes a second respective representation of the first graphical object corresponding to predefined variants of the first customizable visual element and the second customizable visual element.

28. The electronic device of claim 21, the one or more programs further including instructions for:
while the state of customization of the first graphical object is not a state of completed customization, receiving, via the one or more input devices, a second user input selecting the first respective representation of the first graphical object; and
in response to receiving the second user input:
in accordance with a determination that the first customizable visual element has not been customized, displaying, via the display device, a visual indication that the first customizable visual element has not been customized; and
in accordance with a determination that the second customizable visual element has not been customized, displaying, via the display device, a visual indication that the second customizable visual element has not been customized.

29. The electronic device of claim 28, wherein:
the visual indication that the first customizable visual element has not been customized includes animating a change in a visual characteristic of the one or more first selectable options for customizing the first customizable visual element, and the visual indication that the second customizable visual element has not been customized includes animating a change in a visual characteristic of the one or more second selectable options for customizing the second customizable visual element.

30. The electronic device of claim 21, the one or more programs further including instructions for:
while the state of customization of the first graphical object is a state of completed customization in which a respective variant of the first customizable visual element and a respective variant of the second customizable visual element have been selected, receiving, via the one or more input devices, a second user input selecting the first respective representation of the first graphical object; and in response to receiving the second user input, inserting the first graphical object having the respective variant of the first customizable visual element and the respective variant of the second customizable visual element into the text entry region.

31. The electronic device of claim 30, the one or more programs further including instructions for:
after receiving the second user input selecting the first respective representation of the first graphical object, updating the first selectable representation of the first graphical object in the virtual keyboard to display a representation of the first graphical object having the respective variant of the first customizable visual element and the respective variant of the second customizable visual element.

32. The electronic device of claim 21, the one or more programs further including instructions for:
while the state of customization of the first graphical object is a state of completed customization, receiving, via the one or more input devices, a second user input selecting the first selectable representation of the first graphical object; and
in response to receiving the second user input:
in accordance with a determination that the second user input includes selection of the first selectable representation of the first graphical object for shorter than a predetermined duration threshold, inserting the first graphical object into the text entry region without displaying the customization user interface; and
in accordance with a determination that the second user input includes selection of the first selectable representation of the first graphical object for longer than the predetermined duration threshold, displaying, via the display device, the customization user interface without inserting the first graphical object into the text entry region.

33. The electronic device of claim 32, wherein inserting the first graphical object into the text entry region includes:
in accordance with a determination that the first selectable representation of the first graphical object is displayed with default variants for the first and second customizable visual elements, inserting the first graphical object with the default variants into the text entry region; and
in accordance with a determination that the first selectable representation of the first graphical object is displayed with customized variants for the first and second customizable visual elements, inserting the first graphical object with the customized variants into the text entry region.

34. The electronic device of claim 21, wherein the first user input includes touchdown and liftoff of a contact from a touch-sensitive surface of the one or more input devices, and the customization user interface is displayed after the touchdown of the contact on the touch-sensitive surface and before the liftoff of the contact from the touch-sensitive surface, the one or more programs including instructions for:
while displaying the customization user interface, detecting the liftoff of the contact from the touch-sensitive surface; and
in response to detecting the liftoff of the contact from the touch-sensitive surface, maintaining display, via the display device, of the customization user interface.

35. The electronic device of claim 21, wherein the customization user interface is overlaid over the user interface including the text entry region and the virtual keyboard.

36. The electronic device of claim 21, wherein:

in accordance with a determination that the customization user interface encompasses less than a predetermined amount of a display area of the display device, the customization user interface is overlaid over the user interface including the text entry region and the virtual keyboard; and
in accordance with a determination that the customization user interface encompasses greater than the predetermined amount of the display area of the display device, the customization user interface replaces the display of the user interface.

37. The electronic device of claim 21, the one or more programs further including instructions for:
while displaying the customization user interface, receiving, via the one or more input devices, a second user input corresponding to a location outside of the customization user interface; and
in response to receiving the second user input, ceasing display of the customization user interface.

38. The electronic device of claim 21, wherein the plurality of selectable representations of the plurality of graphical objects included in the virtual keyboard further includes a second selectable representation of a second graphical object, wherein the second graphical object is not associated with a plurality of customizable visual elements.

39. The electronic device of claim 38, the one or more programs further including instructions for:
receiving, via the one or more input devices, a second user input selecting a respective selectable representation of the plurality of selectable representations in the virtual keyboard, wherein the respective selectable representation is associated with a respective graphical object; and
in response to receiving the second user input:
in accordance with a determination that the respective graphical object is associated with a plurality of customizable visual elements and the one or more first criteria are satisfied, displaying, via the display device, a first customization user interface including selectable options for customizing the plurality of customizable visual elements of the respective graphical object and a respective representation of the respective graphical object that reflects the plurality of customizable visual elements based on the selectable options, wherein the respective representation of the respective graphical object is selectable to insert the respective representation into the text entry region;
in accordance with a determination that the respective graphical object is associated with only one customizable visual element and one or more second criteria are satisfied, displaying, via the display device, a second customization user interface including respective representations corresponding to respective variants of the one customizable visual element, wherein the respective representations corresponding to the respective variants are selectable to customize the one customizable visual element of the respective graphical object and insert the respective graphical object into the text entry region; and
in accordance with a determination that the respective graphical object is not associated with any customizable visual elements, inserting the respective graphical object into the text entry region without displaying a customization user interface via the display device.

40. The electronic device of claim 21, wherein a respective selectable option of the one or more first selectable options includes a representation corresponding to the first portion of the first graphical object, and a respective selectable option of the one or more second selectable options includes a representation corresponding to the second portion of the first graphical object.

41. A non-transitory computer readable storage medium storing one or more programs, the one or more programs comprising instructions, which when executed by one or more processors of an electronic device, cause the electronic device to perform a method comprising:
displaying, in a user interface via a display device, a text entry region and a virtual keyboard, wherein the virtual keyboard includes a plurality of selectable representations of a plurality of graphical objects;
receiving, via one or more input devices, a first user input selecting a first selectable representation of a first graphical object of the plurality of selectable representations of graphical objects, wherein the first graphical object comprises a plurality of customizable visual elements corresponding to a plurality of different portions of the first graphical object, including a first customizable visual element corresponding to a first portion of the first graphical object and a second customizable visual element corresponding to a second portion, different from the first portion, of the first graphical object; and
in response to receiving the first user input:
in accordance with a determination that one or more first criteria are satisfied, displaying, via the display device, a customization user interface, wherein the customization user interface includes:
a first section including one or more first selectable options for customizing the first portion of the first graphical object corresponding to the first customizable visual element;
a second section including one or more second selectable options for customizing the second portion of the first graphical object corresponding to the second customizable visual element; and
a third section for displaying a first respective representation of the first graphical object that indicates a current state of customization of the first graphical object, wherein:
the first respective representation of the first graphical object includes a representation of the first customizable visual element and a representation of the second customizable visual element, and
in accordance with a determination that the first customizable visual element and the second customizable visual element have not been customized, the representation of the first customizable visual element and the representation of the second customizable visual element are displayed with placeholder elements indicating that the first and second customizable visual elements have not been customized.

42. The non-transitory computer readable storage medium of claim 41, wherein the first respective representation reflects the first customizable visual element based on the one or more first selectable options and the second customizable visual element based on the one or more second selectable options.

43. The non-transitory computer readable storage medium of claim 41, the method further comprising:
while the first respective representation of the first graphical object is displayed with placeholder elements for the first customizable visual element and the second customizable visual element, receiving, via the one or more input devices, a second user input selecting a respective selectable option in the customization user interface; and
in response to receiving the second user input selecting the respective selectable option:
in accordance with a determination that the respective selectable option is a first selectable option of the one or more first selectable options, updating the first respective representation of the first graphical object to replace the placeholder element for the first customizable visual element with a first variant of the first customizable visual element corresponding to the first selectable option; and
in accordance with a determination that the respective selectable option is a second selectable option of the one or more second selectable options, updating the first respective representation of the first graphical object to replace the placeholder element for the second customizable visual element with a first variant of the second customizable visual element corresponding to the second selectable option.

44. The non-transitory computer readable storage medium of claim 43, the method further comprising:
after updating the first respective representation of the first graphical object with the first variant of the first customizable visual element corresponding to the first selectable option, receiving, via the one or more input devices, a third user input selecting a third selectable option of the one or more first selectable options; and
in response to receiving the third user input, updating the first respective representation of the first graphical object to replace the first variant of the first customizable visual element with a second variant, different than the first variant, of the first customizable visual element corresponding to the third selectable option.

45. The non-transitory computer readable storage medium of claim 41, the method further comprising:
while the state of customization of the first graphical object is a state of partial customization and the first respective representation of the first graphical object is displayed with a first variant for the first customizable visual element and a placeholder element for the second customizable visual element, receiving, via the one or more input devices, a second user input corresponding to a request to dismiss the customization user interface;
in response to receiving the second user input, ceasing display of the customization user interface;
after ceasing the display of the customization user interface and while the state of customization of the first graphical object is the state of partial customization, receiving, via the one or more input devices, a third user input selecting the first selectable representation of the first graphical object; and
in response to receiving the third user input, displaying, via the display device, the customization user interface, wherein the first respective representation of the first graphical object is displayed in the customization user interface with the first variant for the first customizable visual element and the placeholder element for the second customizable visual element.

46. The non-transitory computer readable storage medium of claim 41, wherein:
in accordance with a determination the plurality of customizable visual elements includes a third customizable visual element, the customization user interface includes a fourth section including one or more third selectable options for customizing the third customizable visual element.

47. The non-transitory computer readable storage medium of claim 41, wherein the customization user interface includes a second respective representation of the first graphical object corresponding to predefined variants of the first customizable visual element and the second customizable visual element.

48. The non-transitory computer readable storage medium of claim 41, the method further comprising:
  while the state of customization of the first graphical object is not a state of completed customization, receiving, via the one or more input devices, a second user input selecting the first respective representation of the first graphical object; and
  in response to receiving the second user input:
    in accordance with a determination that the first customizable visual element has not been customized, displaying, via the display device, a visual indication that the first customizable visual element has not been customized; and
    in accordance with a determination that the second customizable visual element has not been customized, displaying, via the display device, a visual indication that the second customizable visual element has not been customized.

49. The non-transitory computer readable storage medium of claim 48, wherein:
  the visual indication that the first customizable visual element has not been customized includes animating a change in a visual characteristic of the one or more first selectable options for customizing the first customizable visual element, and
  the visual indication that the second customizable visual element has not been customized includes animating a change in a visual characteristic of the one or more second selectable options for customizing the second customizable visual element.

50. The non-transitory computer readable storage medium of claim 41, the method further comprising:
  while the state of customization of the first graphical object is a state of completed customization in which a respective variant of the first customizable visual element and a respective variant of the second customizable visual element have been selected, receiving, via the one or more input devices, a second user input selecting the first respective representation of the first graphical object; and
  in response to receiving the second user input, inserting the first graphical object having the respective variant of the first customizable visual element and the respective variant of the second customizable visual element into the text entry region.

51. The non-transitory computer readable storage medium of claim 50, the method further comprising:
  after receiving the second user input selecting the first respective representation of the first graphical object, updating the first selectable representation of the first graphical object in the virtual keyboard to display a representation of the first graphical object having the respective variant of the first customizable visual element and the respective variant of the second customizable visual element.

52. The non-transitory computer readable storage medium of claim 41, the method further comprising:
  while the state of customization of the first graphical object is a state of completed customization, receiving, via the one or more input devices, a second user input selecting the first selectable representation of the first graphical object; and
  in response to receiving the second user input:
    in accordance with a determination that the second user input includes selection of the first selectable representation of the first graphical object for shorter than a predetermined duration threshold, inserting the first graphical object into the text entry region without displaying the customization user interface; and
    in accordance with a determination that the second user input includes selection of the first selectable representation of the first graphical object for longer than the predetermined duration threshold, displaying, via the display device, the customization user interface without inserting the first graphical object into the text entry region.

53. The non-transitory computer readable storage medium of claim 52, wherein inserting the first graphical object into the text entry region includes:
  in accordance with a determination that the first selectable representation of the first graphical object is displayed with default variants for the first and second customizable visual elements, inserting the first graphical object with the default variants into the text entry region; and
  in accordance with a determination that the first selectable representation of the first graphical object is displayed with customized variants for the first and second customizable visual elements, inserting the first graphical object with the customized variants into the text entry region.

54. The non-transitory computer readable storage medium of claim 41, wherein the first user input includes touchdown and liftoff of a contact from a touch-sensitive surface of the one or more input devices, and the customization user interface is displayed after the touchdown of the contact on the touch-sensitive surface and before the liftoff of the contact from the touch-sensitive surface, the method further comprising:
  while displaying the customization user interface, detecting the liftoff of the contact from the touch-sensitive surface; and
  in response to detecting the liftoff of the contact from the touch-sensitive surface, maintaining display, via the display device, of the customization user interface.

55. The non-transitory computer readable storage medium of claim 41, wherein the customization user interface is overlaid over the user interface including the text entry region and the virtual keyboard.

56. The non-transitory computer readable storage medium of claim 41, wherein:
  in accordance with a determination that the customization user interface encompasses less than a predetermined amount of a display area of the display device, the customization user interface is overlaid over the user interface including the text entry region and the virtual keyboard; and
  in accordance with a determination that the customization user interface encompasses greater than the predetermined amount of the display area of the display device, the customization user interface replaces the display of the user interface.

57. The non-transitory computer readable storage medium of claim 41, the method further comprising:

while displaying the customization user interface, receiving, via the one or more input devices, a second user input corresponding to a location outside of the customization user interface; and in response to receiving the second user input, ceasing display of the customization user interface.

58. The non-transitory computer readable storage medium of claim 41, wherein the plurality of selectable representations of the plurality of graphical objects included in the virtual keyboard further includes a second selectable representation of a second graphical object, wherein the second graphical object is not associated with a plurality of customizable visual elements.

59. The non-transitory computer readable storage medium of claim 58, the method further comprising:

receiving, via the one or more input devices, a second user input selecting a respective selectable representation of the plurality of selectable representations in the virtual keyboard, wherein the respective selectable representation is associated with a respective graphical object; and in response to receiving the second user input:

in accordance with a determination that the respective graphical object is associated with a plurality of customizable visual elements and the one or more first criteria are satisfied, displaying, via the display device, a first customization user interface including selectable options for customizing the plurality of customizable visual elements of the respective graphical object and a respective representation of the respective graphical object that reflects the plurality of customizable visual elements based on the selectable options, wherein the respective representation of the respective graphical object is selectable to insert the respective representation into the text entry region;

in accordance with a determination that the respective graphical object is associated with only one customizable visual element and one or more second criteria are satisfied, displaying, via the display device, a second customization user interface including respective representations corresponding to respective variants of the one customizable visual element, wherein the respective representations corresponding to the respective variants are selectable to customize the one customizable visual element of the respective graphical object and insert the respective graphical object into the text entry region; and in accordance with a determination that the respective graphical object is not associated with any customizable visual elements, inserting the respective graphical object into the text entry region without displaying a customization user interface via the display device.

60. The non-transitory computer readable storage medium of claim 41, wherein a respective selectable option of the one or more first selectable options includes a representation corresponding to the first portion of the first graphical object, and a respective selectable option of the one or more second selectable options includes a representation corresponding to the second portion of the first graphical object.

* * * * *